United States Patent
Ohsugi

(10) Patent No.: US 11,888,422 B2
(45) Date of Patent: Jan. 30, 2024

(54) CARRIER FREQUENCY SETTING METHOD, MOTOR DRIVING SYSTEM, AND CARRIER FREQUENCY SETTING DEVICE

(71) Applicant: NIPPON STEEL CORPORATION, Tokyo (JP)

(72) Inventor: Yasuo Ohsugi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 77 days.

(21) Appl. No.: 17/051,658

(22) PCT Filed: Jul. 1, 2019

(86) PCT No.: PCT/JP2019/026106
§ 371 (c)(1),
(2) Date: Oct. 29, 2020

(87) PCT Pub. No.: WO2020/009062
PCT Pub. Date: Jan. 9, 2020

(65) Prior Publication Data
US 2021/0091704 A1    Mar. 25, 2021

(30) Foreign Application Priority Data

Jul. 2, 2018 (JP) .................................. 2018-126066

(51) Int. Cl.
H02P 27/08 (2006.01)
(52) U.S. Cl.
CPC .................................. *H02P 27/085* (2013.01)

(58) Field of Classification Search
CPC . H02M 7/48; H02M 1/08; H02P 21/50; H02P 27/08; H02P 27/00; H02P 27/04;
(Continued)

(56) References Cited

U.S. PATENT DOCUMENTS

2010/0052583 A1    3/2010 Takamatsu et al.
2010/0185350 A1    7/2010 Okamura et al.
(Continued)

FOREIGN PATENT DOCUMENTS

DE    10 2015 218 507 A1    3/2017
JP          2002-10668 A        1/2002
(Continued)

*Primary Examiner* — Antony M Paul
(74) *Attorney, Agent, or Firm* — Birch, Stewart, Kolasch & Birch, LLP

(57) ABSTRACT

A motor can be driven so that the total loss of a loss of a motor and a loss of an inverter decreases. In a relationship between an optimum carrier frequency at which the total loss is minimized and a torque of a motor M, a lowest value of the optimum carrier frequency is derived, and a relationship between the torque of the motor M and the carrier frequency is determined to have a portion in which the carrier frequency is substantially constant or decreases as the torque of the motor M increases in a range equal to or less than the torque of the motor M corresponding to the lowest optimum carrier frequency and a portion in which the carrier frequency is substantially constant or increases as the torque of the motor M increases in a range equal to or more than the torque of the motor M corresponding to the lowest optimum carrier frequency.

6 Claims, 54 Drawing Sheets

(58) Field of Classification Search
CPC ........ H02P 27/06; H02P 27/085; H02P 21/00;
H02P 21/0085; H02P 21/0021; H02P
21/02; H02P 21/04; H02P 21/18; H02P
21/20; H02P 21/22; H02P 21/30; H02P
23/00; H02P 23/0027; H02P 23/0086;
H02P 23/07; H02P 23/28; H02P 23/30;
H02P 25/062; H02P 25/064; H02P
25/024; H02P 25/032; H02P 25/145;
H02P 2207/05; H02P 2205/05; H02P
1/16; H02P 1/24; H02P 1/26; H02P 1/42;
H02P 1/46; H02P 6/08; H02P 6/06; H02P
6/04; H02P 6/12; A23L 33/13; A23L
33/135; A23V 2002/00; A23V 2200/326;
A23V 2200/3262; A61K 35/74; A61K
47/06; A61K 9/0056; A61P 1/16; A61P
15/00; A61P 3/06; A61P 35/00; A61P
5/30; C07J 31/006; C07J 41/0005; C07J
41/0016; C07J 41/0083; C07J 43/003;
B60L 2220/14; B60L 50/51
USPC ........................................................ 318/503
See application file for complete search history.

(56) References Cited

U.S. PATENT DOCUMENTS

| 2012/0056569 | A1* | 3/2012 | Takamatsu | B60L 15/08 |
| | | | | 318/400.26 |
| 2014/0354191 | A1* | 12/2014 | Nakazumi | H02P 21/0021 |
| | | | | 318/3 |
| 2019/0252999 | A1* | 8/2019 | Yuyama | B60L 15/20 |
| 2019/0253014 | A1 | 8/2019 | Iwaji et al. | |

FOREIGN PATENT DOCUMENTS

| JP | 2007-282298 A | 10/2007 | |
| JP | 2008-22671 A | 1/2008 | |
| JP | 2009-171768 A | 7/2009 | |
| JP | 2009-291019 A | 12/2009 | |
| JP | 2010-57243 A | 3/2010 | |
| JP | 2012-010513 A | 1/2012 | |
| JP | 2012010513 * | 1/2012 | ............... H02P 6/06 |
| JP | 2018-64313 A | 4/2018 | |
| JP | 2018-74786 A | 5/2018 | |
| KR | 10-2014-0141484 A | 12/2014 | |
| WO | WO-2018078908 A1 * | 5/2018 | ............. B60L 15/20 |

* cited by examiner

TORQUE RATIO 0.05

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.679 | 0.015 | 0.981 | 0.004 | 1.000 |
| 10 | 0.697 | 0.012 | 0.954 | 0.031 | 0.996 |
| 15 | 0.698 | 0.012 | 0.915 | 0.054 | 0.981 |
| 20 | 0.714 | 0.012 | 0.846 | 0.065 | 0.923 |
| 30 | 0.737 | 0.012 | 0.738 | 0.077 | 0.827 |
| 40 | 0.743 | 0.012 | 0.696 | 0.104 | 0.812 |
| 50 | 0.741 | 0.012 | 0.692 | 0.115 | 0.819 |

(b)

TORQUE RATIO 0.125

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.879 | 0.032 | 0.965 | 0.004 | 1.000 |
| 10 | 0.891 | 0.028 | 0.891 | 0.025 | 0.944 |
| 15 | 0.898 | 0.025 | 0.842 | 0.046 | 0.912 |
| 20 | 0.902 | 0.025 | 0.796 | 0.063 | 0.884 |
| 30 | 0.918 | 0.021 | 0.698 | 0.081 | 0.800 |
| 40 | 0.924 | 0.021 | 0.663 | 0.091 | 0.775 |
| 50 | 0.922 | 0.021 | 0.653 | 0.112 | 0.786 |

(c)

TORQUE RATIO 0.25

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.939 | 0.253 | 0.742 | 0.005 | 1.000 |
| 10 | 0.959 | 0.141 | 0.722 | 0.010 | 0.873 |
| 15 | 0.961 | 0.129 | 0.715 | 0.012 | 0.856 |
| 20 | 0.965 | 0.114 | 0.702 | 0.015 | 0.831 |
| 30 | 0.961 | 0.112 | 0.710 | 0.037 | 0.859 |
| 40 | 0.955 | 0.109 | 0.715 | 0.074 | 0.898 |
| 50 | 0.944 | 0.109 | 0.710 | 0.146 | 0.965 |

TORQUE RATIO 0.375

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.965 | 0.317 | 0.675 | 0.008 | 1.000 |
| 10 | 0.989 | 0.188 | 0.615 | 0.018 | 0.821 |
| 15 | 0.989 | 0.183 | 0.611 | 0.026 | 0.819 |
| 20 | 0.990 | 0.177 | 0.601 | 0.038 | 0.815 |
| 30 | 0.992 | 0.173 | 0.585 | 0.042 | 0.800 |
| 40 | 0.985 | 0.173 | 0.585 | 0.089 | 0.847 |
| 50 | 0.976 | 0.173 | 0.585 | 0.159 | 0.917 |

(b)

TORQUE RATIO 0.5

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.959 | 0.399 | 0.571 | 0.030 | 1.000 |
| 10 | 0.992 | 0.239 | 0.494 | 0.038 | 0.772 |
| 15 | 0.997 | 0.217 | 0.472 | 0.041 | 0.729 |
| 20 | 0.999 | 0.204 | 0.467 | 0.048 | 0.719 |
| 30 | 1.000 | 0.192 | 0.453 | 0.070 | 0.715 |
| 40 | 1.000 | 0.188 | 0.443 | 0.083 | 0.714 |
| 50 | 0.989 | 0.188 | 0.443 | 0.154 | 0.785 |

(a) TORQUE RATIO 0.05

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.731 | 0.020 | 0.973 | 0.007 | 1.000 |
| 10 | 0.729 | 0.016 | 0.987 | 0.021 | 1.023 |
| 15 | 0.729 | 0.016 | 0.987 | 0.041 | 1.044 |
| 20 | 0.718 | 0.017 | 1.019 | 0.055 | 1.091 |
| 30 | 0.717 | 0.018 | 1.010 | 0.069 | 1.097 |
| 40 | 0.701 | 0.019 | 0.997 | 0.137 | 1.153 |
| 50 | 0.681 | 0.021 | 1.032 | 0.206 | 1.258 |

(b) TORQUE RATIO 0.125

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.906 | 0.056 | 0.931 | 0.013 | 1.000 |
| 10 | 0.898 | 0.045 | 0.968 | 0.027 | 1.040 |
| 15 | 0.898 | 0.045 | 0.958 | 0.047 | 1.050 |
| 20 | 0.889 | 0.045 | 1.001 | 0.060 | 1.106 |
| 30 | 0.890 | 0.046 | 0.998 | 0.067 | 1.111 |
| 40 | 0.882 | 0.047 | 0.978 | 0.134 | 1.159 |
| 50 | 0.875 | 0.048 | 0.966 | 0.201 | 1.216 |

(c) TORQUE RATIO 0.25

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.971 | 0.139 | 0.843 | 0.018 | 1.000 |
| 10 | 0.972 | 0.118 | 0.835 | 0.029 | 0.983 |
| 15 | 0.968 | 0.116 | 0.854 | 0.059 | 1.028 |
| 20 | 0.964 | 0.115 | 0.882 | 0.071 | 1.068 |
| 30 | 0.962 | 0.114 | 0.879 | 0.094 | 1.087 |
| 40 | 0.960 | 0.116 | 0.873 | 0.123 | 1.113 |
| 50 | 0.958 | 0.118 | 0.847 | 0.176 | 1.141 |

FIG. 5-2

TORQUE RATIO 0.375

(a)

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.992 | 0.229 | 0.751 | 0.020 | 1.000 |
| 10 | 0.993 | 0.201 | 0.758 | 0.025 | 0.984 |
| 15 | 0.988 | 0.197 | 0.789 | 0.050 | 1.036 |
| 20 | 0.987 | 0.192 | 0.785 | 0.070 | 1.047 |
| 30 | 0.986 | 0.193 | 0.792 | 0.080 | 1.064 |
| 40 | 0.986 | 0.195 | 0.754 | 0.124 | 1.074 |
| 50 | 0.977 | 0.194 | 0.758 | 0.234 | 1.185 |

TORQUE RATIO 0.5

(b)

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 1.000 | 0.314 | 0.682 | 0.004 | 1.000 |
| 10 | 0.999 | 0.275 | 0.708 | 0.012 | 0.995 |
| 15 | 0.999 | 0.275 | 0.689 | 0.041 | 1.005 |
| 20 | 0.997 | 0.268 | 0.709 | 0.054 | 1.031 |
| 30 | 0.997 | 0.267 | 0.703 | 0.064 | 1.034 |
| 40 | 0.993 | 0.269 | 0.726 | 0.095 | 1.090 |
| 50 | 0.984 | 0.269 | 0.732 | 0.217 | 1.219 |

TORQUE RATIO 0.625

(c)

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.998 | 0.356 | 0.615 | 0.029 | 1.000 |
| 10 | 1.000 | 0.319 | 0.613 | 0.039 | 0.971 |
| 15 | 0.998 | 0.318 | 0.621 | 0.052 | 0.992 |
| 20 | 0.998 | 0.311 | 0.624 | 0.065 | 1.000 |
| 30 | 0.995 | 0.311 | 0.631 | 0.098 | 1.040 |
| 40 | 0.993 | 0.313 | 0.631 | 0.122 | 1.066 |
| 50 | 0.986 | 0.313 | 0.606 | 0.239 | 1.158 |

FIG. 5-3

TORQUE RATIO 0.75

(a)

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.995 | 0.390 | 0.564 | 0.046 | 1.000 |
| 10 | 0.999 | 0.354 | 0.540 | 0.058 | 0.952 |
| 15 | 1.000 | 0.352 | 0.529 | 0.066 | 0.946 |
| 20 | 0.997 | 0.346 | 0.546 | 0.085 | 0.978 |
| 30 | 0.995 | 0.345 | 0.559 | 0.105 | 1.009 |
| 40 | 0.993 | 0.346 | 0.562 | 0.131 | 1.040 |
| 50 | 0.987 | 0.348 | 0.550 | 0.217 | 1.115 |

TORQUE RATIO 0.875

(b)

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.994 | 0.426 | 0.519 | 0.055 | 1.000 |
| 10 | 0.995 | 0.384 | 0.529 | 0.066 | 0.979 |
| 15 | 0.995 | 0.382 | 0.523 | 0.070 | 0.975 |
| 20 | 0.994 | 0.376 | 0.526 | 0.094 | 0.996 |
| 30 | 0.991 | 0.373 | 0.541 | 0.115 | 1.029 |
| 40 | 0.990 | 0.374 | 0.535 | 0.137 | 1.046 |
| 50 | 0.988 | 0.375 | 0.515 | 0.183 | 1.072 |

TORQUE RATIO 1.0

(c)

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.990 | 0.449 | 0.473 | 0.077 | 1.000 |
| 10 | 0.991 | 0.423 | 0.493 | 0.081 | 0.997 |
| 15 | 0.991 | 0.401 | 0.494 | 0.093 | 0.988 |
| 20 | 0.990 | 0.396 | 0.512 | 0.097 | 1.005 |
| 30 | 0.988 | 0.396 | 0.502 | 0.126 | 1.024 |
| 40 | 0.988 | 0.394 | 0.508 | 0.128 | 1.030 |
| 50 | 0.986 | 0.394 | 0.490 | 0.177 | 1.061 |

FIG. 8-1

(a) TORQUE RATIO 0.05

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.755 | 0.020 | 0.959 | 0.022 | 1.000 |
| 10 | 0.744 | 0.019 | 0.971 | 0.054 | 1.045 |
| 15 | 0.728 | 0.020 | 0.931 | 0.152 | 1.103 |
| 20 | 0.690 | 0.022 | 1.088 | 0.184 | 1.295 |
| 30 | 0.683 | 0.025 | 1.121 | 0.227 | 1.374 |
| 40 | 0.665 | 0.027 | 1.123 | 0.292 | 1.442 |
| 50 | 0.658 | 0.029 | 1.120 | 0.336 | 1.484 |

(b) TORQUE RATIO 0.125

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.939 | 0.066 | 0.910 | 0.024 | 1.000 |
| 10 | 0.931 | 0.064 | 0.934 | 0.060 | 1.057 |
| 15 | 0.926 | 0.060 | 0.946 | 0.096 | 1.101 |
| 20 | 0.897 | 0.068 | 1.156 | 0.120 | 1.343 |
| 30 | 0.884 | 0.071 | 1.152 | 0.239 | 1.462 |
| 40 | 0.858 | 0.074 | 1.256 | 0.353 | 1.683 |
| 50 | 0.856 | 0.075 | 1.159 | 0.479 | 1.713 |

(c) TORQUE RATIO 0.25

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.977 | 0.145 | 0.822 | 0.033 | 1.000 |
| 10 | 0.977 | 0.139 | 0.802 | 0.050 | 0.991 |
| 15 | 0.973 | 0.139 | 0.826 | 0.075 | 1.039 |
| 20 | 0.969 | 0.141 | 0.826 | 0.100 | 1.067 |
| 30 | 0.962 | 0.143 | 0.877 | 0.129 | 1.149 |
| 40 | 0.950 | 0.146 | 0.917 | 0.204 | 1.267 |
| 50 | 0.943 | 0.147 | 0.852 | 0.356 | 1.355 |

FIG. 8-2

(a) TORQUE RATIO 0.375

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.993 | 0.235 | 0.751 | 0.013 | 1.000 |
| 10 | 0.995 | 0.229 | 0.710 | 0.047 | 0.986 |
| 15 | 0.992 | 0.228 | 0.713 | 0.080 | 1.021 |
| 20 | 0.987 | 0.229 | 0.728 | 0.113 | 1.070 |
| 30 | 0.983 | 0.231 | 0.745 | 0.140 | 1.116 |
| 40 | 0.979 | 0.233 | 0.758 | 0.180 | 1.171 |
| 50 | 0.977 | 0.234 | 0.754 | 0.207 | 1.195 |

(b) TORQUE RATIO 0.5

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.999 | 0.318 | 0.655 | 0.027 | 1.000 |
| 10 | 1.000 | 0.309 | 0.637 | 0.043 | 0.988 |
| 15 | 0.998 | 0.306 | 0.631 | 0.069 | 1.007 |
| 20 | 0.993 | 0.311 | 0.657 | 0.101 | 1.070 |
| 30 | 0.987 | 0.310 | 0.687 | 0.141 | 1.139 |
| 40 | 0.981 | 0.312 | 0.707 | 0.200 | 1.219 |
| 50 | 0.966 | 0.313 | 0.699 | 0.406 | 1.418 |

(c) TORQUE RATIO 0.625

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.995 | 0.408 | 0.522 | 0.070 | 1.000 |
| 10 | 0.996 | 0.386 | 0.523 | 0.086 | 0.995 |
| 15 | 0.992 | 0.384 | 0.532 | 0.123 | 1.038 |
| 20 | 0.985 | 0.384 | 0.512 | 0.222 | 1.118 |
| 30 | 0.979 | 0.388 | 0.523 | 0.283 | 1.195 |
| 40 | 0.974 | 0.389 | 0.535 | 0.336 | 1.260 |
| 50 | 0.965 | 0.388 | 0.540 | 0.439 | 1.367 |

FIG. 8-3

(a) TORQUE RATIO 0.75

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.981 | 0.395 | 0.437 | 0.168 | 1.000 |
| 10 | 0.982 | 0.381 | 0.431 | 0.176 | 0.988 |
| 15 | 0.981 | 0.380 | 0.422 | 0.203 | 1.005 |
| 20 | 0.979 | 0.378 | 0.430 | 0.211 | 1.019 |
| 30 | 0.978 | 0.376 | 0.433 | 0.224 | 1.033 |
| 40 | 0.972 | 0.381 | 0.438 | 0.280 | 1.099 |
| 50 | 0.961 | 0.378 | 0.446 | 0.382 | 1.206 |

(b) TORQUE RATIO 0.875

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.977 | 0.428 | 0.405 | 0.167 | 1.000 |
| 10 | 0.978 | 0.407 | 0.399 | 0.178 | 0.984 |
| 15 | 0.977 | 0.404 | 0.397 | 0.191 | 0.992 |
| 20 | 0.977 | 0.401 | 0.393 | 0.202 | 0.996 |
| 30 | 0.973 | 0.405 | 0.398 | 0.236 | 1.040 |
| 40 | 0.964 | 0.403 | 0.416 | 0.308 | 1.128 |
| 50 | 0.957 | 0.410 | 0.419 | 0.370 | 1.199 |

(c) TORQUE RATIO 1.0

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.985 | 0.505 | 0.442 | 0.052 | 1.000 |
| 10 | 0.986 | 0.485 | 0.434 | 0.068 | 0.987 |
| 15 | 0.981 | 0.485 | 0.437 | 0.118 | 1.040 |
| 20 | 0.976 | 0.482 | 0.435 | 0.175 | 1.093 |
| 30 | 0.971 | 0.477 | 0.447 | 0.223 | 1.147 |
| 40 | 0.964 | 0.486 | 0.442 | 0.300 | 1.228 |
| 50 | 0.953 | 0.487 | 0.459 | 0.402 | 1.348 |

TORQUE RATIO 0.05

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.769 | 0.041 | 0.937 | 0.021 | 1.000 |
| 10 | 0.768 | 0.041 | 0.912 | 0.064 | 1.018 |
| 15 | 0.756 | 0.042 | 0.917 | 0.107 | 1.065 |
| 20 | 0.748 | 0.044 | 0.918 | 0.128 | 1.090 |
| 30 | 0.754 | 0.049 | 0.895 | 0.139 | 1.082 |
| 40 | 0.697 | 0.053 | 0.881 | 0.427 | 1.361 |
| 50 | 0.624 | 0.057 | 1.089 | 0.640 | 1.786 |

(b)

TORQUE RATIO 0.125

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.938 | 0.122 | 0.858 | 0.020 | 1.000 |
| 10 | 0.932 | 0.119 | 0.863 | 0.061 | 1.043 |
| 15 | 0.929 | 0.120 | 0.862 | 0.081 | 1.063 |
| 20 | 0.928 | 0.123 | 0.830 | 0.121 | 1.075 |
| 30 | 0.923 | 0.128 | 0.831 | 0.152 | 1.111 |
| 40 | 0.886 | 0.132 | 0.888 | 0.354 | 1.374 |
| 50 | 0.856 | 0.133 | 1.030 | 0.435 | 1.599 |

(c)

TORQUE RATIO 0.25

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.986 | 0.273 | 0.712 | 0.015 | 1.000 |
| 10 | 0.988 | 0.266 | 0.676 | 0.044 | 0.986 |
| 15 | 0.982 | 0.268 | 0.694 | 0.073 | 1.035 |
| 20 | 0.976 | 0.268 | 0.717 | 0.102 | 1.087 |
| 30 | 0.975 | 0.272 | 0.685 | 0.145 | 1.102 |
| 40 | 0.964 | 0.280 | 0.693 | 0.233 | 1.205 |
| 50 | 0.946 | 0.279 | 0.793 | 0.298 | 1.370 |

FIG. 11-2

(a) TORQUE RATIO 0.375

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.994 | 0.405 | 0.584 | 0.010 | 1.000 |
| 10 | 1.000 | 0.387 | 0.527 | 0.031 | 0.945 |
| 15 | 0.988 | 0.393 | 0.591 | 0.073 | 1.057 |
| 20 | 0.986 | 0.394 | 0.579 | 0.104 | 1.077 |
| 30 | 0.981 | 0.397 | 0.579 | 0.146 | 1.122 |
| 40 | 0.974 | 0.399 | 0.581 | 0.208 | 1.189 |
| 50 | 0.951 | 0.403 | 0.581 | 0.438 | 1.422 |

(b) TORQUE RATIO 0.5

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.990 | 0.487 | 0.506 | 0.008 | 1.000 |
| 10 | 0.997 | 0.467 | 0.439 | 0.030 | 0.935 |
| 15 | 0.990 | 0.471 | 0.468 | 0.060 | 0.999 |
| 20 | 0.987 | 0.472 | 0.458 | 0.090 | 1.020 |
| 30 | 0.979 | 0.475 | 0.511 | 0.113 | 1.099 |
| 40 | 0.973 | 0.480 | 0.507 | 0.161 | 1.148 |
| 50 | 0.950 | 0.479 | 0.518 | 0.375 | 1.373 |

(c) TORQUE RATIO 0.625

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.983 | 0.546 | 0.431 | 0.023 | 1.000 |
| 10 | 0.983 | 0.525 | 0.443 | 0.028 | 0.996 |
| 15 | 0.981 | 0.526 | 0.437 | 0.057 | 1.019 |
| 20 | 0.975 | 0.526 | 0.453 | 0.085 | 1.064 |
| 30 | 0.967 | 0.532 | 0.433 | 0.170 | 1.135 |
| 40 | 0.962 | 0.537 | 0.474 | 0.175 | 1.186 |
| 50 | 0.936 | 0.535 | 0.482 | 0.402 | 1.419 |

TORQUE RATIO 0.75

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.970 | 0.567 | 0.412 | 0.021 | 1.000 |
| 10 | 0.972 | 0.544 | 0.395 | 0.043 | 0.982 |
| 15 | 0.968 | 0.545 | 0.387 | 0.085 | 1.017 |
| 20 | 0.967 | 0.549 | 0.379 | 0.102 | 1.031 |
| 30 | 0.958 | 0.554 | 0.395 | 0.151 | 1.100 |
| 40 | 0.952 | 0.553 | 0.410 | 0.187 | 1.150 |
| 50 | 0.927 | 0.556 | 0.418 | 0.385 | 1.360 |

(b)

TORQUE RATIO 0.875

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.960 | 0.587 | 0.379 | 0.034 | 1.000 |
| 10 | 0.963 | 0.566 | 0.363 | 0.051 | 0.979 |
| 15 | 0.958 | 0.565 | 0.382 | 0.069 | 1.015 |
| 20 | 0.955 | 0.566 | 0.372 | 0.103 | 1.041 |
| 30 | 0.947 | 0.576 | 0.363 | 0.162 | 1.101 |
| 40 | 0.940 | 0.576 | 0.382 | 0.198 | 1.156 |
| 50 | 0.913 | 0.579 | 0.386 | 0.405 | 1.371 |

(c)

TORQUE RATIO 1.0

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.946 | 0.576 | 0.351 | 0.073 | 1.000 |
| 10 | 0.947 | 0.561 | 0.346 | 0.086 | 0.993 |
| 15 | 0.946 | 0.563 | 0.343 | 0.092 | 0.998 |
| 20 | 0.941 | 0.560 | 0.343 | 0.128 | 1.030 |
| 30 | 0.936 | 0.567 | 0.346 | 0.159 | 1.071 |
| 40 | 0.930 | 0.571 | 0.345 | 0.190 | 1.106 |
| 50 | 0.898 | 0.573 | 0.350 | 0.424 | 1.346 |

FIG. 15-1

TORQUE RATIO 0.05

(a)

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.447 | 0.429 | 0.201 | 0.370 | 1.000 |
| 10 | 0.417 | 0.472 | 0.217 | 0.432 | 1.121 |
| 15 | 0.404 | 0.478 | 0.219 | 0.482 | 1.179 |
| 20 | 0.399 | 0.475 | 0.213 | 0.526 | 1.214 |
| 30 | 0.386 | 0.469 | 0.198 | 0.606 | 1.273 |
| 40 | 0.369 | 0.459 | 0.214 | 0.694 | 1.367 |

TORQUE RATIO 0.125

(b)

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.718 | 0.416 | 0.203 | 0.381 | 1.000 |
| 10 | 0.679 | 0.492 | 0.227 | 0.453 | 1.172 |
| 15 | 0.661 | 0.507 | 0.236 | 0.513 | 1.256 |
| 20 | 0.655 | 0.508 | 0.239 | 0.538 | 1.285 |
| 30 | 0.637 | 0.508 | 0.215 | 0.657 | 1.380 |
| 40 | 0.617 | 0.499 | 0.251 | 0.739 | 1.489 |

TORQUE RATIO 0.25

(c)

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.896 | 0.394 | 0.225 | 0.381 | 1.000 |
| 10 | 0.854 | 0.537 | 0.266 | 0.484 | 1.288 |
| 15 | 0.836 | 0.571 | 0.278 | 0.565 | 1.414 |
| 20 | 0.827 | 0.586 | 0.270 | 0.630 | 1.486 |
| 30 | 0.812 | 0.594 | 0.259 | 0.746 | 1.599 |
| 40 | 0.793 | 0.590 | 0.300 | 0.864 | 1.754 |

TORQUE RATIO 0.375

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.968 | 0.363 | 0.281 | 0.356 | 1.000 |
| 10 | 0.929 | 0.575 | 0.315 | 0.505 | 1.396 |
| 15 | 0.913 | 0.632 | 0.324 | 0.611 | 1.567 |
| 20 | 0.904 | 0.659 | 0.308 | 0.704 | 1.671 |
| 30 | 0.890 | 0.681 | 0.316 | 0.829 | 1.827 |
| 40 | 0.878 | 0.688 | 0.321 | 0.963 | 1.972 |

(b)

TORQUE RATIO 0.5

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 1.000 | 0.331 | 0.378 | 0.292 | 1.000 |
| 10 | 0.969 | 0.583 | 0.350 | 0.490 | 1.423 |
| 15 | 0.954 | 0.660 | 0.379 | 0.602 | 1.641 |
| 20 | 0.946 | 0.699 | 0.358 | 0.704 | 1.762 |
| 30 | 0.933 | 0.735 | 0.355 | 0.862 | 1.952 |
| 40 | 0.918 | 0.751 | 0.409 | 1.023 | 2.183 |

TORQUE RATIO 0.05

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.387 | 0.466 | 0.139 | 0.395 | 1.000 |
| 10 | 0.366 | 0.493 | 0.148 | 0.450 | 1.092 |
| 15 | 0.355 | 0.493 | 0.132 | 0.505 | 1.130 |
| 20 | 0.347 | 0.491 | 0.145 | 0.544 | 1.180 |
| 30 | 0.334 | 0.478 | 0.150 | 0.619 | 1.247 |
| 40 | 0.325 | 0.459 | 0.136 | 0.710 | 1.305 |

(b)

TORQUE RATIO 0.125

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.648 | 0.456 | 0.141 | 0.403 | 1.000 |
| 10 | 0.619 | 0.506 | 0.145 | 0.469 | 1.119 |
| 15 | 0.604 | 0.513 | 0.142 | 0.527 | 1.182 |
| 20 | 0.593 | 0.515 | 0.155 | 0.565 | 1.235 |
| 30 | 0.578 | 0.507 | 0.150 | 0.652 | 1.309 |
| 40 | 0.563 | 0.490 | 0.143 | 0.747 | 1.381 |

(c)

TORQUE RATIO 0.25

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.838 | 0.449 | 0.139 | 0.412 | 1.000 |
| 10 | 0.802 | 0.540 | 0.169 | 0.492 | 1.201 |
| 15 | 0.787 | 0.562 | 0.171 | 0.562 | 1.294 |
| 20 | 0.772 | 0.571 | 0.180 | 0.632 | 1.383 |
| 30 | 0.758 | 0.572 | 0.167 | 0.739 | 1.479 |
| 40 | 0.744 | 0.563 | 0.163 | 0.843 | 1.569 |

FIG. 18-2

(a) TORQUE RATIO 0.375

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.894 | 0.393 | 0.118 | 0.488 | 1.000 |
| 10 | 0.887 | 0.480 | 0.144 | 0.447 | 1.071 |
| 15 | 0.873 | 0.512 | 0.144 | 0.512 | 1.168 |
| 20 | 0.859 | 0.529 | 0.159 | 0.582 | 1.271 |
| 30 | 0.844 | 0.541 | 0.170 | 0.668 | 1.379 |
| 40 | 0.831 | 0.538 | 0.159 | 0.783 | 1.479 |

(b) TORQUE RATIO 0.5

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.965 | 0.423 | 0.187 | 0.390 | 1.000 |
| 10 | 0.932 | 0.596 | 0.217 | 0.527 | 1.339 |
| 15 | 0.919 | 0.649 | 0.200 | 0.624 | 1.473 |
| 20 | 0.904 | 0.680 | 0.229 | 0.733 | 1.641 |
| 30 | 0.892 | 0.709 | 0.224 | 0.854 | 1.787 |
| 40 | 0.881 | 0.709 | 0.227 | 0.978 | 1.914 |

(c) TORQUE RATIO 0.625

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.986 | 0.412 | 0.222 | 0.366 | 1.000 |
| 10 | 0.959 | 0.598 | 0.244 | 0.494 | 1.335 |
| 15 | 0.947 | 0.662 | 0.217 | 0.607 | 1.486 |
| 20 | 0.932 | 0.702 | 0.241 | 0.749 | 1.692 |
| 30 | 0.920 | 0.743 | 0.252 | 0.855 | 1.851 |
| 40 | 0.911 | 0.748 | 0.249 | 0.978 | 1.975 |

FIG. 18-3

(a) TORQUE RATIO 0.75

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.997 | 0.405 | 0.251 | 0.344 | 1.000 |
| 10 | 0.975 | 0.582 | 0.253 | 0.455 | 1.290 |
| 15 | 0.964 | 0.650 | 0.238 | 0.558 | 1.445 |
| 20 | 0.949 | 0.695 | 0.258 | 0.721 | 1.674 |
| 30 | 0.938 | 0.742 | 0.251 | 0.833 | 1.826 |
| 40 | 0.930 | 0.754 | 0.253 | 0.948 | 1.954 |

(b) TORQUE RATIO 0.875

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 1.000 | 0.409 | 0.281 | 0.310 | 1.000 |
| 10 | 0.985 | 0.555 | 0.250 | 0.414 | 1.218 |
| 15 | 0.974 | 0.619 | 0.246 | 0.503 | 1.369 |
| 20 | 0.959 | 0.667 | 0.278 | 0.651 | 1.596 |
| 30 | 0.950 | 0.714 | 0.284 | 0.733 | 1.730 |
| 40 | 0.943 | 0.728 | 0.271 | 0.851 | 1.851 |

(c) TORQUE RATIO 1.0

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.995 | 0.458 | 0.238 | 0.304 | 1.000 |
| 10 | 0.990 | 0.494 | 0.247 | 0.320 | 1.061 |
| 15 | 0.982 | 0.547 | 0.230 | 0.392 | 1.169 |
| 20 | 0.967 | 0.585 | 0.262 | 0.532 | 1.379 |
| 30 | 0.962 | 0.630 | 0.259 | 0.565 | 1.454 |
| 40 | 0.957 | 0.645 | 0.238 | 0.636 | 1.519 |

FIG. 21-1

(a) TORQUE RATIO 0.05

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.316 | 0.488 | 0.102 | 0.410 | 1.000 |
| 10 | 0.298 | 0.500 | 0.098 | 0.468 | 1.067 |
| 15 | 0.296 | 0.495 | 0.095 | 0.512 | 1.102 |
| 20 | 0.289 | 0.483 | 0.097 | 0.546 | 1.126 |
| 30 | 0.279 | 0.457 | 0.091 | 0.625 | 1.173 |
| 40 | 0.269 | 0.432 | 0.088 | 0.707 | 1.228 |

(b) TORQUE RATIO 0.125

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.569 | 0.483 | 0.101 | 0.416 | 1.000 |
| 10 | 0.545 | 0.511 | 0.097 | 0.479 | 1.087 |
| 15 | 0.534 | 0.511 | 0.121 | 0.509 | 1.140 |
| 20 | 0.527 | 0.502 | 0.098 | 0.568 | 1.167 |
| 30 | 0.512 | 0.482 | 0.096 | 0.652 | 1.230 |
| 40 | 0.497 | 0.462 | 0.096 | 0.741 | 1.299 |

(c) TORQUE RATIO 0.25

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.774 | 0.475 | 0.117 | 0.408 | 1.000 |
| 10 | 0.746 | 0.527 | 0.114 | 0.480 | 1.121 |
| 15 | 0.732 | 0.536 | 0.111 | 0.540 | 1.187 |
| 20 | 0.720 | 0.534 | 0.101 | 0.602 | 1.237 |
| 30 | 0.704 | 0.525 | 0.105 | 0.693 | 1.323 |
| 40 | 0.686 | 0.511 | 0.104 | 0.794 | 1.410 |

FIG. 21-2

(a) TORQUE RATIO 0.375

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.876 | 0.471 | 0.120 | 0.409 | 1.000 |
| 10 | 0.847 | 0.547 | 0.121 | 0.494 | 1.161 |
| 15 | 0.832 | 0.568 | 0.120 | 0.558 | 1.247 |
| 20 | 0.820 | 0.575 | 0.121 | 0.622 | 1.319 |
| 30 | 0.801 | 0.576 | 0.117 | 0.741 | 1.435 |
| 40 | 0.784 | 0.571 | 0.117 | 0.853 | 1.541 |

(b) TORQUE RATIO 0.5

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.933 | 0.466 | 0.135 | 0.399 | 1.000 |
| 10 | 0.904 | 0.565 | 0.137 | 0.493 | 1.195 |
| 15 | 0.888 | 0.597 | 0.138 | 0.568 | 1.303 |
| 20 | 0.877 | 0.611 | 0.136 | 0.638 | 1.386 |
| 30 | 0.858 | 0.624 | 0.140 | 0.763 | 1.528 |
| 40 | 0.841 | 0.627 | 0.136 | 0.896 | 1.659 |

(c) TORQUE RATIO 0.625

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.966 | 0.464 | 0.154 | 0.382 | 1.000 |
| 10 | 0.939 | 0.578 | 0.155 | 0.478 | 1.211 |
| 15 | 0.924 | 0.619 | 0.147 | 0.566 | 1.332 |
| 20 | 0.913 | 0.640 | 0.135 | 0.652 | 1.427 |
| 30 | 0.894 | 0.661 | 0.155 | 0.768 | 1.584 |
| 40 | 0.877 | 0.674 | 0.155 | 0.914 | 1.743 |

FIG. 21-3

(a) TORQUE RATIO 0.75

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.986 | 0.466 | 0.168 | 0.367 | 1.000 |
| 10 | 0.961 | 0.584 | 0.156 | 0.474 | 1.215 |
| 15 | 0.947 | 0.630 | 0.162 | 0.544 | 1.336 |
| 20 | 0.936 | 0.656 | 0.163 | 0.620 | 1.439 |
| 30 | 0.918 | 0.687 | 0.172 | 0.757 | 1.616 |
| 40 | 0.902 | 0.705 | 0.161 | 0.901 | 1.766 |

(b) TORQUE RATIO 0.875

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.996 | 0.466 | 0.175 | 0.359 | 1.000 |
| 10 | 0.974 | 0.582 | 0.183 | 0.430 | 1.194 |
| 15 | 0.962 | 0.630 | 0.174 | 0.510 | 1.315 |
| 20 | 0.951 | 0.658 | 0.175 | 0.585 | 1.417 |
| 30 | 0.934 | 0.692 | 0.174 | 0.729 | 1.595 |
| 40 | 0.919 | 0.715 | 0.177 | 0.856 | 1.748 |

(c) TORQUE RATIO 1.0

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 1.000 | 0.472 | 0.190 | 0.338 | 1.000 |
| 10 | 0.983 | 0.575 | 0.185 | 0.406 | 1.166 |
| 15 | 0.970 | 0.623 | 0.176 | 0.486 | 1.285 |
| 20 | 0.960 | 0.651 | 0.192 | 0.544 | 1.387 |
| 30 | 0.944 | 0.687 | 0.166 | 0.695 | 1.549 |
| 40 | 0.930 | 0.712 | 0.177 | 0.814 | 1.703 |

FIG. 24-1

TORQUE RATIO 0.05

(a)

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.229 | 0.499 | 0.058 | 0.443 | 1.000 |
| 10 | 0.220 | 0.485 | 0.062 | 0.491 | 1.037 |
| 15 | 0.222 | 0.461 | 0.057 | 0.523 | 1.041 |
| 20 | 0.220 | 0.434 | 0.058 | 0.552 | 1.044 |
| 30 | 0.217 | 0.378 | 0.037 | 0.620 | 1.035 |
| 40 | 0.219 | 0.331 | 0.051 | 0.658 | 1.040 |

TORQUE RATIO 0.125

(b)

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.453 | 0.498 | 0.064 | 0.438 | 1.000 |
| 10 | 0.439 | 0.497 | 0.063 | 0.491 | 1.051 |
| 15 | 0.435 | 0.477 | 0.058 | 0.536 | 1.071 |
| 20 | 0.431 | 0.455 | 0.061 | 0.565 | 1.081 |
| 30 | 0.426 | 0.409 | 0.058 | 0.633 | 1.100 |
| 40 | 0.419 | 0.372 | 0.059 | 0.695 | 1.126 |

TORQUE RATIO 0.25

(c)

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.675 | 0.497 | 0.067 | 0.436 | 1.000 |
| 10 | 0.653 | 0.513 | 0.063 | 0.505 | 1.081 |
| 15 | 0.641 | 0.506 | 0.064 | 0.548 | 1.118 |
| 20 | 0.633 | 0.490 | 0.065 | 0.589 | 1.144 |
| 30 | 0.620 | 0.466 | 0.076 | 0.659 | 1.201 |
| 40 | 0.604 | 0.436 | 0.069 | 0.749 | 1.254 |

TORQUE RATIO 0.375

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.802 | 0.500 | 0.072 | 0.429 | 1.000 |
| 10 | 0.775 | 0.528 | 0.067 | 0.505 | 1.100 |
| 15 | 0.759 | 0.533 | 0.062 | 0.560 | 1.155 |
| 20 | 0.746 | 0.527 | 0.064 | 0.609 | 1.201 |
| 30 | 0.726 | 0.515 | 0.078 | 0.691 | 1.284 |
| 40 | 0.707 | 0.495 | 0.071 | 0.795 | 1.361 |

(b)

TORQUE RATIO 0.5

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.881 | 0.503 | 0.084 | 0.413 | 1.000 |
| 10 | 0.849 | 0.549 | 0.080 | 0.492 | 1.121 |
| 15 | 0.832 | 0.558 | 0.071 | 0.562 | 1.191 |
| 20 | 0.818 | 0.565 | 0.077 | 0.609 | 1.251 |
| 30 | 0.793 | 0.559 | 0.085 | 0.717 | 1.361 |
| 40 | 0.773 | 0.556 | 0.086 | 0.816 | 1.459 |

(c)

TORQUE RATIO 0.625

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.932 | 0.506 | 0.080 | 0.414 | 1.000 |
| 10 | 0.900 | 0.567 | 0.088 | 0.485 | 1.140 |
| 15 | 0.881 | 0.586 | 0.086 | 0.548 | 1.221 |
| 20 | 0.865 | 0.595 | 0.082 | 0.618 | 1.295 |
| 30 | 0.837 | 0.608 | 0.090 | 0.727 | 1.425 |
| 40 | 0.815 | 0.604 | 0.086 | 0.848 | 1.538 |

FIG. 24-3

(a) TORQUE RATIO 0.75

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.966 | 0.515 | 0.086 | 0.399 | 1.000 |
| 10 | 0.933 | 0.575 | 0.076 | 0.492 | 1.143 |
| 15 | 0.914 | 0.601 | 0.086 | 0.548 | 1.236 |
| 20 | 0.897 | 0.617 | 0.083 | 0.614 | 1.314 |
| 30 | 0.867 | 0.638 | 0.089 | 0.741 | 1.468 |
| 40 | 0.845 | 0.648 | 0.094 | 0.850 | 1.593 |

(b) TORQUE RATIO 0.875

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 0.987 | 0.519 | 0.089 | 0.392 | 1.000 |
| 10 | 0.955 | 0.585 | 0.088 | 0.474 | 1.146 |
| 15 | 0.936 | 0.616 | 0.090 | 0.539 | 1.245 |
| 20 | 0.919 | 0.640 | 0.096 | 0.593 | 1.328 |
| 30 | 0.890 | 0.666 | 0.101 | 0.717 | 1.485 |
| 40 | 0.867 | 0.676 | 0.098 | 0.841 | 1.615 |

(c) TORQUE RATIO 1.0

| fc[kHz] | TOTAL EFFICIENCY RATIO | COPPER LOSS RATIO | IRON LOSS RATIO | INVERTER LOSS RATIO | TOTAL LOSS RATIO |
|---|---|---|---|---|---|
| 5 | 1.000 | 0.529 | 0.103 | 0.368 | 1.000 |
| 10 | 0.971 | 0.593 | 0.093 | 0.457 | 1.143 |
| 15 | 0.951 | 0.626 | 0.097 | 0.516 | 1.239 |
| 20 | 0.935 | 0.653 | 0.099 | 0.574 | 1.326 |
| 30 | 0.905 | 0.680 | 0.098 | 0.709 | 1.487 |
| 40 | 0.881 | 0.701 | 0.110 | 0.816 | 1.628 |

CARRIER FREQUENCY SETTING METHOD, MOTOR DRIVING SYSTEM, AND CARRIER FREQUENCY SETTING DEVICE

TECHNICAL FIELD

The present invention relates to a carrier frequency setting method, a motor driving system, and a carrier frequency setting device, and particularly, is suitable for driving a motor using an inverter.

Priority is claimed on Japanese Patent Application No. 2018-126066, filed Jul. 2, 2018, the content of which is incorporated herein by reference.

BACKGROUND ART

A Pulse Width Modulation (PWM) control type inverter is used as a power supply device for driving a motor of a train, a hybrid vehicle, a home electric appliance, or the like. The inverter compares a carrier wave (for example, a triangular wave) and a voltage command signal with each other to determine a width of a pulse signal (time for turning on a pulse), and turns on or off a switching element (for example, an Insulated Gate Bipolar Transistor (IGBT)) according to the generated pulse signal to convert an input DC power into AC power having a frequency required for driving the motor and supply the AC power to the motor. When the motor is driven, it is necessary to reduce a loss of the motor and also reduce a loss in the inverter so as to achieve high efficiency of the overall motor driving system.

Patent Document 1 discloses that table data which sets a relationship between a carrier frequency (frequency of a carrier wave) of a PWM control in which a total loss of a motor and an inverter is minimized and an electric angular frequency of the motor is prepared, and the inverter is operated by the carrier frequency of the PWM control corresponding to a detected value of the electric angular frequency of the motor to drive the motor.

Patent Documents 2 and 3 describes that a carrier frequency is set according to a rotation speed and torque of the motor.

Specifically, in Patent Document 2, the carrier frequency is set to a lowest first frequency in a first region where the rotation speed of the motor is low and the torque of the motor is large. Moreover, in a second region where the rotation speed of the motor is higher than the rotation speed set in the first region and the torque of the motor is approximately the same as the torque set in the first region, the carrier frequency is set to a second frequency higher than the first frequency. Further, in a third region where the rotation speed of the motor is higher than the rotation speeds set in the first region and the second region, and the torque of the motor is a second torque lower than the torques set in the first region and the second region, the carrier frequency is set to a highest third frequency.

In addition, in Patent Document 3, a low carrier frequency is set in a region where the rotation speed of the motor is low and the torque of the motor is small, and the carrier frequency is set higher as the rotation speed of the motor increases. In Patent Document 3, it is effective to decrease the carrier frequency of a non-small torque region in a low rotation range.

CITATION LIST

Patent Literature

[Patent Document 1]
Japanese Unexamined Patent Publication No. 2007-282298

[Patent Document 2]
Japanese Unexamined Patent Publication No. 2008-22671

[Patent Document 3]
Japanese Unexamined Patent Publication No. 2009-171768

SUMMARY OF INVENTION

Technical Problem

However, the technique described in Patent Document 1 does not mention the carrier frequency in a case where the torque of the motor fluctuates. Further, in the techniques described in Patent Documents 2 and 3, the carrier frequency decreases when the torque of the motor increases. In Patent Document 2, a driving current of the motor increases and a current loss increases as the torque increases. Accordingly, the current loss is reduced by decreasing the carrier frequency. In Patent Document 3, the current increases as the torque increases. Accordingly, an ON loss of the switching element increases, the loss of the inverter increases in a large torque region, an amount of a current flowing concentrated in each phase arm increases as the rotation speed of the motor decreases, and thus, the carrier frequency in the low rotation and non-small torque region is set low. Without being bound by such knowledge, the present inventors have investigated a relationship between the torque of the motor and the total loss of the loss of the motor and the loss of the inverter for each rotation speed of the motor. As a result, the present inventors have been found that the setting of the carrier frequency by the methods described in Patent Documents 2 and 3 may not be preferable from the viewpoint of total efficiency calculated from the total loss of the loss of the motor and the loss of the inverter.

The present invention is made in consideration of the above-described problems, and an object thereof is to drive the motor so that the total loss of the loss of the motor and the loss of the inverter decreases.

Solution to Problem

According to an aspect of the present invention, a carrier frequency setting method for setting a carrier frequency in an inverter for driving a motor, including: a loss derivation step of deriving a total loss which is a sum of a loss of the inverter and a loss of the motor when the motor is driven using the inverter while changing each of a torque generated in the motor, a rotation speed of the motor, and a carrier frequency in the inverter; a carrier frequency derivation step of deriving a carrier frequency when the total loss is minimum as an optimum carrier frequency in each combination of a plurality of the torques and a plurality of the rotation speeds, based on the total loss derived in the loss derivation step; a relationship derivation step of deriving a relationship between the torque of the motor and the optimum carrier frequency for each rotation speed of the motor, based on the optimum carrier frequency derived in the carrier frequency derivation step; a relationship storage step of storing the relationship derived for each rotation speed of the motor in the relationship derivation step; and a carrier frequency setting step of setting the carrier frequency according to a command value of the torque of the motor and a command value of the rotation speed of the motor based on the relationship, after the relationship is stored in the relationship storage step, when the motor is driven, is provided.

According to a first example of a motor driving system of the present invention, a motor driving system including: an inverter; a motor which is driven with reception of supply of AC power from the inverter; and a controller which controls an operation of the inverter, in which the inverter has a switching element configured using a wide band gap semiconductor, in which the controller has a carrier frequency setting unit which sets a carrier frequency of the inverter based on a relationship between a torque of the motor and the carrier frequency in the inverter derived for each rotation speed of the motor, and the relationship between the torque of the motor and the carrier frequency derived for each rotation speed of the motor has a portion in which the carrier frequency increases as the torque of the motor increases, is provided.

According to a second example of the motor driving system of the present invention, a motor driving system including: an inverter; a motor which is driven with reception of supply of AC power from the inverter; and a controller which controls an operation of the inverter, in which the inverter has a switching element configured using a semiconductor other than a wide band gap semiconductor, the controller has a carrier frequency setting unit which sets a carrier frequency of the inverter based on a relationship between a torque of the motor and the carrier frequency in the inverter derived for each rotation speed of the motor, and in the relationship between the torque of the motor and the carrier frequency derived for each rotation speed of the motor, the carrier frequency has a substantially constant value regardless of the torque of the motor, is provided.

According to another aspect of the present invention, a carrier frequency setting device for setting a carrier frequency of an inverter for driving a motor is provided. As a relationship between a torque of the motor and an optimum carrier frequency which is the carrier frequency when a total loss, which is a sum of a loss of the inverter and a loss of the motor when the motor is driven by using the inverter, is minimum, the carrier frequency setting device derives, for each rotation speed of the motor, a relationship which has a portion in which the optimum carrier frequency increases as the torque of the motor increases in a range in which the torque of the motor is equal to or more than a torque of the motor corresponding to the carrier frequency at which the optimum carrier frequency is a lowest value, and a portion in which the optimum carrier frequency decreases as the torque of the motor increases in a range in which the torque of the motor is equal to or less than the torque of the motor corresponding to the carrier frequency at which the optimum carrier frequency is the lowest value, when the inverter has a switching element configured using a wide band gap semiconductor, and derives, for each rotation speed of the motor, a relationship in which the optimum carrier frequency has a substantially constant value regardless of the torque of the motor, when the inverter has the switching element configured by using a semiconductor other than the wide band gap semiconductor. The carrier frequency setting device sets the carrier frequency of the inverter based on the relationship between the torque of the motor and the optimum carrier frequency.

Advantageous Effects of Invention

According to the present invention, it is possible to drive the motor so that the total loss of the loss of the motor and the loss of the inverter decreases.

BRIEF DESCRIPTION OF DRAWINGS

FIG. 2-1 is a diagram illustrating a first embodiment and is a first diagram illustrating, in a tabular form, a measurement result of a loss when a rotation speed ratio of a motor is 1.00.

FIG. 2-2 is a diagram illustrating the first embodiment and is a second diagram illustrating, in a tabular form, the measurement result of the loss when the rotation speed ratio of the motor is 1.00.

FIG. 4-1 is a diagram illustrating the first embodiment and is a first diagram illustrating, in a graph form, a relationship between a total loss ratio and the carrier frequency when the rotation speed ratio of the motor is 1.00.

FIG. 4-2 is a diagram illustrating the first embodiment and is a second diagram illustrating, in a graph form, the relationship between the total loss ratio and the carrier frequency when the rotation speed ratio of the motor is 1.00.

FIG. 5-1 is a diagram illustrating the first embodiment and is a first diagram illustrating, in a tabular form, a measurement result of a loss when the rotation speed ratio of the motor is 0.75.

FIG. 5-2 is a diagram illustrating the first embodiment and is a second diagram illustrating, in a tabular form, the measurement result of the loss when the rotation speed ratio of the motor is 0.75.

FIG. 5-3 is a diagram illustrating the first embodiment and is a third diagram illustrating, in a tabular form, the measurement result of the loss when the rotation speed ratio of the motor is 0.75.

FIG. 7-1 is a diagram illustrating the first embodiment and is a first diagram illustrating, in a graph form, a relationship between a total loss ratio and a carrier frequency when the rotation speed ratio of the motor is 0.75.

FIG. 7-2 is a diagram illustrating the first embodiment and is a second diagram illustrating, in graph form, the relationship between the total loss ratio and the carrier frequency when the rotation speed ratio of the motor is 0.75.

FIG. 7-3 is a diagram illustrating the first embodiment and is a third diagram illustrating, in a graph form, the relationship between the total loss ratio and the carrier frequency when the rotation speed ratio of the motor is 0.75.

FIG. 8-1 is a diagram illustrating the first embodiment and is a first diagram illustrating, in a tabular form, a measurement result of a loss when the rotation speed ratio of the motor is 0.50.

FIG. 8-2 is a diagram illustrating the first embodiment and is a second diagram illustrating, in a tabular form, the measurement result of the loss when the rotation speed ratio of the motor is 0.50.

FIG. 8-3 is a diagram illustrating the first embodiment and is a third diagram illustrating, in a tabular form, the measurement result of the loss when the rotation speed ratio of the motor is 0.50.

FIG. 10-1 is a diagram illustrating the first embodiment and is a first diagram illustrating, in a graph form, a relationship between a total loss ratio and a carrier frequency when the rotation speed ratio of the motor is 0.50.

FIG. 10-2 is a diagram illustrating the first embodiment and is a second diagram illustrating, in a graph form, the relationship between the total loss ratio and the carrier frequency when the rotation speed ratio of the motor is 0.50.

FIG. 10-3 is a diagram illustrating the first embodiment and is a third diagram illustrating, in a graph form, the relationship between the total loss ratio and the carrier frequency when the rotation speed ratio of the motor is 0.50.

FIG. 11-1 is a diagram illustrating the first embodiment and is a first diagram illustrating, in a tabular form, a measurement result of a loss when the rotation speed ratio of the motor is 0.25.

FIG. 11-2 is a diagram illustrating the first embodiment and is a second diagram illustrating, in a tabular form, the measurement result of the loss when the rotation speed ratio of the motor is 0.25.

FIG. 11-3 is a diagram illustrating the first embodiment and is a third diagram illustrating, in a tabular form, the measurement result of the loss when the rotation speed ratio of the motor is 0.25.

FIG. 13-1 is a diagram illustrating the first embodiment and is a first diagram illustrating, in a graph form, a relationship between a total loss ratio and a carrier frequency when the rotation speed ratio of the motor is 0.25.

FIG. 13-2 is a diagram illustrating the first embodiment and is a second diagram illustrating, in a graph form, the relationship between the total loss ratio and the carrier frequency when the rotation speed ratio of the motor is 0.25.

FIG. 13-3 is a diagram illustrating the first embodiment and is a third diagram illustrating, in a graph form, the relationship between the total loss ratio and the carrier frequency when the rotation speed ratio of the motor is 0.25.

FIG. 15-1 is a diagram illustrating a second embodiment and is a first diagram illustrating, in a tabular form, a measurement result of a loss when a rotation speed ratio of a motor is 1.00.

FIG. 15-2 is a diagram illustrating the second embodiment and is a second diagram illustrating, in a tabular form, the measurement result of the loss when the rotation speed ratio of the motor is 1.00.

FIG. 17-1 is a diagram illustrating a second embodiment and is a first diagram illustrating, in a graph form, a relationship between a total loss ratio and a carrier frequency when the rotation speed ratio of the motor is 1.00.

FIG. 17-2 is a diagram illustrating the second embodiment and is a second diagram illustrating, in a graph form, the relationship between the total loss ratio and the carrier frequency when the rotation speed ratio of the motor is 1.00.

FIG. 18-1 is a diagram illustrating a second embodiment and is a first diagram illustrating, in a tabular form, a measurement result of a loss when the rotation speed ratio of the motor is 0.75.

FIG. 18-2 is a diagram illustrating the second embodiment and is a second diagram illustrating, in a tabular form, the measurement result of the loss when the rotation speed ratio of the motor is 0.75.

FIG. 18-3 is a diagram illustrating the second embodiment and is a third diagram illustrating, in a tabular form, the measurement result of the loss when the rotation speed ratio of the motor is 0.75.

FIG. 20-1 is a diagram illustrating a second embodiment and is a first diagram illustrating, in a graph form, a relationship between a total loss ratio and a carrier frequency when the rotation speed ratio of the motor is 0.75.

FIG. 20-2 is a diagram illustrating the second embodiment and is a second diagram illustrating, in a graph form, the relationship between the total loss ratio and the carrier frequency when the rotation speed ratio of the motor is 0.75.

FIG. 20-3 is a diagram illustrating the second embodiment and is a third diagram illustrating, in a graph form, the relationship between the total loss ratio and the carrier frequency when the rotation speed ratio of the motor is 0.75.

FIG. 21-1 is a diagram illustrating the second embodiment and is a first diagram illustrating, in a tabular form, a measurement result of a loss when the rotation speed ratio of the motor is 0.50.

FIG. 21-2 is a diagram illustrating the second embodiment and is a second diagram illustrating, in a tabular form, the measurement result of the loss when the rotation speed ratio of the motor is 0.50.

FIG. 21-3 is a diagram illustrating the second embodiment and is a third diagram illustrating, in a tabular form, the measurement result of the loss when the rotation speed ratio of the motor is 0.50.

FIG. 23-1 is a diagram illustrating the second embodiment and is a first diagram illustrating, in a graph form, a relationship between a total loss ratio and a carrier frequency when the rotation speed ratio of the motor is 0.50.

FIG. 23-2 is a diagram illustrating the second embodiment and is a second diagram illustrating, in a graph form, the relationship between the total loss ratio and the carrier frequency when the rotation speed ratio of the motor is 0.50.

FIG. 23-3 is a diagram illustrating the second embodiment and is a third diagram illustrating, in a graph form, the relationship between the total loss ratio and the carrier frequency when the rotation speed ratio of the motor is 0.50.

FIG. 24-1 is a diagram illustrating the second embodiment and is a first diagram illustrating, in a tabular form, a measurement result of a loss when the rotation speed ratio of the motor is 0.25.

FIG. 24-2 is a diagram illustrating the second embodiment and is a second diagram illustrating, in a tabular form, the measurement result of the loss when the rotation speed ratio of the motor is 0.25.

FIG. 24-3 is a diagram illustrating the second embodiment and is a third diagram illustrating, in a tabular form, the measurement result of the loss when the rotation speed ratio of the motor is 0.25.

FIG. 26-1 is a diagram illustrating the second embodiment and is a first diagram illustrating, in a graph form, a relationship between a total loss ratio and a earner frequency when the rotation speed ratio of the motor is 0.25.

FIG. 26-2 is a diagram illustrating the second embodiment and is a second diagram illustrating, in a graph form, the relationship between the total loss ratio and the carrier frequency when the rotation speed ratio of the motor is 0.25.

FIG. 26-3 is a diagram illustrating the second embodiment and is a third diagram illustrating, in a graph form, the relationship between the total loss ratio and the carrier frequency when the rotation speed ratio of the motor is 0.25.

DESCRIPTION OF EMBODIMENTS

Hereinafter, embodiments of the present invention will be described with reference to the drawings.

First Embodiment

First, a first embodiment will be described.

Figure 1:
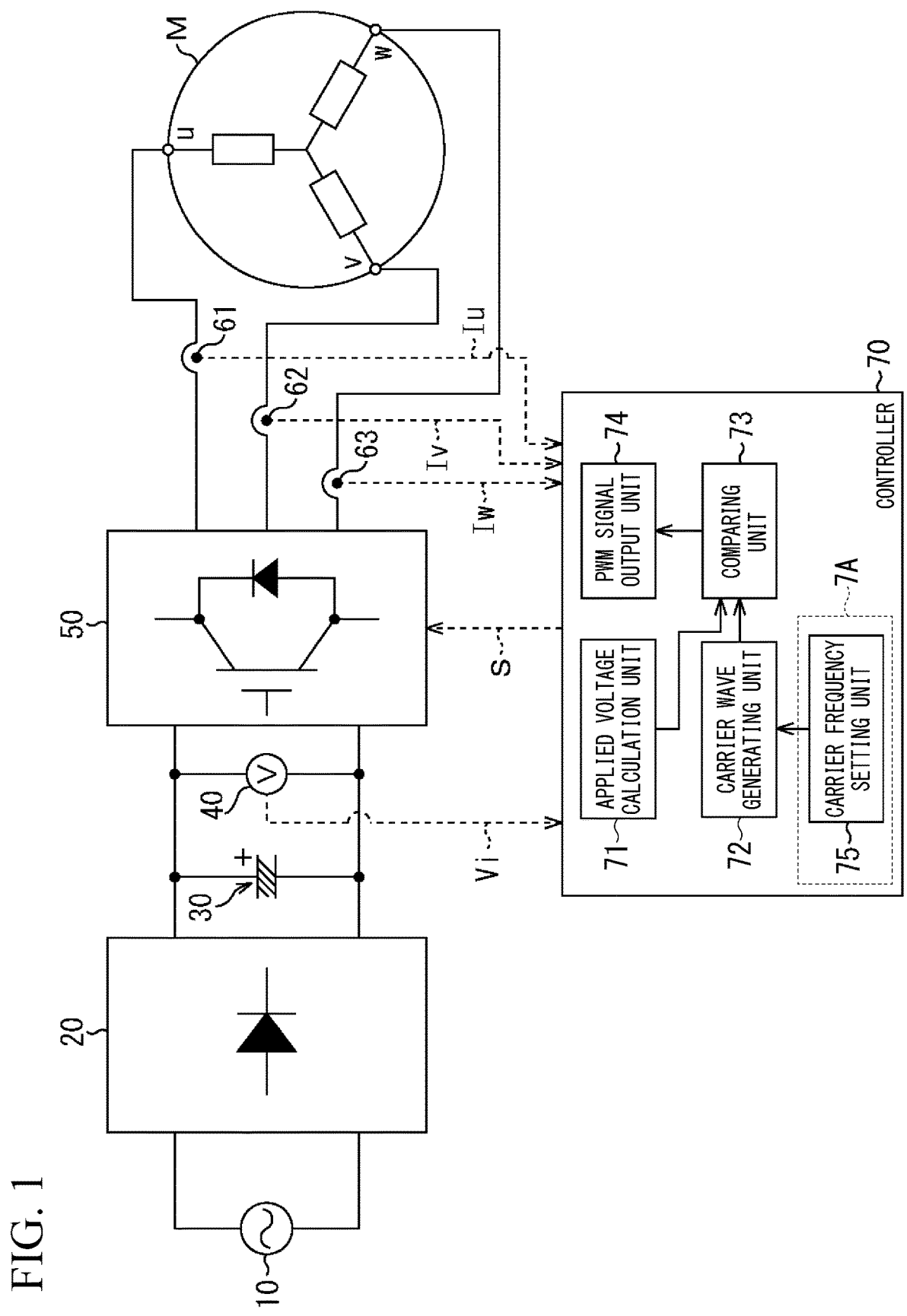
FIG. 1 is a diagram illustrating an example of a schematic configuration of a motor driving system.

FIG. 1 is a diagram illustrating an example of a schematic configuration of a motor driving system.

In the present embodiment, a case where a motor M is an. Interior Permanent Magnet Synchronous Motor (IPMSM) in which a permanent magnet is built in a rotor will be described as an example.

In FIG. 1, a motor driving system for driving the motor M includes an AC power supply 10, a rectifier circuit 20, an electrolytic capacitor 30, a voltage sensor 40, an inverter 50, current sensors 61 to 63, and a controller 70 which controls an operation of the inverter 50.

The AC power supply 10 supplies AC power having a commercial frequency (50 Hz/60 Hz).

For example, the rectifier circuit 20 is a full-wave rectifier circuit including four diodes and converts AC power into DC power.

The electrolytic capacitor 30 removes a pulsating flow of the DC power output from the rectifier circuit 20.

The voltage sensor 40 measures a DC input voltage Vi input to the inverter 50.

For example, the inverter 50 is a circuit including six switching elements constituting a three-phase full bridge. The inverter 50 turns on or off the switching element based on a PWM signal S which is output from the controller 70 and input to the switching element and, thus, converts input DC power into AC power having a frequency required for driving the motor M to output (supply) the converted AC power to the motor M. In the present embodiment, a case where the switching element is a switching element configured using a wide band gap semiconductor (SiC, GaN, or the like) will be described as an example.

For example, the current sensors 61 to 63 are a Current Transformers (CT), and measure the AC motor currents Iu, Iv, and Iw flowing through windings of phases u, v, and w of the motor M.

The controller 70 includes an applied voltage calculation unit 71, a carrier wave generating unit 72, a comparing unit 73, a PWM signal output unit 74, and a carrier frequency setting device 7A. For example, the controller 70 can be realized by using a microcomputer or an arithmetic circuit. Further, for example, the controller 70 can control the operation of the motor M by a vector control. Except for a configuration related to the carrier frequency, the controller can be realized by a known technique. Accordingly, here, a detailed description thereof will be omitted.

A speed command value (command value of the rotation speed of the motor M) which is input from the outside, a torque command value (command value of a torque of the motor M) which also is input from the outside, an input voltage Vi which is measured by the voltage sensor 40, and the motor currents Iu, Iv, and Iw which are measured by the current sensors 61 to 63 are input to the applied voltage calculation unit 71. The applied voltage calculation unit 71 calculates a voltage applied to each phase of the motor M based on these, and generates a voltage command signal indicating the calculated voltage. The carrier frequency setting device 7A has a carrier frequency setting unit 75.

The carrier wave generating unit 72 generates a carrier wave (a carrier wave used to generate the PWM signal S) in a PWM control. In the present embodiment, a case where the carrier wave is a triangular wave will be described as an example.

The comparing unit 73 compares the voltage command signal generated by the applied voltage calculation unit 71 with the triangular wave (carrier wave) generated by the carrier wave generating unit 72.

The PWM signal output unit 74 outputs a pulse signal corresponding to a result of the comparison in the comparing unit 73 to the inverter 50 as the PWM signal S. As described above, the inverter 50 turns on or off the switching element based on the PWM signal S, converts the input DC power into AC power, and outputs the converted AC power to the motor M.

The carrier frequency setting unit 75 sets a carrier frequency (carrier frequency of the inverter 50) which is a frequency of the carrier wave. The carrier wave generating unit 72 generates a triangular wave having the carrier frequency set by the carrier frequency setting unit 75. In the present embodiment, the carrier frequency setting unit 75 sets the carrier frequency according to the command value of the rotation speed of the motor M and the command value of the torque of the motor M.

As described in the section of Problems to be Solved by the Invention, in Patent Documents 2 and 3, the carrier frequency increases when the torque of the motor is small (the carrier frequency decreases when the torque of the motor is large). However, in some cases, this is not preferable. For the demonstration, the present inventors have investigated a carrier frequency for providing a high-efficiency motor driving system from the viewpoint of total high efficiency calculated from a total loss of a loss of a motor and a loss of an inverter as a total efficiency of a motor driving system. The results will be described below.

Here, the total efficiency of the motor driving system is a value obtained by dividing an output (=torque×rotation speed) of the motor M by the input power to the inverter 50 (total efficiency=output/input power).

A value obtained by subtracting the output of the motor M from the power input to the inverter 50 is energy (loss) lost in the motor driving system. Here, a breakdown of the loss is examined assuming that this loss is equal to a sum of the loss of the motor M and the loss of the inverter 50. The loss of the motor M includes a mechanical loss, a wind loss, a bearing loss, or the like in addition to an iron loss and a copper loss. However, if the shapes of the motors M are the same as each other and the rotation speeds thereof are the same as each other, the losses (mechanical loss, wind loss, bearing loss, or the like) can be regarded as constant even when the operation of the inverter 50 is changed. Therefore, the iron loss illustrated below includes the losses. Even in this case, if the rotation speed is constant, the loss of the motor M includes certain amounts of the losses (mechanical loss, wind loss, bearing loss, or the like). However, it is considered that there is no problem in verifying a tendency of increase/decrease in a loss of the motor driving system with respect to changes in the torque of the motor M. Therefore, here, it is assumed that the loss of the motor M includes the iron loss (however, loss including mechanical loss, wind loss, bearing loss, or the like) and the copper loss. Further, here, a range of the carrier frequency is set to 5 kHz to 50 kHz.

As described above, in the present embodiment, the motor M to be evaluated is the IPMSM. Basic specifications of the motor M are as follows. In addition, as a semiconductor element constituting the switching element of the inverter 50, a SiC semiconductor element which is one of wide band gap semiconductor elements was used.

Figure 2:
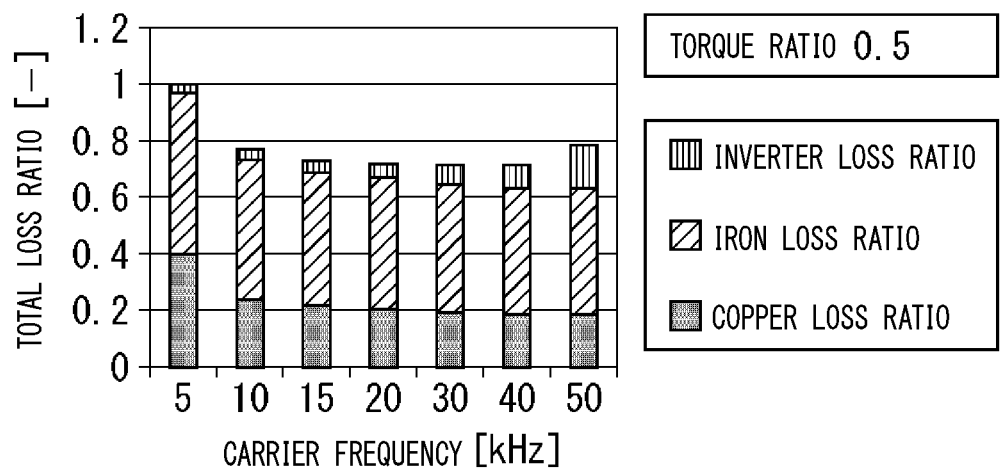

Number of phases: 3
Number of poles: 12
Stator outer diameter: 135 mm
Stator inner diameter: 87 mm
Number of stator slots: 18 (concentrated winding)
Material of stator (core): non-oriented electrical steel sheet (35A300)
Rotor outer diameter: 85 mm
Rotor (core) stack thickness: 30 mm
Residual magnetic flux density of permanent magnet in rotor 1.1T FIGS. 2-1 and 2-2 are diagrams illustrating, in a tabular form, a measurement result of a loss when a rotation speed ratio of the motor M is 1.00. The rotation speed ratio is a ratio of a rotation speed at the time of measurement with respect to a maximum rotation speed of the motor M. The rotation speed ratio of 1.00 indicates that the measurement is performed at the same rotation speed as the maximum rotation speed. FIGS. 2-1($a$), 2-1($b$), 2-1($c$), 2-2($a$), and 2-2($b$) illustrate measurement results when the torque ratios are 0.05, 0.125, 0.25, 0.375, and 0.5, respectively. The torque ratio is a ratio of a torque at the time of measurement with respect to a maximum torque of the motor M. The torque ratio of 0.5 indicates that the measurement is performed at the torque of 50% of the maximum torque. Here, the maximum rotation speed and the maximum torque of the motor M are appropriately designed and determined according to an application of the motor M.

In FIGS. 2-1 and 2-2, fc represents the carrier frequency. Here, a ratio of the output power of the motor M with respect to the input power of the inverter 50 is referred to as the total efficiency. In FIGS. 2-1 and 2-2, the highest total efficiency is obtained when the torque ratio is 0.5 and the carrier frequency fc is 40 kHz (fc=40 kHz in FIG. 2-2($b$)). In FIGS. 2-1 and 2-2, a total efficiency ratio is a ratio of the total efficiency at each carrier frequency fc with respect to the maximum total efficiency in the same rotation speed ratio.

Further, a sum of the copper loss and the iron loss of the motor M and the loss of the inverter 50 is referred to as a total loss. In FIGS. 2-1 and 2-2, a total loss ratio is a ratio of the total loss at each carrier frequency fc with respect to the total loss when the carrier frequency fc is the lowest (here, 5 kHz) in the same rotation speed ratio and the same torque ratio.

Further, in FIGS. 2-1 and 2-2, a copper loss ratio is a ratio of the copper loss of the motor M at each carrier frequency fc with respect to the total loss when the carrier frequency fc is the lowest (here, 5 kHz) in the same rotation speed ratio and the same torque ratio. An iron loss ratio is a ratio of the iron loss of the motor M at each carrier frequency fc with respect to the total loss when the carrier frequency fc is the lowest (here, 5 kHz) in the same rotation speed ratio and the same torque ratio. An inverter loss ratio is a ratio of a loss of the inverter 50 at each carrier frequency fc with respect to the total loss when the carrier frequency fc is the lowest (here, 5 kHz) in the same rotation speed ratio and the same torque ratio.

Figure 3:
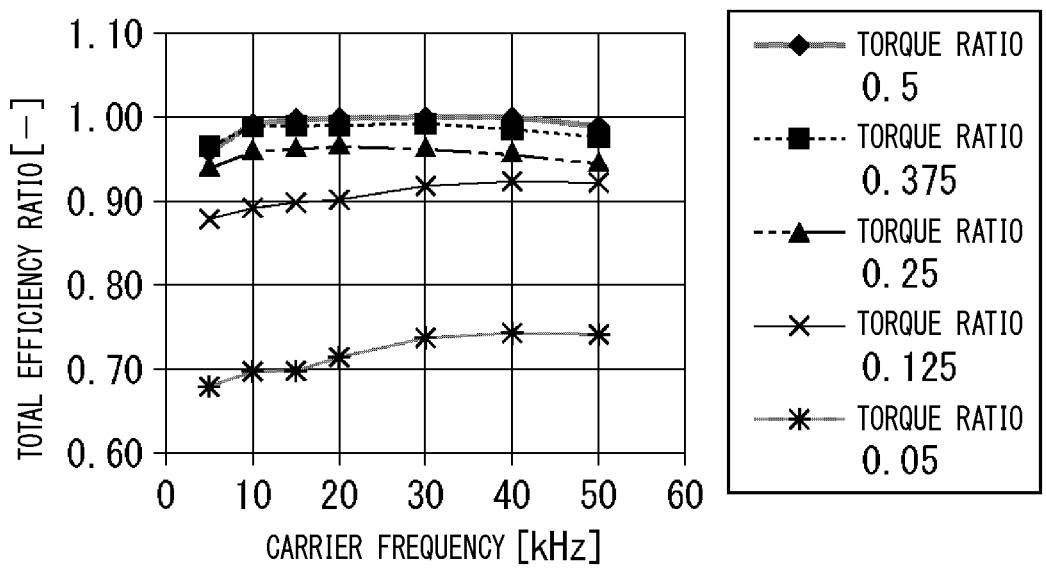
FIG. 3 is a diagram illustrating the first embodiment and is a diagram illustrating, in a graph form, a relationship between a total efficiency ratio and a carrier frequency when the rotation speed ratio of the motor is 1.00.

FIG. 3 is a diagram illustrating, in a graph form, a relationship between the total efficiency ratio and the carrier frequency illustrated in FIGS. 2-1 and 2-2.

As illustrated in FIGS. 2-1, 2-2, and 3, under a condition that the torque ratio is relatively small (torque ratio is 0.05 or 0.125), the total efficiency ratio is largest when the carrier frequency is 40 kHz. Meanwhile, under a condition that the torque ratio is 0.25, the total efficiency ratio is the largest when the carrier frequency is 20 kHz. Under a condition that the torque ratio is larger (torque ratio is 0.375 or 0.5), the total efficiency ratio is largest when the carrier frequency is 30 kHz or 40 kHz, and as the torque ratio increases, the carrier frequency at which the total efficiency ratio is maximum increases. In the following description, the carrier frequency at which the total efficiency is maximum (the total loss is minimum) in the same torque ratio will be referred to as an optimum carrier frequency as necessary. Moreover, in FIG. 2-2($b$), the total efficiency ratios when the carrier frequencies are 30 kHz and 40 kHz are both 1.000. However, when calculated up to a fourth decimal place, the total efficiency ratio (1.0000) when the carrier frequency is 40 kHz is larger than the total efficiency ratio (0.9997) when the carrier frequency is 30 kHz.

As described above, it can be seen that when the rotation speed ratio of the motor M is 1.00, the optimum carrier frequency has the lowest value in the relationship between the optimum carrier frequency and the torque of the motor M. Further, it can be seen that a torque range corresponding to the carrier frequency having the lowest value is only one (the torque ratio is only 0.250). Then, in a range in which the torque of the motor M is equal to or more than the torque of the motor M corresponding to the lowest optimum carrier frequency, it can be seen that the optimum carrier frequency is constant or increases as the torque of the motor M increases. In a range where the torque of the motor M is equal to or less than the torque of the motor M corresponding to the lowest optimum carrier frequency, it can be seen that the optimum carrier frequency is constant or decreases as the torque of the motor M increases. As described above, in the techniques described in Patent Documents 2 and 3, the carrier frequency decreases when the torque of the motor M increases. The present inventors have for the first time found that, in the relationship between the optimum carrier frequency and the torque of the motor M derived for each rotation speed of the motor, the lowest value exists in the optimum carrier frequency, the optimum carrier frequency needs to be constant or increased as the torque of the motor M increases in a range which is equal to or more than the torque of the motor M corresponding to the lowest optimum carrier frequency, and the carrier frequency is constant or decreases as the torque of the motor M increases as the torque of the motor M increases in a range which is equal to or less than the torque of the motor M corresponding to the lowest optimum carrier frequency, and thus, the total efficiency of the motor driving system can be improved.

Therefore, the present inventors have examined factors which can improve the efficiency of the motor driving system by increasing the carrier frequency under a condition that the torque of the motor M is large.

Figures 1, 4:
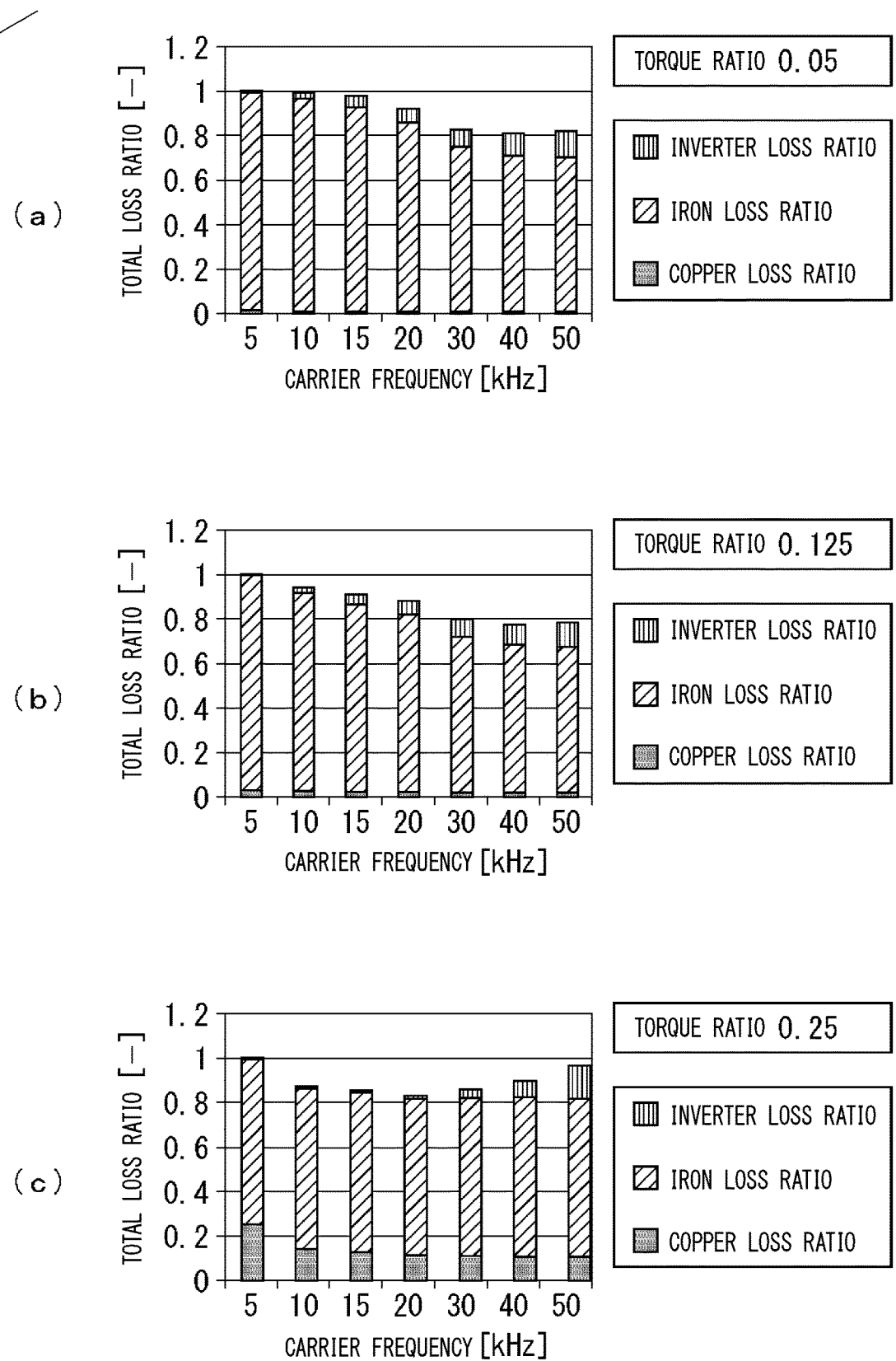
Figure 4:
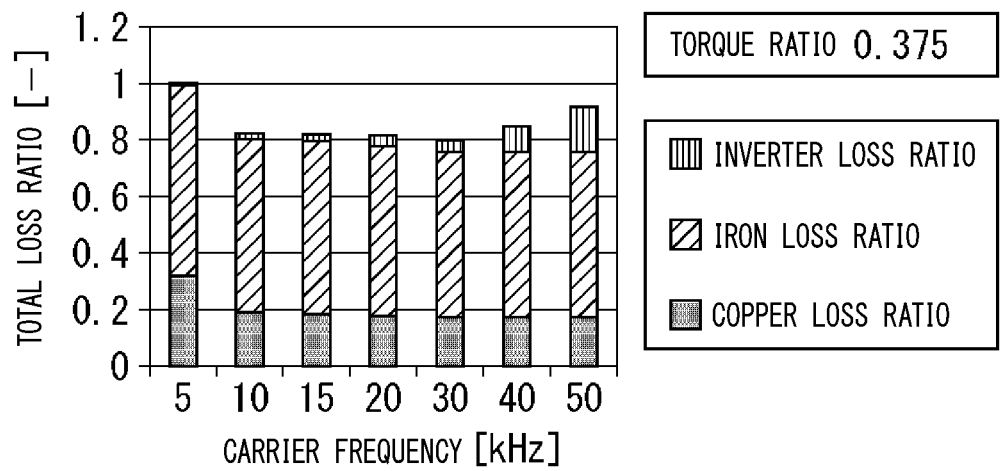

FIGS. 4-1 and 4-2 are diagrams illustrating, in a graph form, a relationship between the total loss ratio and the carrier frequency illustrated in FIGS. 2-1 and 2-2. FIGS. 4-1(a), 4-1(b), 4-1(c), 4-2(a), and 4-2(b) respectively illustrate results when the torque ratios are 0.05, 0.125, 0.25, 0.375, and 0.5 (FIGS. 2-1(a), 2-1(b), 2-1(c), 2-2(a), and 2-2(b)).

As illustrated in FIGS. 4-1(a) and 4-1(b), under the condition that the torque ratio is 0.05 or 0.125 (hereinafter, referred to as a low load condition), the ratio of the iron loss of the motor M with respect to the total loss is large. Therefore, it is possible to reduce the iron loss of the motor M by increasing the carrier frequency. When the carrier frequency increases, the loss of the inverter 50 increases. Further, the sum of the iron loss ratio and the copper loss ratio gradually decreases and approaches a constant value as the carrier frequency increases. The carrier frequency at which the total loss is minimized is determined by a counterbalance between the decrease in the loss of the motor M and the increase in the loss of the inverter 50 as described above. Therefore, it is considered that the optimum carrier frequency is 40 kHz when the torque ratio is 0.05 or 0.125.

Next, as illustrated in FIG. 4-1(c), in a condition that the torque ratio is 0.25 (hereinafter, referred to as a medium load condition), the ratio of the copper loss of the motor M with respect to the total loss is larger than that under the low load condition illustrated in FIG. 4-1(a) and FIG. 4-2(b). Further, as in the case of the low load condition, the sum of the iron loss ratio and the copper loss ratio approaches a certain value while gradually decreasing as the carrier frequency increases. However, the carrier frequency at which the sum of the iron loss ratio and the copper loss ratio is substantially constant is 20 kHz, and the carrier frequency is lower than that under the low load condition. Further, as in the low load condition, the loss of the inverter 50 increases as the carrier frequency increases. However, when the carrier frequency is 20 kHz or more, an increase amount of the loss of the inverter 50 with respect to the increase of the carrier frequency is larger (the increase in the loss of the inverter 50 is steeper) than that under the low load condition (when the carrier frequency is 40 kHz or more). In the counterbalance of the decrease in the loss of the motor M and the increase in the loss of the inverter 50 as described above, the carrier frequency at which the total loss is minimized is determined, and the carrier frequency is lower than that under the low load condition. Therefore, it is considered that the optimum carrier frequency is 20 kHz when the torque ratio is 0.25.

Next, as illustrated in FIGS. 4-2(a) and 4-2(b), under a condition that the torque ratio is 0.375 or 0.5 (hereinafter, referred to as a high load condition), the ratio of the copper loss of the motor M to the total loss is larger than that under the medium load condition illustrated in FIG. 4-1(c). In addition, even under the high load condition, as in the cases of the low load condition and the medium load condition, as the carrier frequency increases, while the sum of the iron loss ratio and the copper loss ratio approaches a certain value while gradually decreasing, the inverter loss ratio increases. Further, as the torque of the motor M increases, the inverter loss ratio at each carrier frequency increases.

When the torque of the motor M increases (that is, when the load increases), the motor current required to generate the torque increases. Therefore, a higher carrier frequency is required to perform a waveform control with high accuracy by the PWM control. That is, under the high load condition, the copper loss of the motor M is larger than that under the medium load condition due to the increase of the motor current, and under a condition in which the carrier frequency is low, a waveform of a magnetic flux density is distorted and many harmonic components are generated. Accordingly, the iron loss of the motor M increases as compared with the medium load condition.

In the counterbalance of the decrease in the loss of the motor M and the increase in the loss of the inverter 50 as described above, the carrier frequency at which the total loss is minimized is determined, and the carrier frequency is higher than that under the medium load condition. Further, the carrier frequency increases as the torque of the motor M increases. Therefore, it is considered that when the torque ratios are 0.375 and 0.5, the optimum carrier frequencies are 30 kHz and 40 kHz, respectively.

As described above, in the case where the rotation speed ratio of the motor M is 1.00, in the range in which the torque of the motor M is equal to or less than the torque of the motor M corresponding to the lowest optimum carrier frequency, when the torque of the motor M increases, the optimum carrier frequency is set to be constant or decreased, and in the range in which the torque of the motor M is equal or more than the torque of the motor M corresponding to the lowest optimum carrier frequency, when the torque of the motor M increases, the optimum carrier frequency is set to be constant or increased. Accordingly, it is possible to maximize the efficiency (minimize the loss) of the overall motor driving system.

Next, the present inventors have confirmed that a lowest value exists for the optimum carrier frequency in the relationship between the optimum carrier frequency and the torque of the motor M regardless of the rotation speed of the motor M, and in the range equal or more than the torque of the motor M corresponding to the lowest optimum carrier frequency, as the torque of the motor M increases, the optimum carrier frequency needs to be constant or increased. This is illustrated in FIGS. 5-1 to 13-3. Contents of items in tables of FIGS. 5-1 to 5-3, 8-1 to 8-3, and 11-1 to 11-3 are the same as the contents of the items of the tables illustrated in FIGS. 2-1 and 2-2.

"FIGS. 5-1 to 5-3", FIGS. "8-1 to 8-3", and "FIGS. 11-1 to 11-3" are diagrams illustrating, in a tabular form, the measurement results of the losses when the rotation speed ratios of the motor M are 0.75, 0.50, and 0.25. "FIG. 5-1(a), FIG. 8-1(a), and FIG. 11-1(a)", "FIG. 5-1(b), FIG. 8-1(b), and FIG. 11-1(b)", "FIG. 5-1(c), FIG. 8-1(c), and FIG. 11-1(c)", "FIG. 5-2(a), FIG. 8-2(a), and FIG. 11-2(a)", "FIG. 5-2(b), FIG. 8-2(b), and FIG. 11-2(b)", "FIG. 5-2(c), FIG. 8-2(c), and FIG. 11-2(c)", "FIG. 5-3(a), FIG. 8-3(a), and FIG. 11-3(a)", "FIG. 5-3(b), FIG. 8-3(b), and FIG. 11-3(b)", and "FIG. 5-3(c), FIG. 8-3(c), and FIG. 11-3(c)" illustrate the measurement results when the torque ratios are 0.05, 0.125, 0.25, 0.375, 0.5, 0.625, 0.75, 0.875, and 1.0. Moreover, when the rotation speed ratio of the motor M is 0.75 or less, the torque of the motor M can be applied up to the maximum torque.

Figure 6:
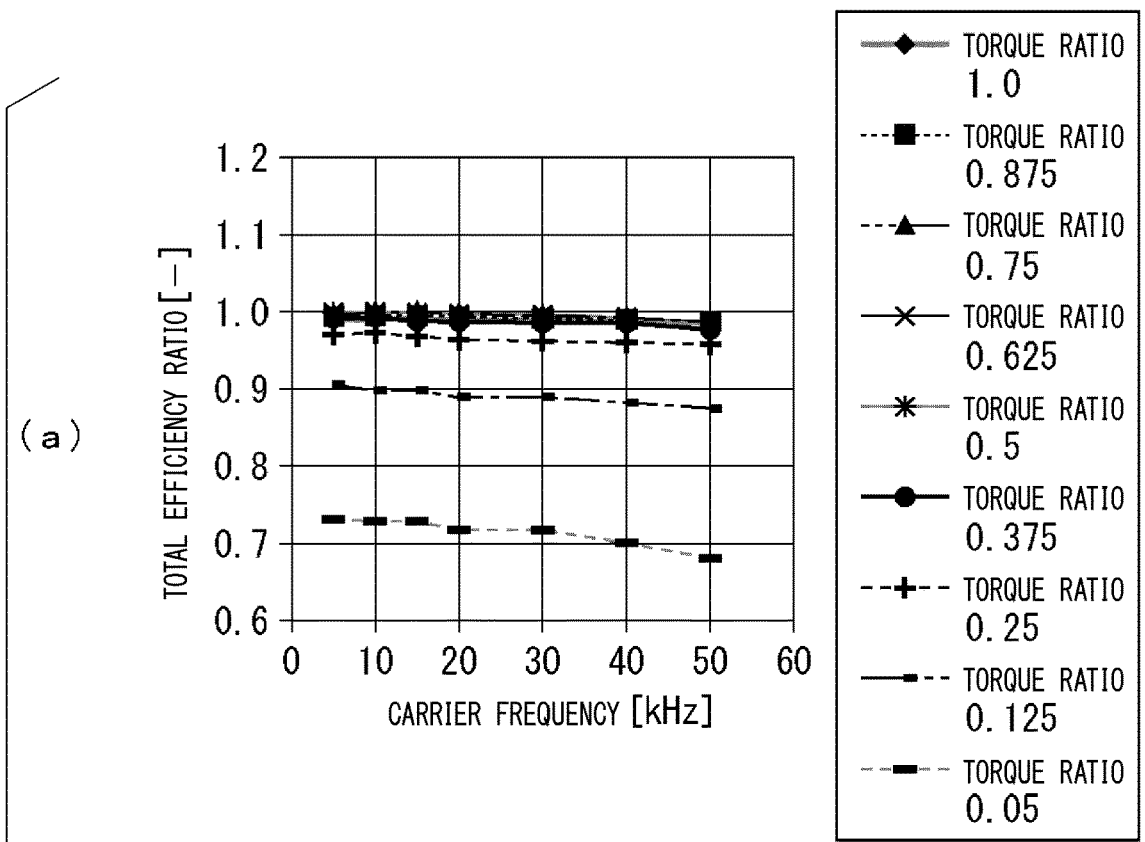
FIG. 6 is a diagram illustrating the first embodiment and is a diagram illustrating, in a graph form, a relationship between a total efficiency ratio and a carrier frequency when the rotation speed ratio of the motor is 0.75.
Figure 6:
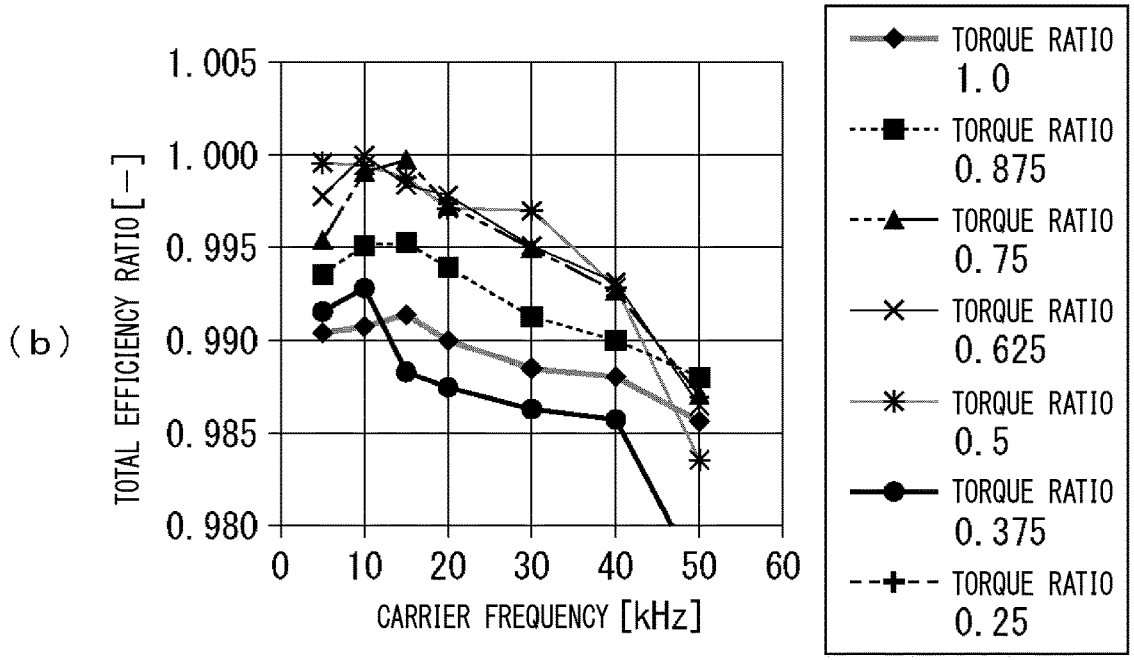
Figures 1, 7:
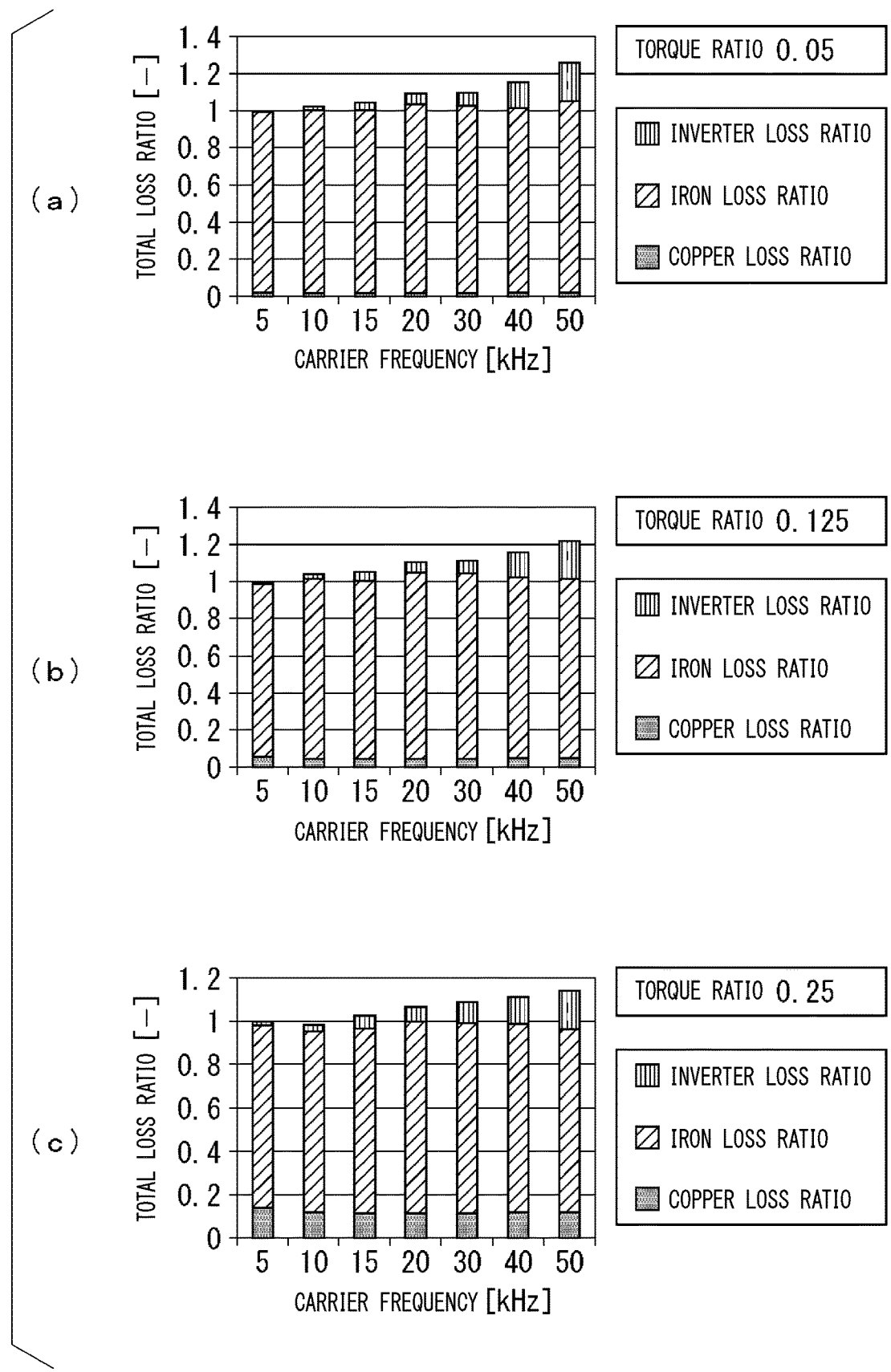
Figures 2, 7:
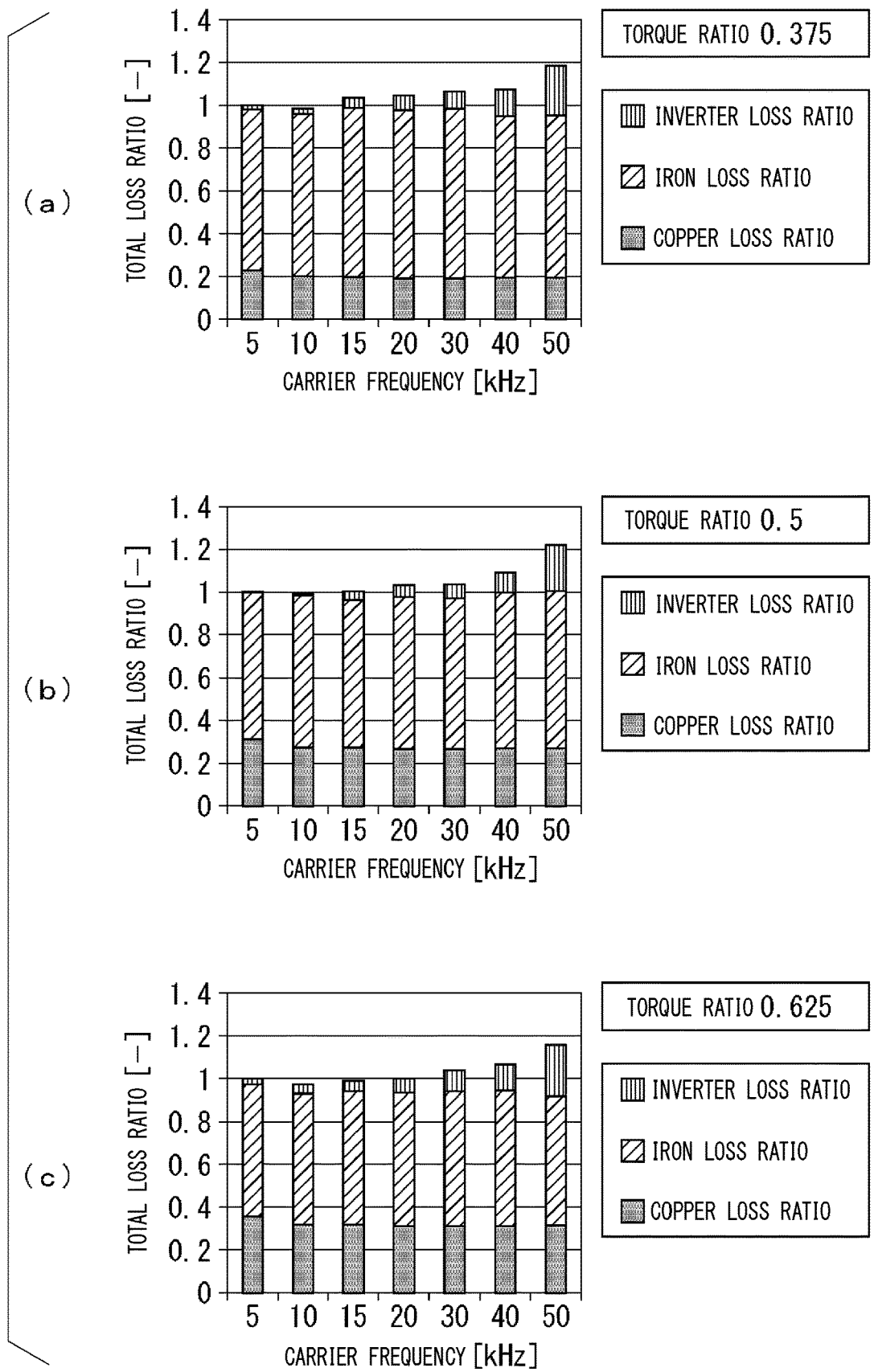
Figures 3, 7:
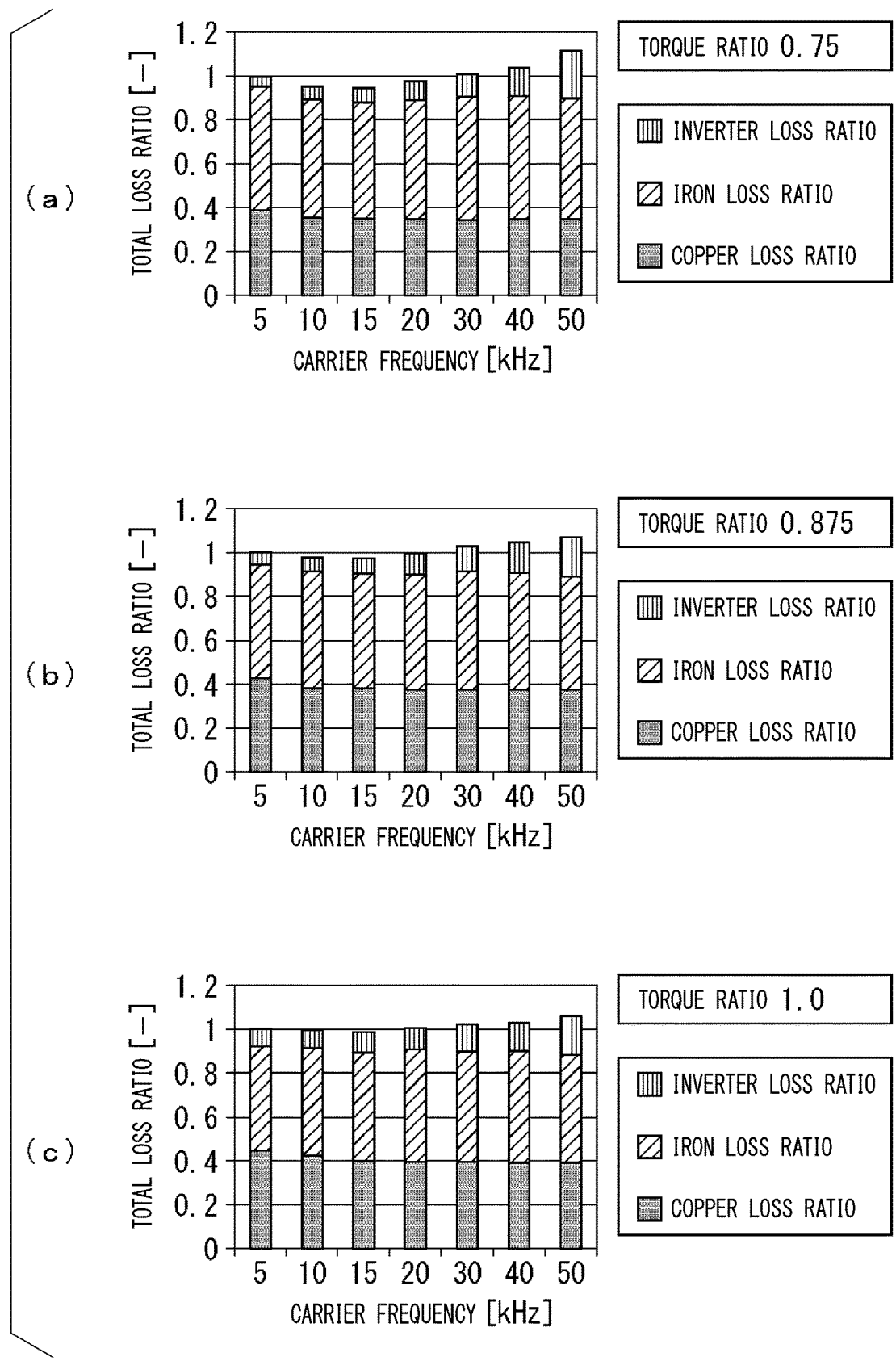
Figure 9:
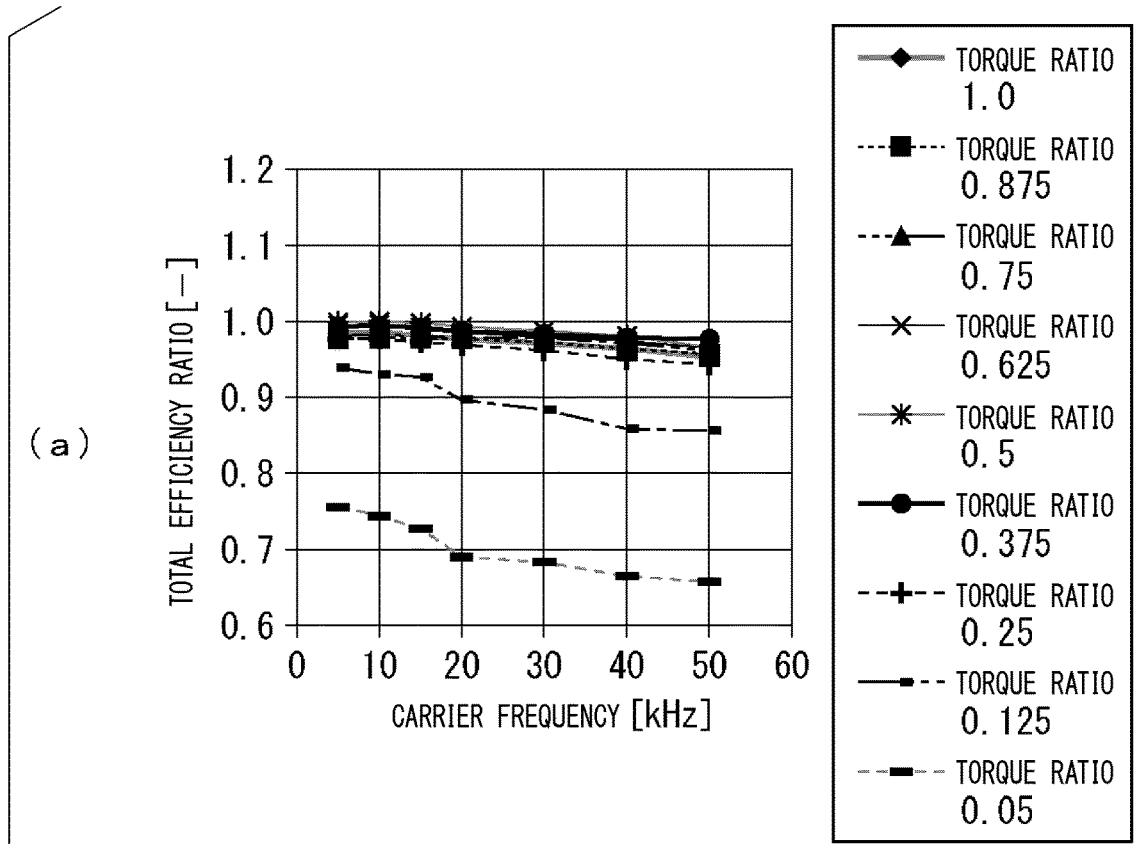
FIG. 9 is a diagram illustrating the first embodiment and is a diagram illustrating, in a graph form, a relationship between a total efficiency ratio and a carrier frequency when the rotation speed ratio of the motor is 0.50.
Figure 9:
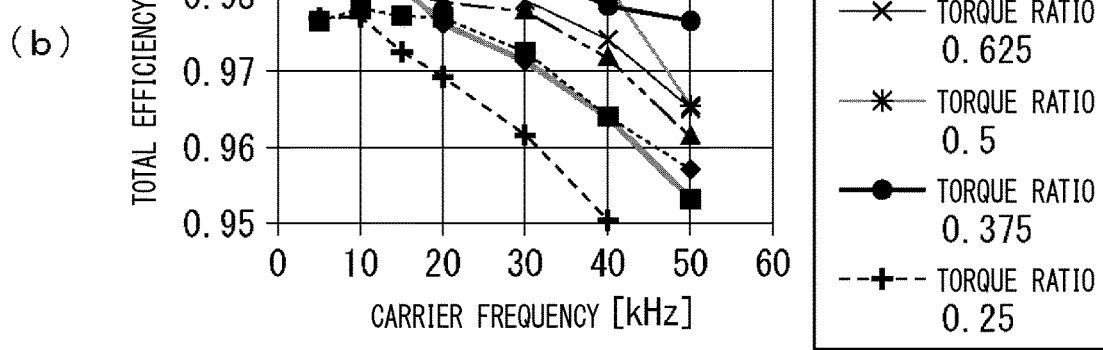
Figures 1, 10:
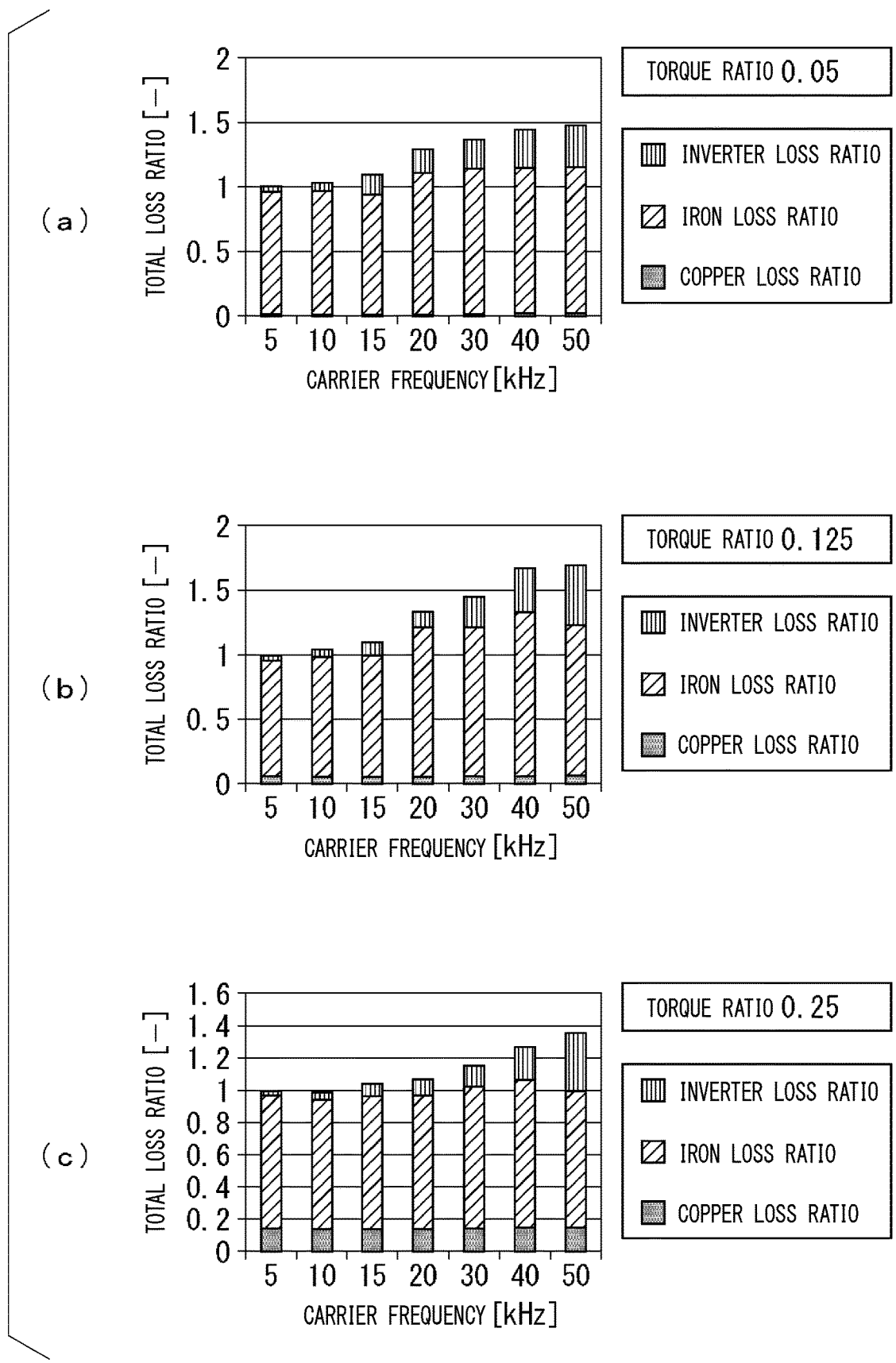
Figures 2, 10:
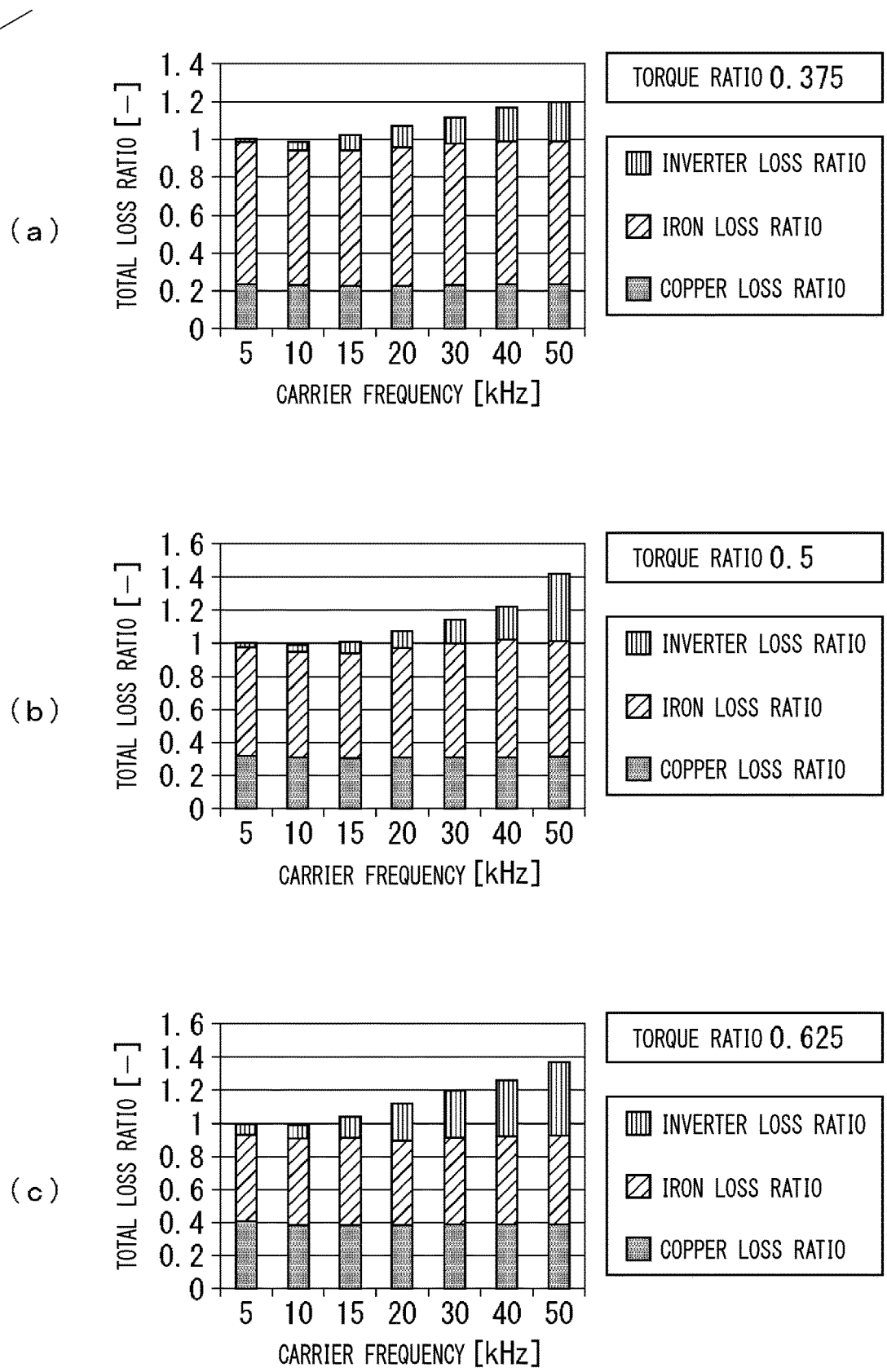
Figures 3, 10:
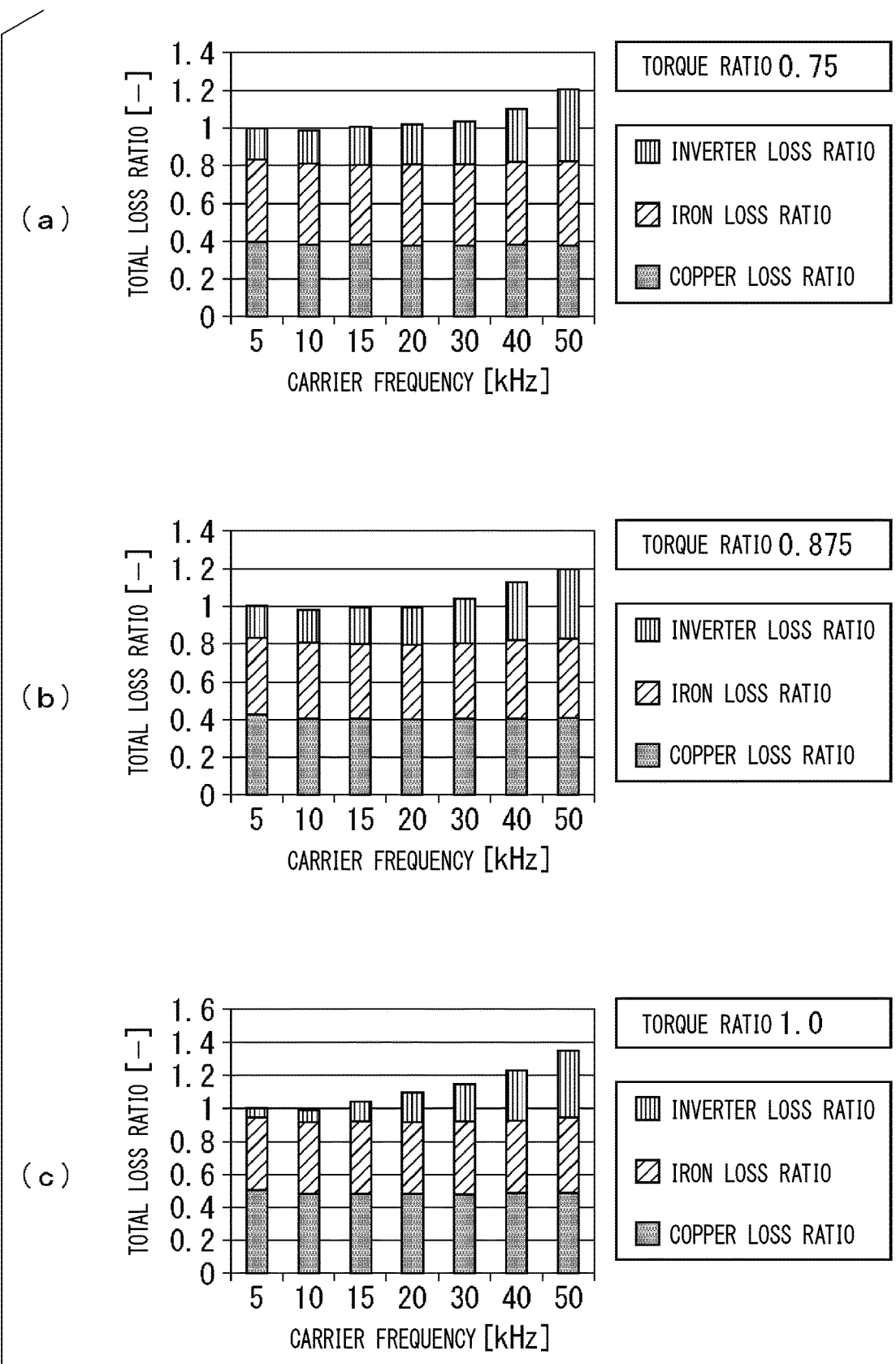
Figure 12:
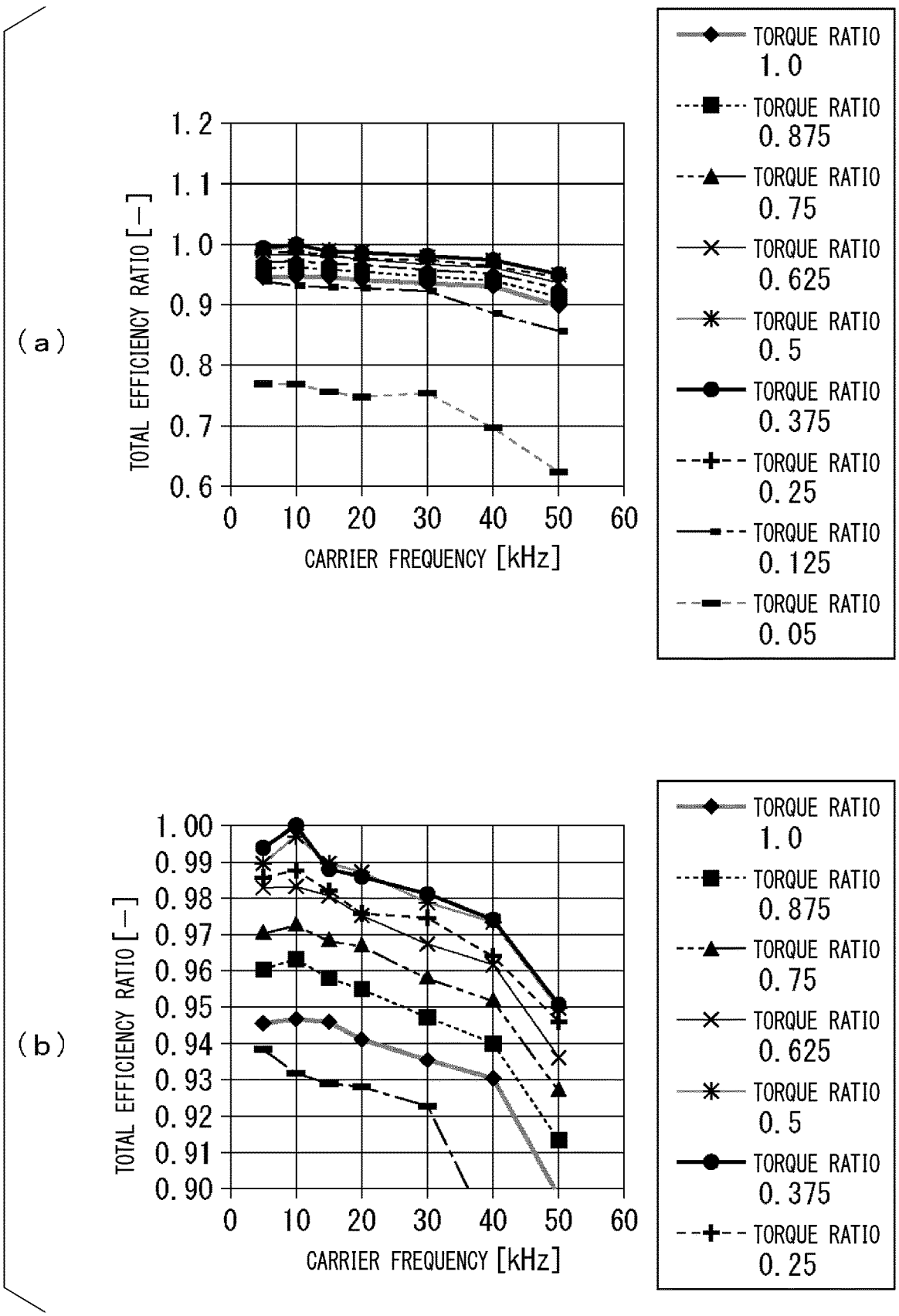
FIG. 12 is a diagram illustrating the first embodiment and is a diagram illustrating, in a graph form, a relationship between a total efficiency ratio and a carrier frequency when the rotation speed ratio of the motor is 0.25.
Figures 1, 13:
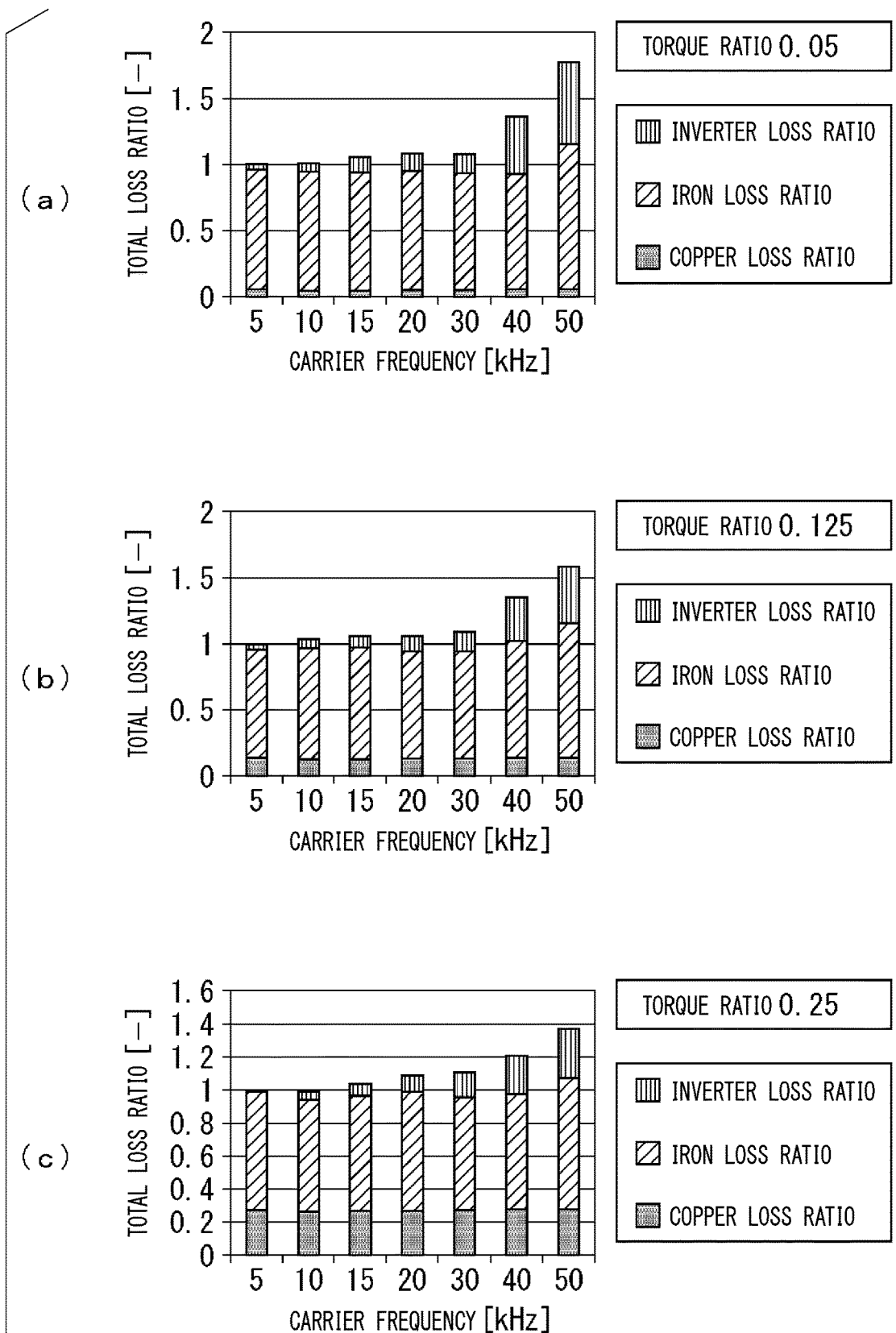
Figures 2, 13:
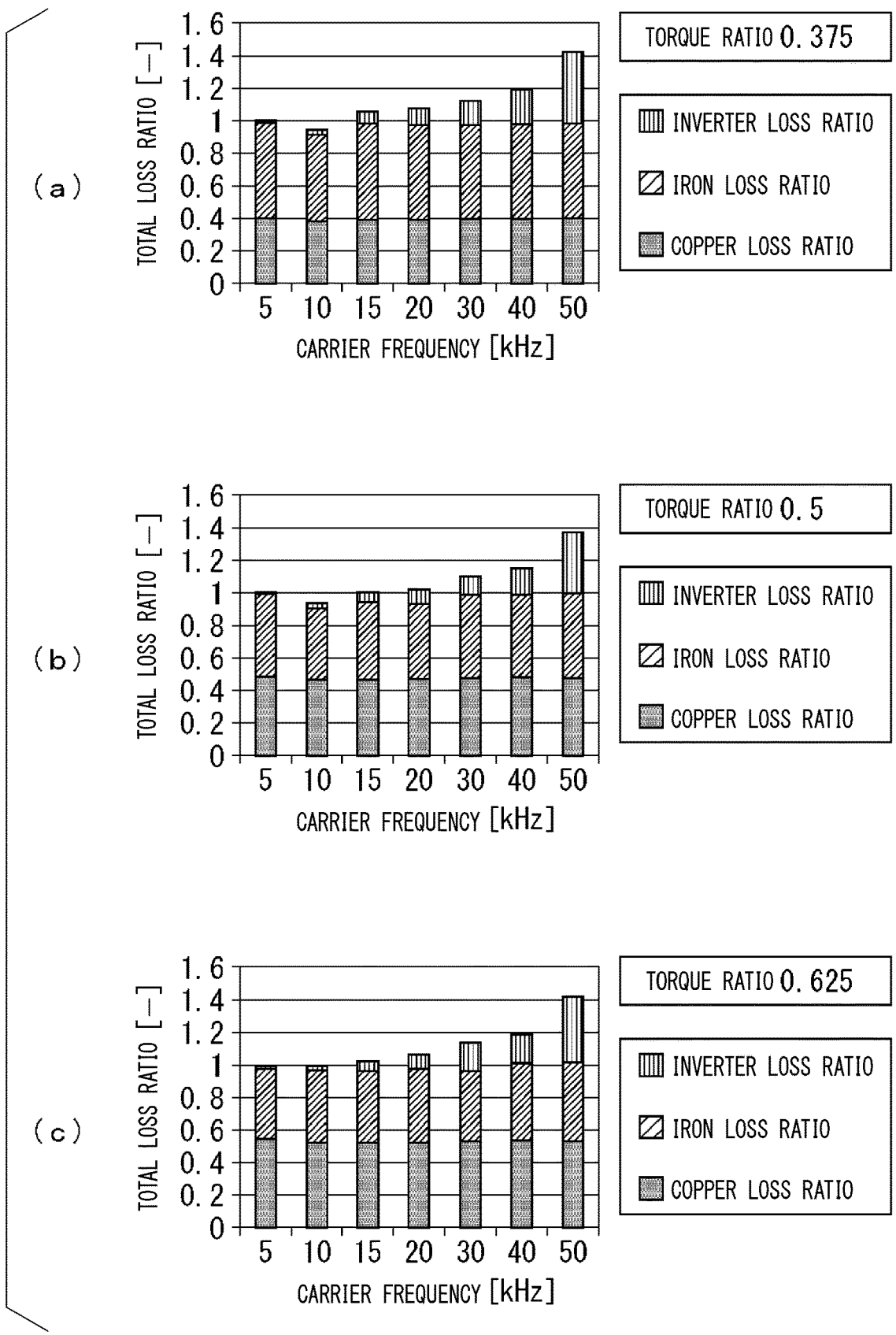
Figures 3, 13:
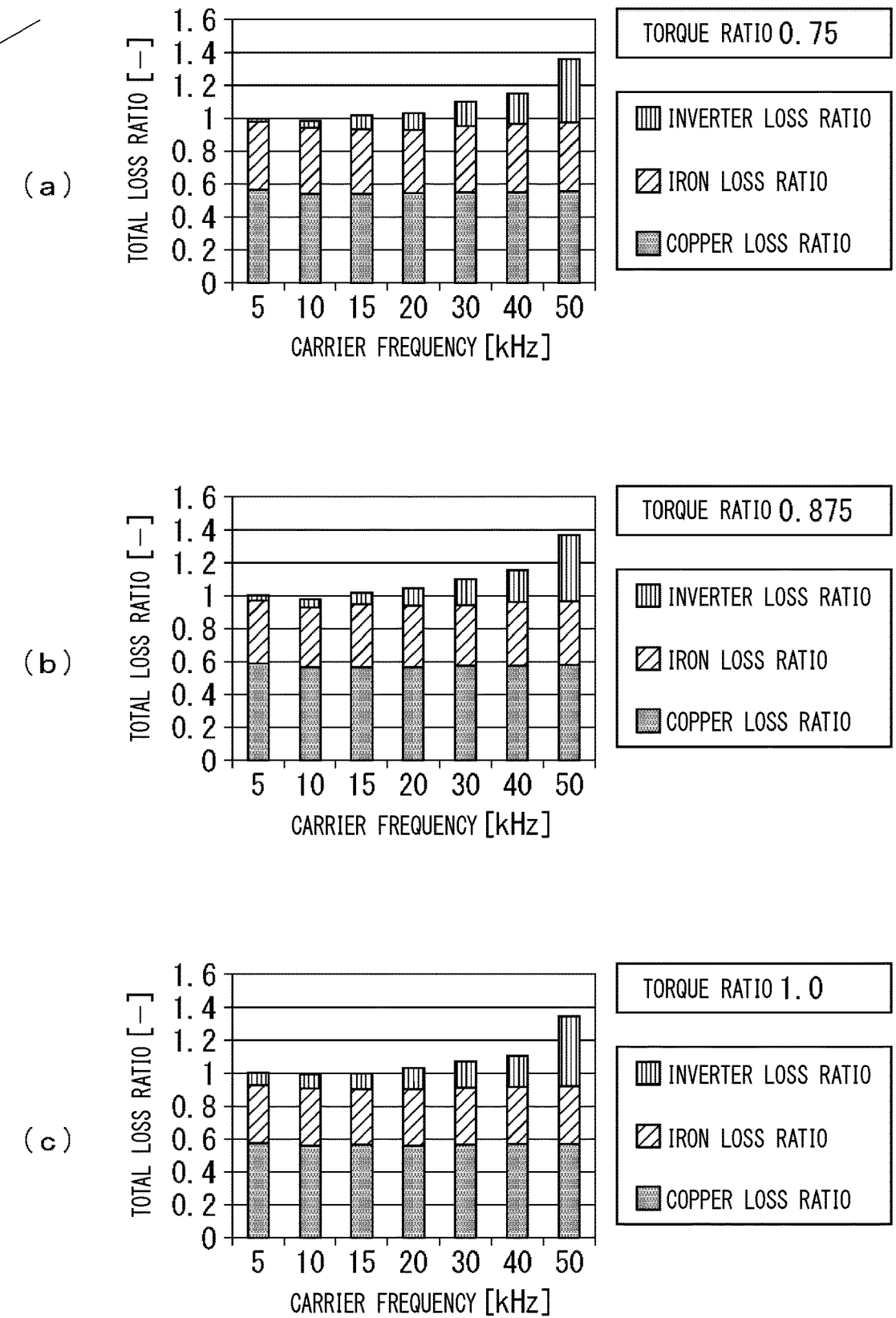

Further, FIGS. 6, 9, and 12 are diagrams illustrating, in a graph form, a relationship between the total efficiency ratio and the carrier frequency illustrated in FIGS. 5-1 to 5-3, 8-1 to 8-3, and 11-1 to 11-3. FIG. 6(b) is an enlarged view of a region where the total efficiency ratio is 0.980 to 1.005 in FIG. 6(a). FIG. 9(b) is an enlarged view of a region where the total efficiency ratio is 0.95 to 1.01 in FIG. 9(a). FIG. 12(b) is an enlarged view of a region where the total efficiency ratio is 0.90 to 1.00 in FIG. 12(a).

FIGS. 7-1 to 7-3, FIGS. 10-1 to 10-3, and FIGS. 13-1 to 13-3 are diagrams illustrating, a graph form, relationships between the total loss ratios and the carrier frequencies illustrated in FIGS. 5-1 to 5-3, FIGS. 8-1 to 8-3, and FIGS.

11-1 to 11-3. "FIG. 7-1(a), FIG. 10-1(a), and FIG. 13-1(a)", "FIG. 7-1(b), FIG. 10-1(b), and FIG. 13-1(b)", "FIG. 7-1(c), FIG. 10-1(c), and FIG. 13-1(c)", "FIG. 7-2(a), FIG. 10-2(a), and FIG. 13-2(a)", "FIG. 7-2(b), FIG. 10-2(b), and FIG. 13-2(b)", "FIG. 7-2(c), FIG. 10-2(c), and FIG. 13-2(c)", "FIG. 7-3(a), FIG. 10-3(a), and FIG. 13-3(a)", "FIG. 7-3(b), FIG. 10-3(b), and FIG. 13-3(b)", "FIG. 7-3(c), FIG. 10-3(c), and FIG. 13-3(c)" illustrate results when the torque ratios are 0.05, 0.125, 0.25, 0.375, 0.5, 0.625, 0.75, 0.875. 1.0.

As illustrated in FIGS. 5-1 to 13-3, even when the rotation speed ratio of the motor M is 0.25, 0.50, or 0.75, as in the case where the rotation speed ratio is 1.00, it can be seen that in the relationship between the optimum carrier frequency and the torque of the motor M, the lowest value exists in the optimum carrier frequency, and in the range in which the torque of the motor M is equal to or more than the torque of the motor M corresponding to the lowest optimum carrier frequency, it can be seen that as the torque of the motor M increases, the optimum carrier frequency is constant or increases. Moreover, in FIG. 5-2(b), the total efficiency ratios when the carrier frequencies are 10 kHz and 15 kHz are both 0.999. However, when calculated up to the fourth decimal place, the total efficiency ratio when the carrier frequency is 10 kHz is larger than the total efficiency ratio when the carrier frequency is 15 kHz. Further, in FIGS. 5-3(b) and 5-3(c), the total efficiency ratios when the carrier frequencies are 10 kHz and 15 kHz are 0.995 and 0.991, respectively. However, when calculated up to the fourth decimal place, the total efficiency ratio when the carrier frequency is 15 kHz is larger than the total efficiency ratio when the carrier frequency is 10 kHz. Further, in FIGS. 8-1(c) and 11-2(c), the total efficiency ratios when the carrier frequencies are 5 kHz and 10 kHz are 0.977 and 0.983, respectively. However, when calculated up to the fourth decimal place, the total efficiency ratio when the carrier frequency is 10 kHz is larger than the total efficiency ratio when the carrier frequency is 5 kHz.

An excitation fundamental frequency when the rotation speed ratio of the motor M is 0.25, 0.50, or 0.75 is lower than an excitation fundamental frequency when the rotation speed ratio of the motor M is 1.00. Therefore, an effect of reducing the sum of the copper loss ratio and the iron loss ratio by increasing the carrier frequency decreases (in some cases, due to a variation in the measurement, or the like, the sum of the copper loss ratio and the iron loss ratio increases as the carrier frequency increases). Accordingly, as when the rotation speed ratio of the motor M is 1.00, when the rotation speed ratio of the motor M is 0.25, 0.50, or 0.75, in the torque of the motor M, there is no range smaller than the torque of the motor M corresponding to the lowest optimum carrier frequency, and when the torque of the motor M increases, the optimum carrier frequency is set to be constant or increased, and thus, it is possible to maximize (minimize the loss) the efficiency of the overall motor driving system.

TABLE 1

|  |  | Rotation speed ratio [—] | | | |
|---|---|---|---|---|---|
|  |  | 0.25 | 0.50 | 0.75 | 1.00 |
| Torque ratio [—] | 0.050 | 5 | 5 | 5 | 40 |
|  | 0.125 | 5 | 5 | 5 | 40 |
|  | 0.250 | 10 | 10 | 10 | 20 |
|  | 0.375 | 10 | 10 | 10 | 30 |
|  | 0.500 | 10 | 10 | 10 | 40 |
|  | 0.625 | 10 | 10 | 10 |  |
|  | 0.750 | 10 | 10 | 15 |  |
| TABLE 1-continued | | | | | |
|  |  | 0.25 | 0.50 | 0.75 | 1.00 |
|  | 0.875 | 10 | 10 |  |  |
|  | 1.000 | 10 | 10 |  |  |

Table 1 illustrates the above results. Table 1 illustrates the optimum carrier frequency for each torque ratio and each rotation speed ratio of the motor M, which are obtained from the results illustrated in FIGS. 2-1 to 13-2. Here, a case where an interval at which the torque ratio is changed is set to 0.125 (or 0.075) is illustrated as an example. If the interval at which the torque ratio is changed is smaller than the intervals illustrated in FIGS. 2-1 to 2-2, 5-1 to 5-3, 8-1 to 8-3, and 11-1 to 11-3, due to a variation in the measurement or the like, even in a range of the torque ratio where the optimum carrier frequency is constant in Table 1, the optimum carrier frequency may (slightly) increase or decrease. For example, when the rotation speed ratio of the motor is 0.25, the optimum carrier frequency is 5 kHz in the torque ratio range of 0.05 to 0.125. However, when the torque ratio is 0.05 to 0.125, the optimum carrier frequency may increase or decrease with respect to 5 kHz. Therefore, in the above descriptions, in order to maximize the total efficiency of the motor driving system, in a range of the torque ratio deriving a relationship that the optimum carrier frequency has a constant value even if the torque of the motor M is changed, it is not necessary to set the carrier frequency to be completely the same as the optimum carrier frequency, and it is sufficient if they are substantially the same as each other.

A difference of about 5% in the carrier frequency has little influence on the value of the optimum carrier frequency at which the total loss is minimized Therefore, "substantially the same" in the present specification means that a "difference in carrier frequency is 5% or less".

As is clear from Table 1, regardless of the rotation speed ratio of the motor M, the relationship between the torque of the motor M and the optimum carrier frequency has a portion in which the optimum carrier frequency increases as the torque of the motor M increases. For example, when the rotation speed ratio of the motor M is 0.75, the optimum carrier frequency is changed from 5 kHz to 10 kHz when the torque ratio is changed from 0.125 to 0.250 and the torque of the motor M increases, and thus, the optimum carrier frequency increases. Further, when the torque ratio is changed from 0.625 to 0.750 and the torque of the motor M increases, the optimum carrier frequency is changed from 10 kHz to 15 kHz, and thus, optimum carrier frequency increases. Further, in the case where the rotation speed ratio of the motor M is 1.00, when the torque ratio is changed from 0.250 to 0.375 or 0.375 to 0.500 and the torque of the motor M increases, the optimum carrier frequency is changed from 20 kHz to 30 kHz or from 30 kHz to 40 kHz, and thus, the optimum carrier frequency increases. Further, when the rotation speed ratio of the motor M is 1.00, there is a portion in which the optimum carrier frequency decreases as the torque of the motor M increases. Specifically, when the torque ratio is changed from 0.125 to 0.250 and the torque of the motor M increases, the optimum carrier frequency is changed from 40 kHz to 20 kHz, and thus, the optimum carrier frequency decreases.

Further, it is understood that the range of the torque ratio corresponding to the optimum carrier frequency having the lowest value is only one, regardless of the rotation speed ratio of the motor M. For example, when the rotation speed ratio of the motor M is 0.75, the optimum carrier frequency has the lowest value of 5 kHz in the range of the torque ratio of 0.05 to 0.125, and the value of the optimum carrier frequency is higher than 5 kHz in other torque ratio ranges. Further, in the case where the rotation speed ratio of the motor M is 1.00, the optimum carrier frequency has the lowest value of 20 kHz when the torque ratio is 0.250, and the value of the optimum carrier frequency is higher than 20 kHz in other torque ratio ranges. Therefore, in the range where the torque ratio of the motor M is smaller than the range of the torque ratio corresponding to the lowest optimum carrier frequency, when the torque ratio of the motor M increases, the optimum carrier frequency is set to be constant or decreased, or in the range where the torque ratio of the motor M is larger than the range of the torque ratio corresponding to the lowest optimum carrier frequency, when the torque ratio of the motor M increases, the optimum carrier frequency is set to be constant or increased. Accordingly, the efficiency of the overall motor driving system can be maximized (the loss can be minimized).

The present inventors have confirmed that also in other IPMSMs or inverters 50, there is a torque range in which the efficiency of the overall motor driving system is maximized (the loss is minimized) by setting the optimum carrier frequency to be substantially constant or increased when the torque of the motor M increases.

Further, a value of a sum of the inverter loss ratio, the iron loss ratio, and the copper loss ratio is changed according to a type of the inverter or the motor M. However, it is considered that a behavior of the change of the sum of the inverter loss ratio, the iron loss ratio, and the copper loss ratio with respect to the change of the carrier frequency is not greatly changed according to the type of the motor M. Therefore, it is considered that the fact that the efficiency of the overall motor driving system can be maximized (the loss is minimized) by setting the carrier frequency to be substantially constant or increased as the torque of the motor M increases is not limited to the IPMSM and is similarly applied to other types of motors M as well.

Figure 14:
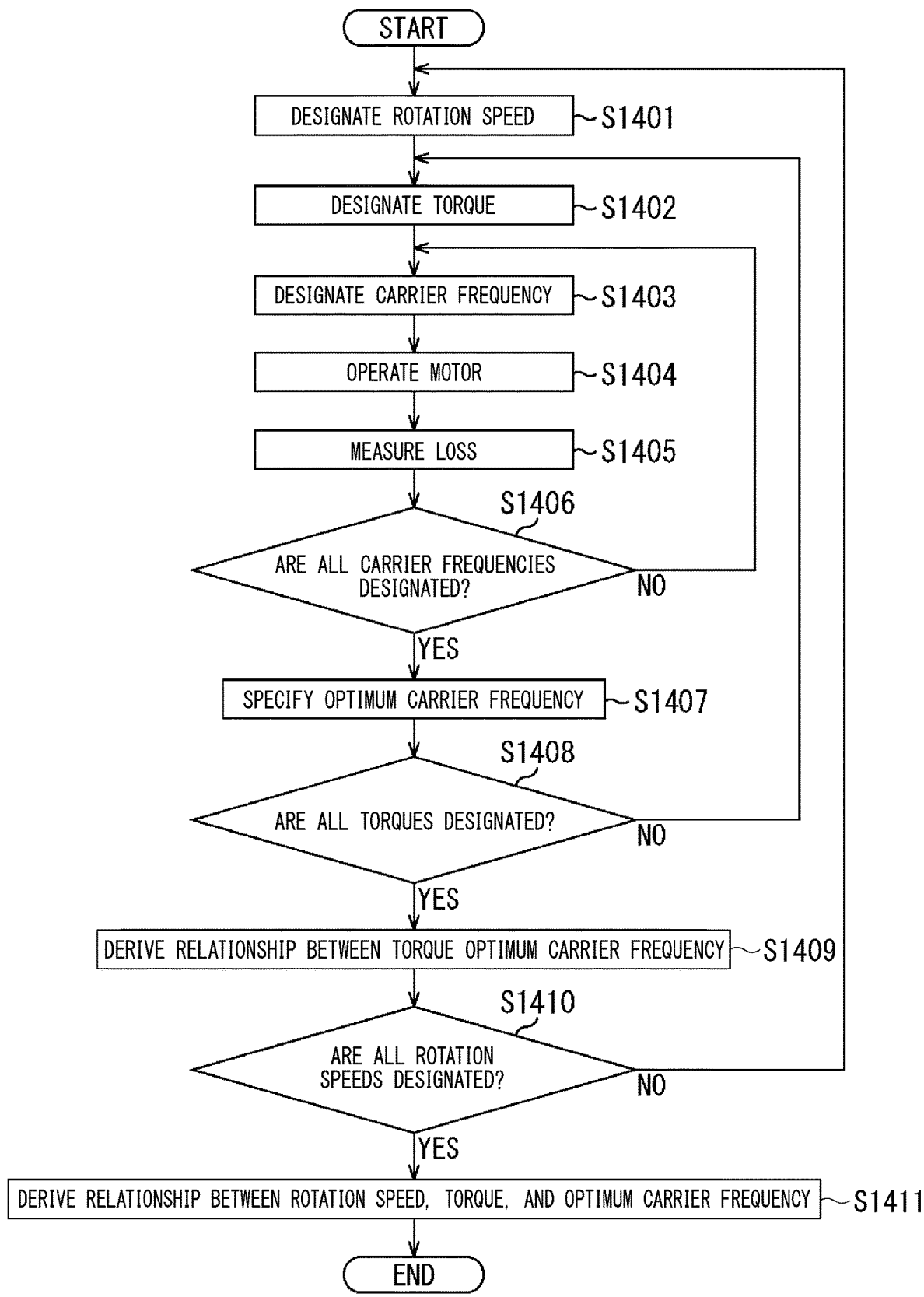
FIG. 14 is a flowchart illustrating an example of a method of deriving a relationship between a torque of a motor M and a carrier frequency for each rotation speed of the motor M.

As described above, the carrier frequency setting unit 75 sets the carrier frequency according to the command value of the rotation speed of the motor M and the command value of the torque of the motor M. A relationship between the rotation speed and torque of the motor M and the optimum carrier frequency is stored. An example of a method for deriving the relationship between the torque of the motor M and the optimum carrier frequency for each rotation speed of the motor M will be described with reference to a flowchart of FIG. 14. The flowchart of FIG. 14 is an example of a preparation step performed before using the motor M in an actual machine (for example, a train, a hybrid vehicle, a home electric appliance, or the like).

First, in Step S1401, the controller 70 designates one unselected candidate among a plurality of candidates for the rotation speed of the motor M preset for the controller 70.

Next, in Step S1402, the controller 70 designates one unselected candidate among a plurality of candidates for the torque of the motor M preset for the controller 70.

Next, in Step S1403, the controller 70 designates one unselected candidate among a plurality of candidates for the carrier frequency preset for the controller 70.

Next, in Step S1404, controller 70 generates a PWM signal S based on contents designated in Steps S1401 to S1403, and outputs the PWM signal to the inverter 50. The inverter 50 operates the motor M based on this PWM signal S. In this case, the applied voltage calculation unit 71 uses the rotation speed designated in Step S1401 as the command value of the rotation speed of the motor M and the torque designated in Step S1402 as the command value of the torque of the motor M to calculate a voltage applied to each phase of the motor M, and generates a voltage command signal indicating the voltage. Moreover, the carrier wave generating unit 72 generates a triangular wave having the carrier frequency designated in Step S1403.

Next, in Step S1405, the total loss when the motor M is operated in Step S1404 (the total loss when the motor M is driven using the inverter 50) is measured. As described above, the total loss is the sum of the copper loss and the iron loss of the motor M and the loss of the inverter 50. The total loss is derived as the value obtained by subtracting the output of the motor M from the input power to the inverter 50. The copper loss of the motor M is derived as a Joule loss from a current and a winding resistance flowing through windings of respective phases u, v, and w of the motor M. The iron loss of the motor M is derived as a value obtained by subtracting the output of the motor M and the copper loss from the input power to the motor M. The loss of the inverter 50 is derived as a value obtained by subtracting the output power of the inverter (input power to the motor M) from the input power to the inverter 50.

Next, in Step S1406, the controller 70 determines whether or not all the plurality of candidates for the carrier frequency preset for the controller 70 are designated. As a result of this determination, when all of the plurality of candidates for the carrier frequency are not designated, the processing is returned to Step S1403. Then, the processing of Steps S1403 to S1406 is repeatedly performed until all of the plurality of candidates of the carrier frequency are designated. That is, the measurement (derivation) of the total loss in Step S1405 is performed by changing the carrier frequency in the inverter 50.

When it is determined in Step S1406 that all of the plurality of candidates of the carrier frequency are designated, the PWM signal S having the rotation speed designated in Step S1401 and the torque designated in Step S1402 as the command value is generated using the respective triangular waves of all the candidates of the carrier frequency, and the total loss when the motor M is driven by the PWM signal S is obtained in the repeatedly performed Step S1405. Then, the processing proceeds to Step S1407.

In Step S1407, the controller 70 generates the PWM signal S having the rotation speed of the motor M designated in Step S1401 and the torque of the motor M designated in Step S1402 as the command values, and specifies the carrier frequency which is the minimum total loss among the total losses when the motor M is driven by the PWM signal S as the optimum carrier frequency (that is, based on the total loss derived in Step S1405, the carrier frequency when the total loss is minimum is derived as the optimum carrier frequency).

In this case, the optimum carrier frequency may be specified as follows. At a stage when the processing proceeds to Step S1407, a set of the candidate of the carrier frequency designated in Step S1403 and the total loss measured in Step S1405 when the carrier frequency is designated is obtained by the number of the candidates of the carrier frequency. The controller 70 derives an expression indicating the relationship between the carrier frequency and the total loss based on the set of the candidate of the carrier frequency and the total loss by a known method such as the least square method. In this expression, the controller 70 specifies the carrier frequency in which the total loss is minimum, as the optimum carrier frequency.

Next, in Step S1408, the controller 70 determines whether or not all of the plurality of candidates for the torque of the motor M preset for the controller 70 are designated. As a result of this determination, when all of the plurality of candidates for the torque of the motor M are not designated, the processing is returned to Step S1402. The processing of Steps S1402 to S1408 is repeatedly performed until all of the plurality of candidates for the torque of the motor M are designated. That is, the measurement (derivation) of the total loss in Step S1405 is performed by changing the torque generated in the motor M. Moreover, the derivation of the optimum carrier frequency in Step S1407 is performed for each of the plurality of torques.

When it is determined in Step S1408 that all of the plurality of candidates for the torque of the motor M are designated, the PWM signal S having the rotation speed of the motor M designated in Step S1401 and each of all the candidates of the torque of the motor M as the command values is generated using the respective triangular waves of all the candidates of the carrier frequency, and the optimum carrier frequency when the motor M is driven is obtained in the repeatedly performed Step S1407. Then, the processing proceeds to Step S1409.

In Step S1409, the controller 70 derives the relationship between the torque of the motor M and the optimum carrier frequency for the rotation speed of the motor M designated in Step S1401. A specific example of the method of deriving the relationship between the torque of the motor M and the optimum carrier frequency will be described. First, the controller 70 extracts the optimum carrier frequency in the torque of the motor M designated in Step S1402 on each of the torques of the motor M designated in Step S1402, which is repeatedly executed. As a result, for the rotation speed of the motor M designated in Step S1401, the sets of the torque of the motor M and the optimum carrier frequency in the torque of the motor M are obtained by the number of the candidates of the torque of the motor M. The controller 70 derives the sets of the torque of the motor M obtained as described above and the optimum carrier frequency in the torque of the motor M as the relationship between the torque of the motor M and the optimum carrier frequency.

Next, in Step S1410, the controller 70 determines whether or not all of the plurality of candidates for the rotation speed of the motor M preset for the controller 70 are designated. As a result of this determination, when all of the plurality of candidates for the rotation speed of the motor M are not designated, the processing is returned to Step S1401. The processing of Steps S1401 to S1410 is repeatedly performed until all of the plurality of candidates for the rotation speed of the motor M are designated. That is, the measurement (derivation) of the total loss in Step S1405 is performed by changing the rotation speed of the motor M. Further, the derivation of the optimum carrier frequency in Step S1407 is performed for each of the plurality of rotation speeds.

When it is determined in Step S1410 that all of the plurality of candidates for the rotation speed of the motor M are designated, the relationship between the torque of the motor M and the optimum carrier frequency is obtained in Step S1409 which is repeatedly performed, for each of all the candidates for the rotation speed of the motor M. Then, the processing proceeds to Step S1411.

In Step S1411, the controller 70 derives and stores the relationship between the torque of the motor M and the optimum carrier frequency for each rotation speed of the motor M, based on the optimum carrier frequency derived in Step S1407. This relationship is as illustrated in Table 1.

In this case, based on the knowledge described with reference to Table 1, the relationship (the relationship derived in Step S1411) between the torque of the motor M and the optimum carrier frequency derived by the controller 70 for each rotation speed of the motor M has a portion (first portion) in which the carrier frequency increases as the torque of the motor M increases in a range in which the torque of the motor M is equal or more than the torque of the motor M corresponding to the lowest optimum carrier frequency among the plurality of optimum carrier frequencies (the plurality of optimum carrier frequencies specified under a condition that the rotation speed of the motor M is common and the torques of the motor M are different from each other) specified in Step S1407.

In the example illustrated in Table 1, when the rotation speed ratios of the motor M are 0.25, 0.50, 0.75, or 1.00, the lowest optimum carrier frequencies are 5 kHz, 5 kHz, 5 kHz, 20 kHz, respectively. The torque ratios corresponding to the lowest optimum carrier frequencies are 0.050 and 0.125, 0.050 and 0.125, 0.050 and 0.125, and 0.250, respectively. Moreover, when the rotation speed ratios of the motor M are 0.25, 0.50, 0.75, and 1.00, in ranges of 0.125 to 0.250, 0.125 to 0.250, 0.125 to 0.250, and 0.250 to 0.500 which are the ranges of the torque ratios equal to or more than the torque ratios corresponding to the lowest optimum carrier frequencies, as the torque ratios are respectively changed from 0.125 to 0.250, from 0.125 to 0.250, from 0.125 to 0.250, from 0.250 to 0.375, and from 0.375 to 0.500 to be increased, the optimum carrier frequencies are respectively changed from 5 to 10, from 5 to 10, from 5 to 10, from 20 to 30, and from 30 to 40 to be increased. The relationship between the torque of the motor M and the optimum carrier frequency derived by the controller 70 for each rotation speed of the motor M has this relationship.

In an example in which the rotation speed ratio of the motor M is "0.25" in Table 1, the relationship derived in Step S1411 has the first portion (a portion where the torque ratio of the motor M is 0.050 or more and 1.000 or less) in which the optimum carrier frequency increases as the torque ratio of the motor M increases in a range in which the torque ratio of the motor M is equal to or more than the torque ratios ("0.050" and "0.125") of the motor M corresponding to the lowest carrier frequency "5" among the optimum carrier frequencies ("5" and "10") corresponding to one rotation speed ratio "0.25" among the plurality of rotation speed ratios ("0.25", "0.50", "0.75", and "1.00") of the motor M derived in Step S1407.

The "first portion in which the optimum carrier frequency increases as the torque ratio of the motor M increases" may include a "portion in which the optimum carrier frequency is substantially constant even when the torque ratio of the motor M increases".

In the example in which the rotation speed ratio of the motor M is "0.25" in Table 1, the first portion (the portion in which the torque ratio of the motor M is 0.050 or more and 1.000 or less) includes the "portion (a portion in which the torque ratio of the motor M is 0.050 or more and 0.125 or less and a portion which the torque ratio of the motor M is 0.250 or more and 1.000 or less) in which the optimum carrier frequency is substantially constant even when the torque ratio of the motor M increases".

In an example in which the rotation speed ratio of the motor M is "0.50" in Table 1, the relationship derived in Step S1411 has the first portion (a portion where the torque ratio of the motor M is 0.050 or more and 1.000 or less) in which the optimum carrier frequency increases as the torque ratio of the motor M increases in a range in which the torque ratio of the motor M is equal to or more than the torque ratios ("0.050" and "0.125") of the motor M corresponding to the lowest carrier frequency "5" of the optimum carrier frequencies ("5" and "10") derived in Step S1407.

In the example in which the rotation speed ratio of the motor M is "0.50" in Table 1, the first portion (the portion in which the torque ratio of the motor M is 0.050 or more and 1.000 or less) includes a "portion (a portion in which the torque ratio of the motor M is 0.050 or more and 0.125 or less and a portion which the torque ratio of the motor M is 0.250 or more and 1.000 or less) in which the optimum carrier frequency is substantially constant even when the torque ratio of the motor M increases".

In an example in which the rotation speed ratio of the motor M is "0.75" in Table 1, the relationship derived in Step S1411 has the first portion (a portion where the torque ratio of the motor M is 0.050 or more and 0.750 or less) in which the optimum carrier frequency increases as the torque ratio of the motor M increases in a range in which the torque ratio of the motor M is equal to or more than the torque ratios ("0.050" and "0.125") of the motor M corresponding to the lowest carrier frequency "5" among the optimum carrier frequencies ("5", "10", and "15") derived in Step S1407.

In the example in which the rotation speed ratio of the motor M is "0.75" in Table 1, the first portion (the portion in which the torque ratio of the motor M is 0.050 or more and 0.750 or less) includes a "portion (a portion in which the torque ratio of the motor M is 0.050 or more and 0.125 or less and a portion which the torque ratio of the motor M is 0.250 or more and 0.625 or less) in which the optimum carrier frequency is substantially constant even when the torque ratio of the motor M increases".

In an example in which the rotation speed ratio of the motor M is "1.00" in Table 1, the relationship derived in Step S1411 has the first portion (a portion where the torque ratio of the motor M is 0.250 or more and 0.500 or less) in which the optimum carrier frequency increases as the torque ratio of the motor M increases in a range in which the torque ratio of the motor M is equal to or more than the torque ratios ("0.250") of the motor M corresponding to the lowest carrier frequency "20" among the optimum carrier frequencies ("20", "30", and "40") derived in Step S1407.

Further, when there is a range in which the torque of the motor M is equal to or less than the torque of the motor M corresponding to the lowest optimum carrier frequency among the plurality of optimum carrier frequencies specified as described above, in the range, the relationship between the torque of the motor M and the optimum carrier frequency derived by the controller 70 for each rotation speed of the motor M has a portion (second portion) in which the carrier frequency decreases as the torque of the motor M increases.

In the example illustrated in Table 1, when the rotation speed ratio of the motor M is 1.00, the lowest optimum carrier frequency is 20 kHz, the torque ratio corresponding to the lowest optimum carrier frequency is 0.250, and there are torque ratios (=0.250, 0.125, and 0.050) equal to or less than the torque ratio (=0.250). Moreover, in a range of 0.125 to 0.250 which is a range of the torque ratio of 0.250 or less which is the torque ratio corresponding to the lowest optimum carrier frequency, when the torque ratio is changed from 0.125 to 0.250 to be increased, the optimum carrier frequency changes from 40 to 20 to be decreased. The relationship between the torque of the motor M and the optimum carrier frequency derived by the controller 70 is this relationship.

In an example in which the rotation speed ratio of the motor M is "1.00" in Table 1, the relationship derived in Step S1411 has the second portion (a portion where the torque ratio of the motor M is 0.050 or more and 0.250 or less) in which the optimum carrier frequency decreases as the torque ratio of the motor M increases in a range in which the torque ratio of the motor M is equal to or less than the torque ratio ("0.250") of the motor M corresponding to the lowest carrier frequency "20" among the optimum carrier frequencies ("20", "30", and "40") derived in Step S1407.

The "second portion in which the optimum carrier frequency decreases as the torque ratio of the motor M increases" may include a "portion in which the optimum carrier frequency is substantially constant even when the torque ratio of the motor M increases".

In the example in which the rotation speed ratio of the motor M is "1.00" in Table 1, the second portion (the portion in which the torque ratio of the motor M is 0.050 or more and 0.250 or less) includes a "portion (a portion in which the torque ratio of the motor M is 0.050 or more and 0.125 or less) in which the optimum carrier frequency is substantially constant even when the torque ratio of the motor M increases".

For example, the controller 70 can derive a table in which the rotation speed of the motor M, the torque of the motor M, and the optimum carrier frequency are associated with each other and are stored, from the relationship between the torque of the motor M and the optimum carrier frequency (the set of the torque of the motor M and the optimum carrier frequency of the motor M) for each of all the candidates of the rotation speed of the motor M, as the relationship between the torque of the motor M and the optimum carrier frequency, for each rotation speed of the motor M. Moreover, the controller 70 can derive an expression indicating the relationship between the torque of the motor M and the optimum carrier frequency for each rotation speed of the motor M, from the relationship between the torque of the motor M and the optimum carrier frequency (the set of the torque of the motor M and the optimum carrier frequency of the motor M) for each of all the candidates of the rotation speed of the motor M, by a known method such as the least square method. Then, the processing according to the flowchart of FIG. 14 ends.

According to the flowchart of FIG. 14, after the relationship between the torque of the motor M and the optimum carrier frequency is stored for each rotation speed of the motor M (after the preparation step ends), an actual use step is performed in which the motor M is driven in an actual machine by using the relationship between the torque of the motor M and the optimum carrier frequency for each rotation speed of the motor M. For example, in the actual use step, the following processing is performed.

When the motor M is driven, the carrier frequency setting unit 75 extracts the optimum carrier frequency corresponding to the command value of the torque of the motor M and the command value of the rotation speed of the motor M as the carrier frequency in the inverter 50 from the relationship between the torque of the motor M and the optimum carrier frequency for each rotation speed of the motor M (that is, sets the carrier frequency corresponding to the command value of the torque of the motor M and the command value of the rotation speed of the motor M based on the above-described relationship).

For example, when the carrier frequency in the inverter 50 is set from the relationship between the torque ratio of the motor M and the optimum carrier frequency at the rotation speed ratio 1.00 of the motor M illustrated in Table 1, the carrier frequency setting unit 75 sets the optimum carrier frequency as the carrier frequency in the inverter 50 which increases from 20 kHz to 40 kHz as the torque of the motor M increases in a range (a range in which the torque ratio of the motor M is 0.250 to 0.500) in which the torque of the motor M is equal to or more than the torque of the motor M corresponding to the lowest optimum carrier frequency (20 kHz). In addition, the carrier frequency setting unit 75 sets the optimum carrier frequency as the carrier frequency in the inverter 50 which decreases from 40 kHz to 20 kHz as the torque of the motor M increases in a range (a range in which the torque ratio of the motor M is 0.050 to 0.250) in which the torque of the motor M is equal to or less than the torque of the motor M corresponding to the lowest optimum carrier frequency (20 kHz).

When the relationship is used as a table, there is a case where the table does not have the same value as the command value (the rotation speed of the motor M and the torque). In this case, for example, the carrier frequency setting unit 75 performs interpolation processing or extrapolation processing on the values stored in the table based on the command value, and thus, can derive the optimum carrier frequency corresponding to the same value (the rotation speed and the torque of the motor M) as the command value, as the carrier frequency in the inverter 50.

The carrier wave generating unit 72 generates the triangular wave having the carrier frequency set by the carrier frequency setting unit 75 in this way. Moreover, as described above, the value of the optimum carrier frequency in the relationship between the torque of the motor M and the optimum carrier frequency for each rotation speed of the motor M is used as the carrier frequency applied to the inverter 50. Therefore, the relationship between the torque of the motor M and the optimum carrier frequency for each rotation speed of the motor M is synonymous with the relationship between the torque of the motor M and the carrier frequency applied to the inverter 50 for each rotation speed of the motor M.

As described above, in the present embodiment, when the inverter 50 having the switching element configured by using the wide band gap semiconductor is used as the inverter 50, the relationship between the torque of the motor M and the optimum carrier frequency is determined for each rotation speed of the motor M such that the optimum carrier frequency is substantially constant or increases as the torque of the motor M increases in a region in which the torque of the motor M is equal to or more than the torque at which the optimum carrier frequency is minimum. Therefore, it is possible to set the carrier frequency so that the efficiency of the overall motor driving system can increase in consideration of the iron loss and the copper loss of the motor M and a switching loss in the inverter 50. Accordingly, the motor M can be driven so that the total loss of the loss of the motor M and the loss of the inverter 50 decreases.

In the present embodiment, the case where the relationship between the torque of the motor M and the optimum carrier frequency is derived for each rotation speed of the motor M by performing actual measurement is described as an example. However, the relationship between the torque of the motor and the optimum carrier frequency does not necessarily have to be derived for each rotation speed of the motor M in this way. For example, the total loss of the motor driving system when the motor M is excited by the inverter 50 may be derived using a numerical analysis.

Further, in the present embodiment, the case where the controller 70 derives the relationship between the torque of the motor M and the optimum carrier frequency for each rotation speed of the motor M has been described as an example. However, the relationship between the torque of the motor M and the optimum carrier frequency may be derived for each rotation speed of the motor M by an information processing device different from the controller 70. For example, this is preferable when the total loss of the motor driving system when the motor M is excited by the inverter 50 is derived using numerical analysis. Moreover, in this case, the controller 70 obtains the relationship between the torque of the motor M and the optimum carrier frequency derived for each rotation speed of the motor M by the information processing device. In this case, the relationship between the torque of the motor M and the optimum carrier frequency may be stored inside the controller 70 for each rotation speed of the motor M, or may be stored outside the controller 70 for each rotation speed of the motor M.

In addition, in the present embodiment, the case where the AC power supply 10 and the rectifier circuit 20 are used to generate the input power to the inverter 50 is described as an example. However, this need not always be the case. For example, a DC power supply can be used as an alternative to the AC power supply 10 and the rectifier circuit 20. Furthermore, the DC power supply may have a step-up/down function. Alternatively, the DC power source has a power storage function and can be configured to store regenerative power from the motor M.

Second Embodiment

Next, a second embodiment will be described. In the first embodiment, the case in which the switching element constituting the inverter 50 is the switching element configured using the wide band gap semiconductor is described as an example. In the present embodiment, a case in which the switching element constituting the inverter 50 is a switching element configured by using a semiconductor (a semiconductor having a general band gap) other than the wide band gap semiconductor is described. As described above, configurations of the present embodiment and the first embodiment are mainly different from each other in that the switching elements constituting the respective inverters 50 are different from each other. Therefore, in descriptions of the present embodiment, the same reference numerals as those in FIGS. 1 to 14 are assigned to the same portions as those in the first embodiment, and detailed descriptions thereof are omitted.

The present inventor has investigated the carrier frequency for a high-efficiency motor driving system under the same conditions as those described in the first embodiment, except for using a Si semiconductor element which is one of the semiconductors having a general band gap as the semiconductor element constituting the switching element of the inverter 50 and setting the range of the carrier frequency to 5 kHz to 40 kHz. The results will be described below.

Figure 16:
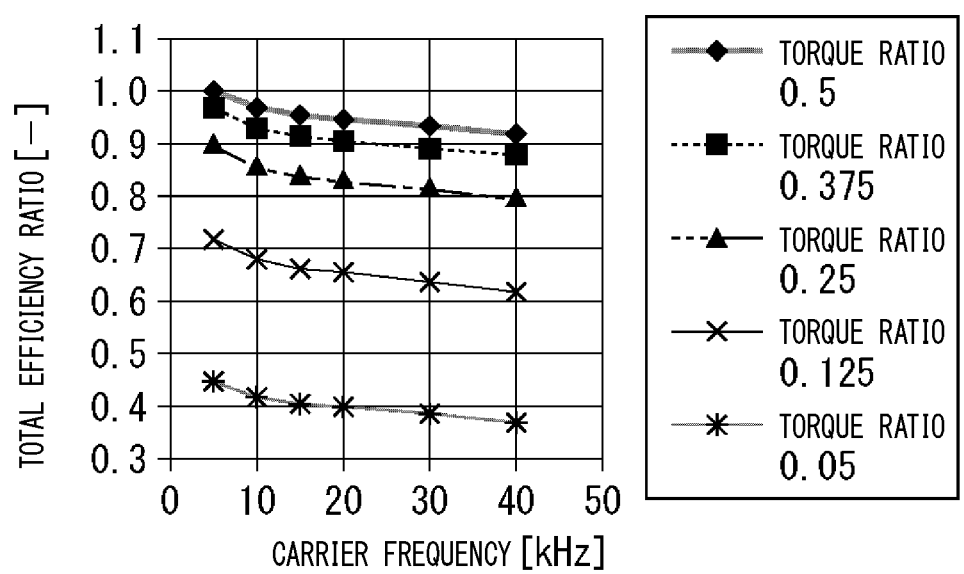
FIG. 16 is a diagram illustrating the second embodiment and is a diagram illustrating, in a graph form, a relationship between a total efficiency ratio and a carrier frequency when the rotation speed ratio of the motor is 1.00.
Figures 1, 17:
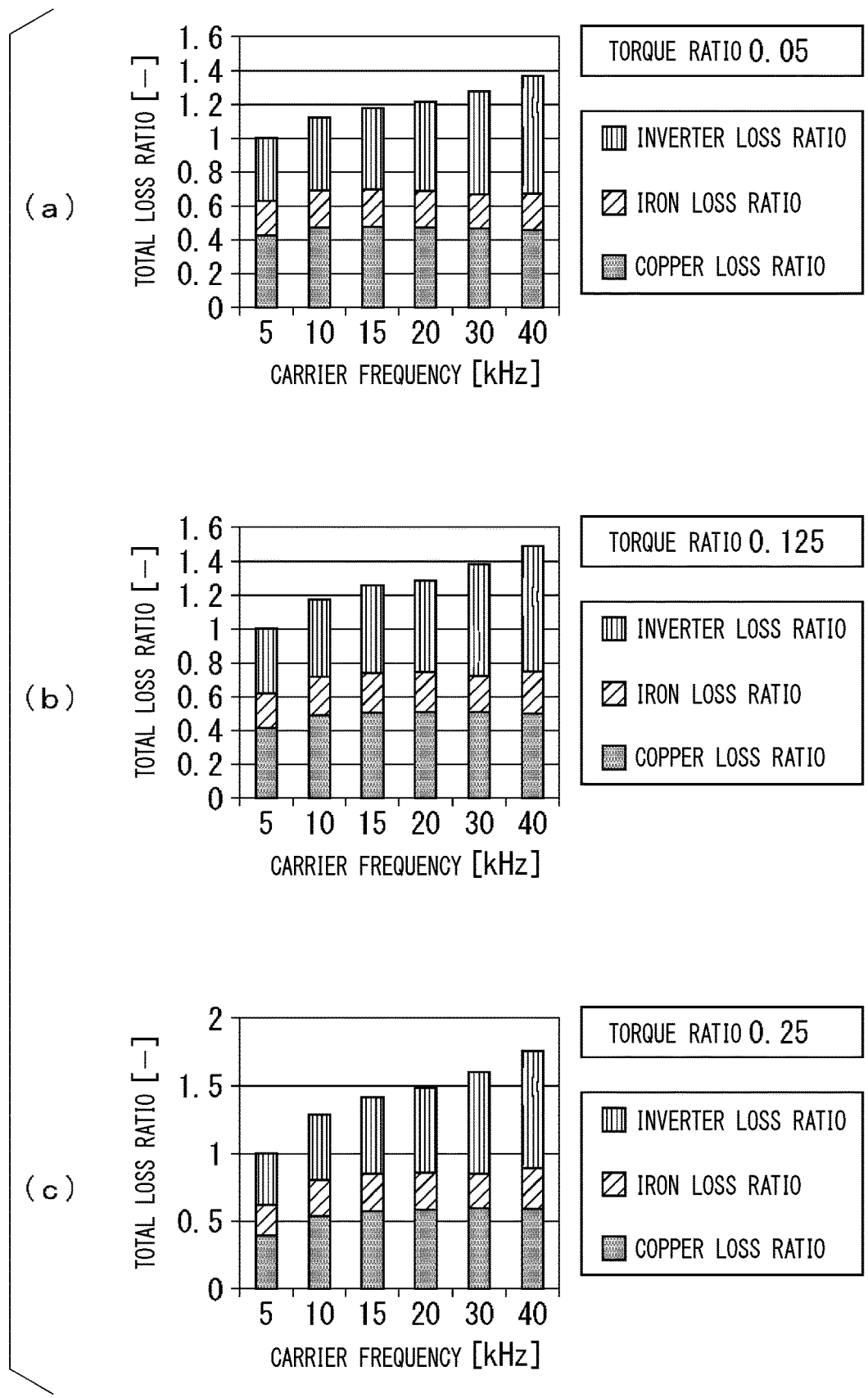
Figures 2, 17:
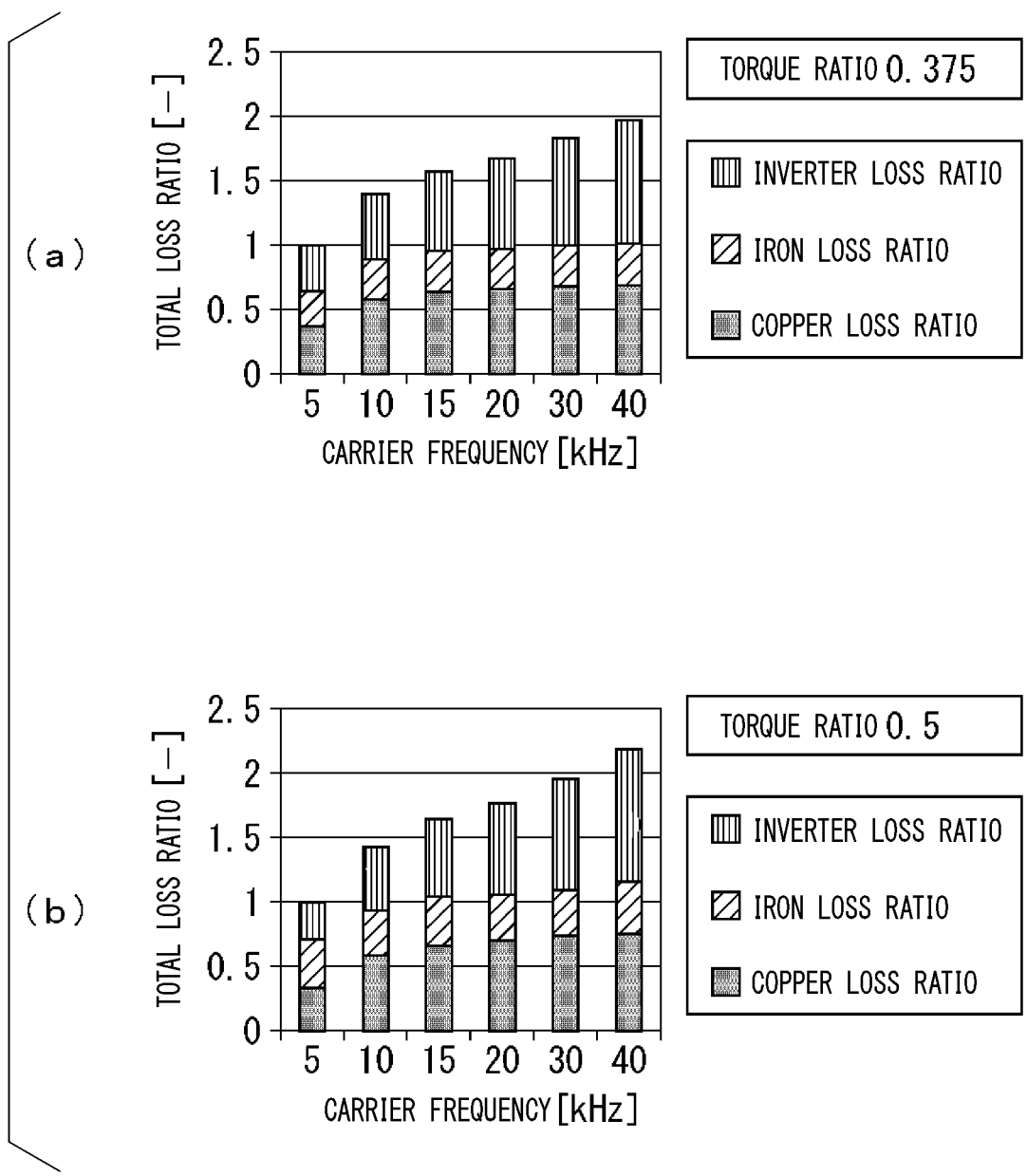

FIGS. 15-1 and 15-2 are diagrams illustrating, in a tabular form, a measurement result of a loss when a rotation speed ratio of the motor M is 1.00. FIGS. 15-1($a$) and ($b$) and 15-2($a$) and ($b$) are diagrams corresponding to FIGS. 2-1($a$) and ($b$), and FIGS. 2-2($a$) and ($b$), respectively. FIG. 16 is a diagram illustrating, in a graph form, a relationship between a total efficiency ratio and a carrier frequency illustrated in FIGS. 15-1 and 15-2. FIG. 16 is a diagram corresponding to FIG. 3. FIGS. 17-1 and 17-2 are diagrams illustrating, a graph form, a relationship between a total loss ratio and the carrier frequency illustrated in FIGS. 15-1 and 15-2. FIGS. 17-1($a$), ($b$), and ($c$) and FIGS. 17-2($a$) and ($b$) are diagrams corresponding to FIGS. 4-1($a$), ($b$), and ($c$), and FIGS. 4-2($a$) and ($b$), respectively.

FIGS. 18-1 to 18-3, 21-1 to 21-3, and 24-1 to 24-3 are diagrams illustrating, in a tabular form, measurement results of the losses when the rotation speed ratios of the motor M are 0.75, 0.50, and 0.25, respectively. FIGS. 18-1(*a*), (*b*), and (*c*) to FIGS. 18-3(*a*), (*b*), and (*c*), FIGS. 21-1(*a*), (*b*), and (*c*) to FIGS. 21-3(*a*), (*b*), and (*c*), FIGS. 24-1(*a*), (*b*), and (*c*) to FIGS. 24-3(*a*), (*b*), and (*c*) are diagrams corresponding to FIGS. 5-1(*a*), (*b*), and (*c*) to FIGS. 5-3(*a*), (*b*), and (*c*), FIGS. 8-1(*a*), (*b*), and (*c*) to FIGS. 8-3(*a*), (*b*), and (*c*), and FIGS. 11-1(*a*), (*b*), and (*c*) to FIGS. 11-3(*a*), (*b*), and (c), respectively.

Figure 19:
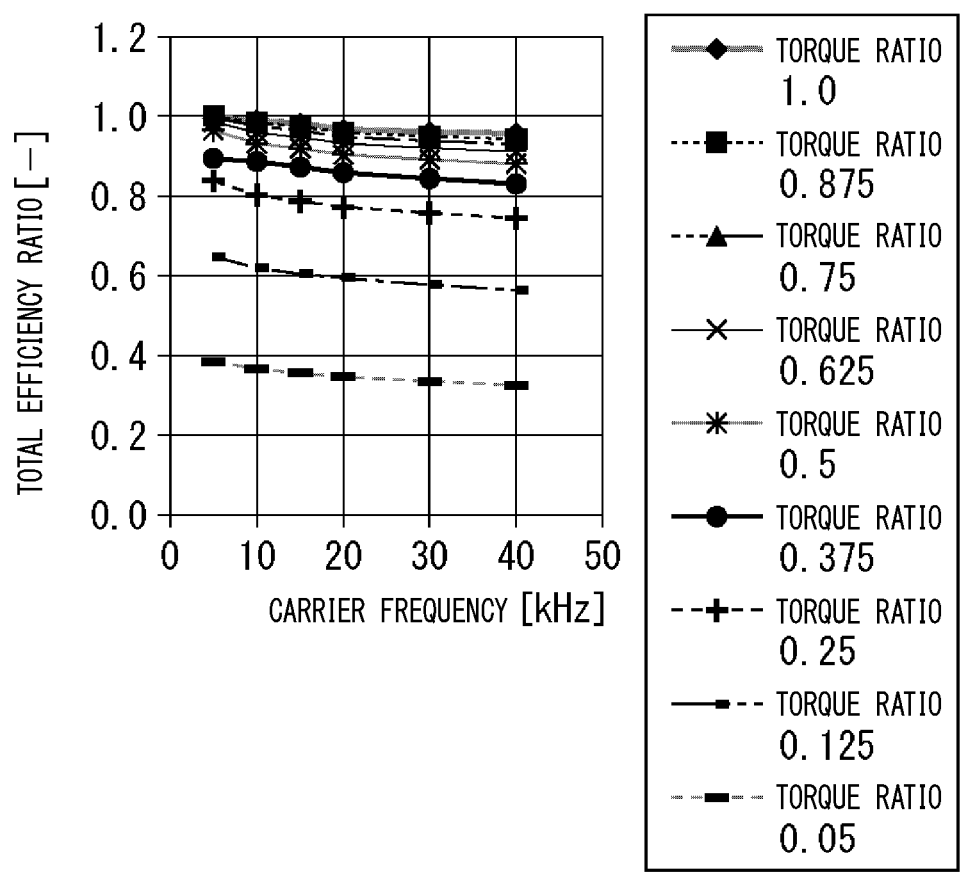
FIG. 19 is a diagram illustrating the second embodiment and is a diagram illustrating, in a graph form, a relationship between a total efficiency ratio and a carrier frequency when the rotation speed ratio of the motor is 0.75.
Figure 22:
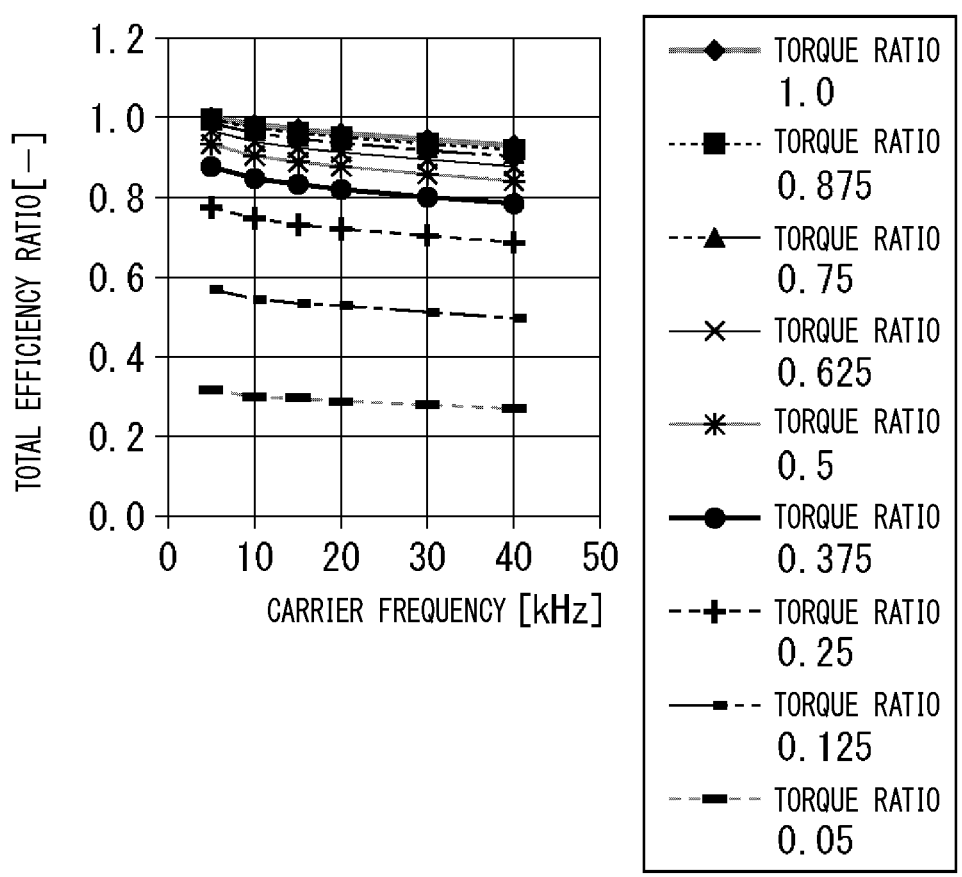
FIG. 22 is a diagram illustrating the second embodiment and is a diagram illustrating, in a graph form, the relationship between a total efficiency ratio and a carrier frequency when the rotation speed ratio of the motor is 0.50.
Figures 1, 23:
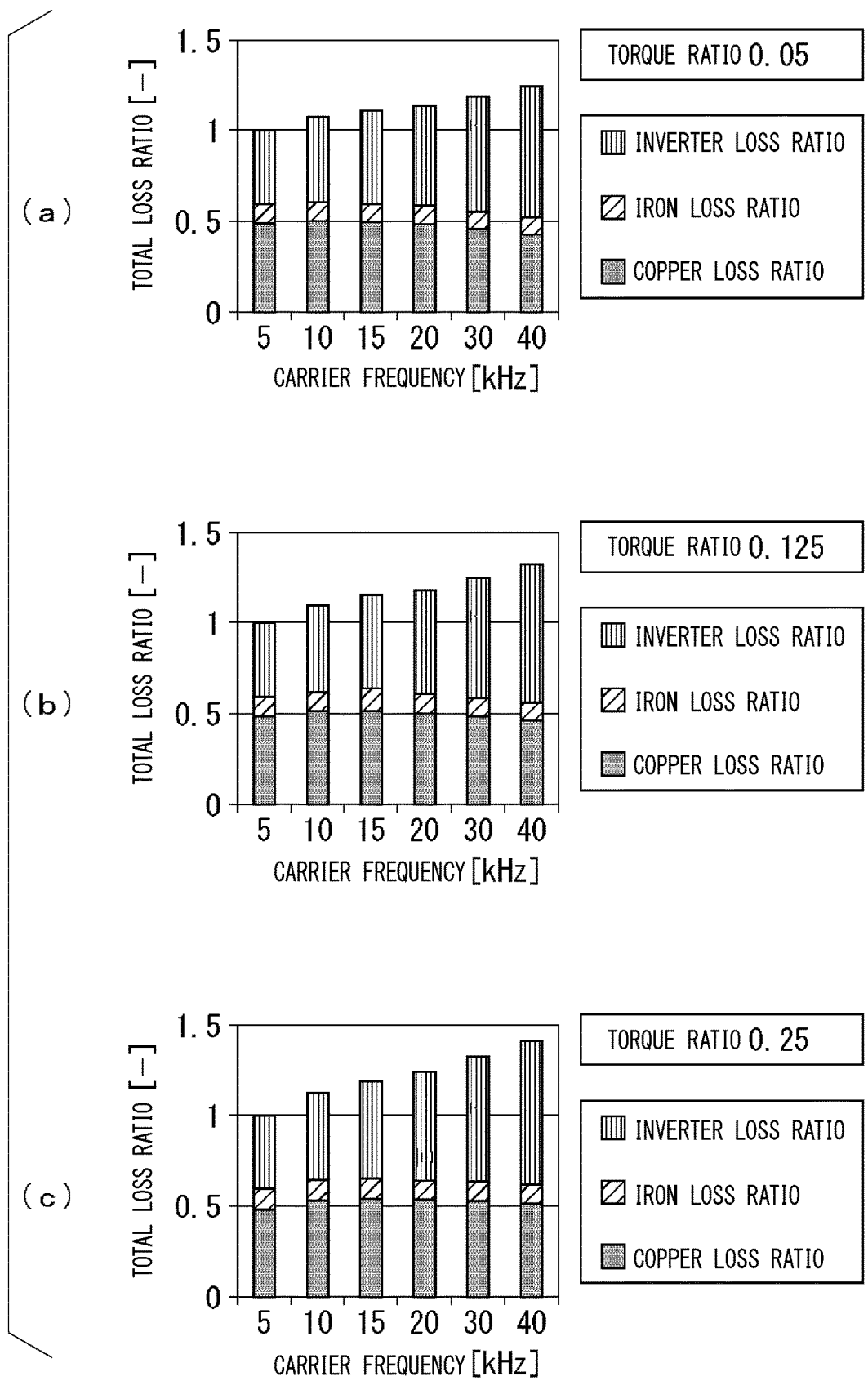
Figures 2, 23:
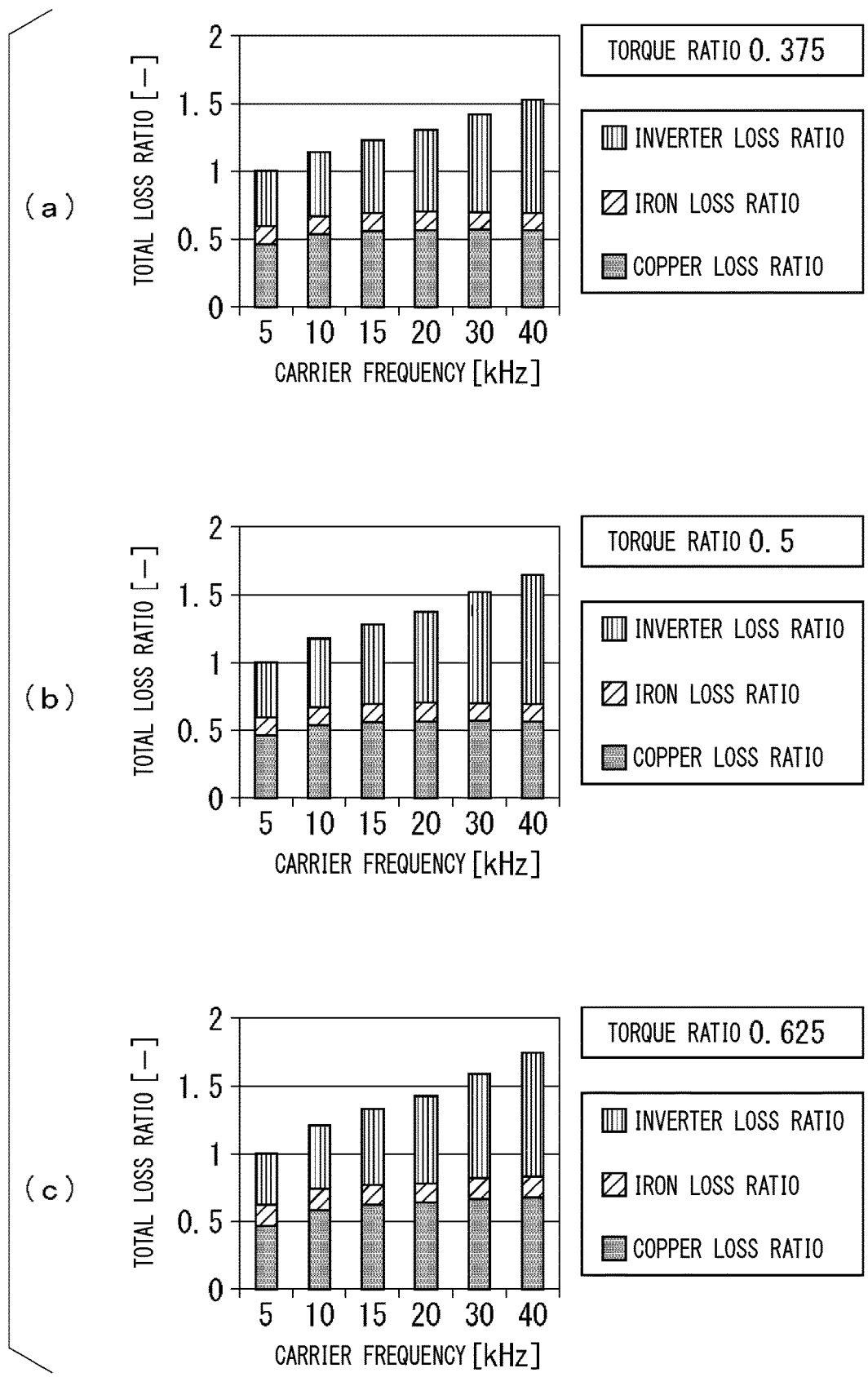
Figures 3, 23:
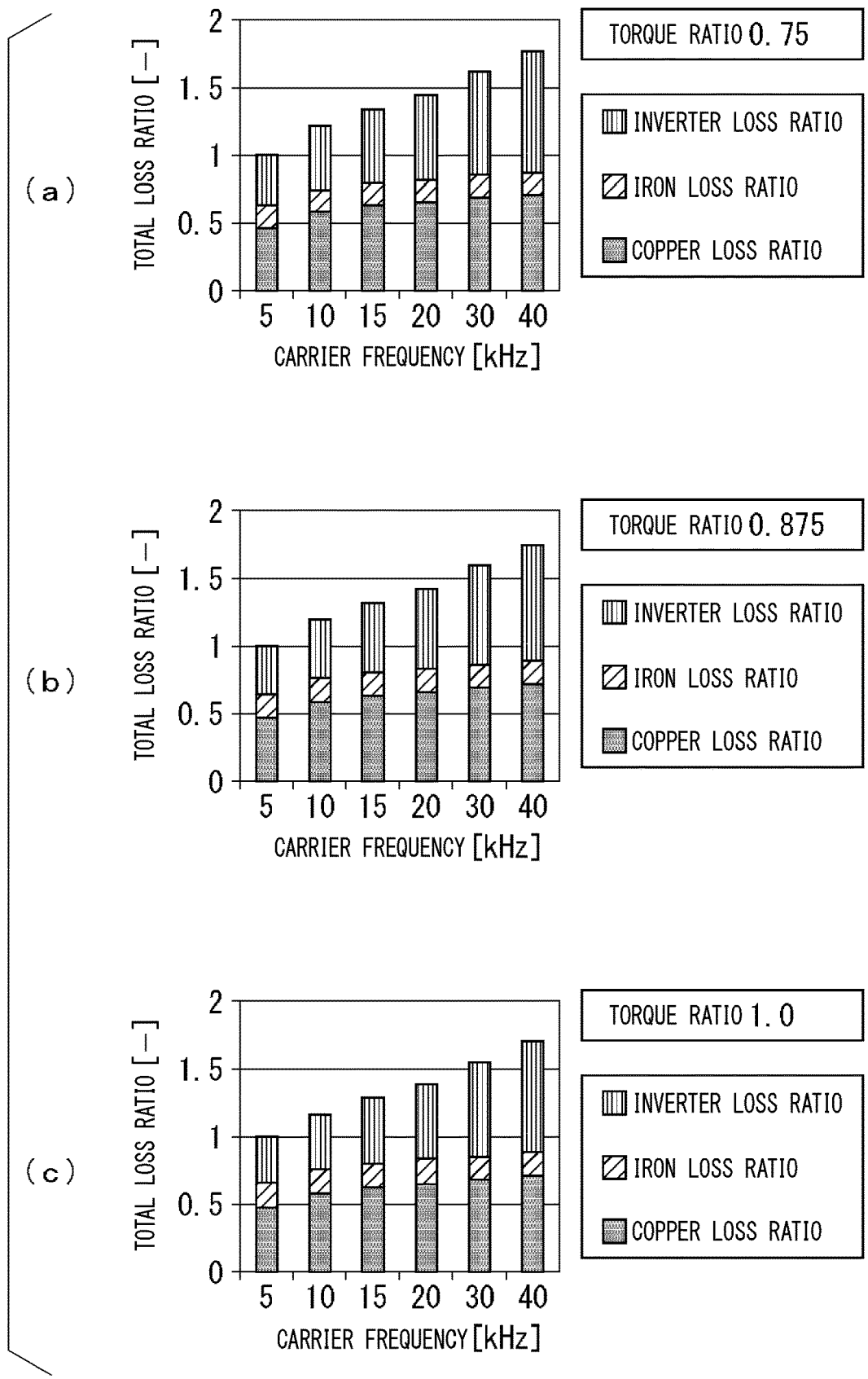
Figure 25:
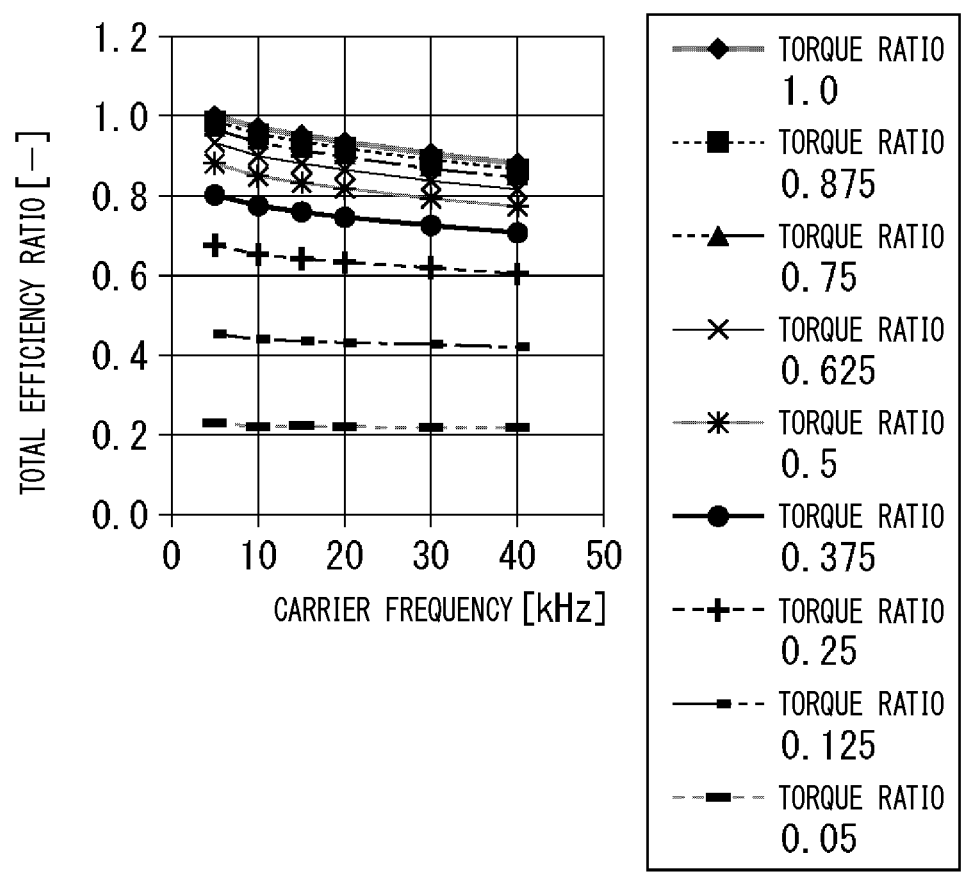
FIG. 25 is a diagram illustrating the second embodiment and is a diagram illustrating, in a graph form, a relationship between a total efficiency ratio and a carrier frequency when the rotation speed ratio of the motor is 0.25.
Figures 1, 26:
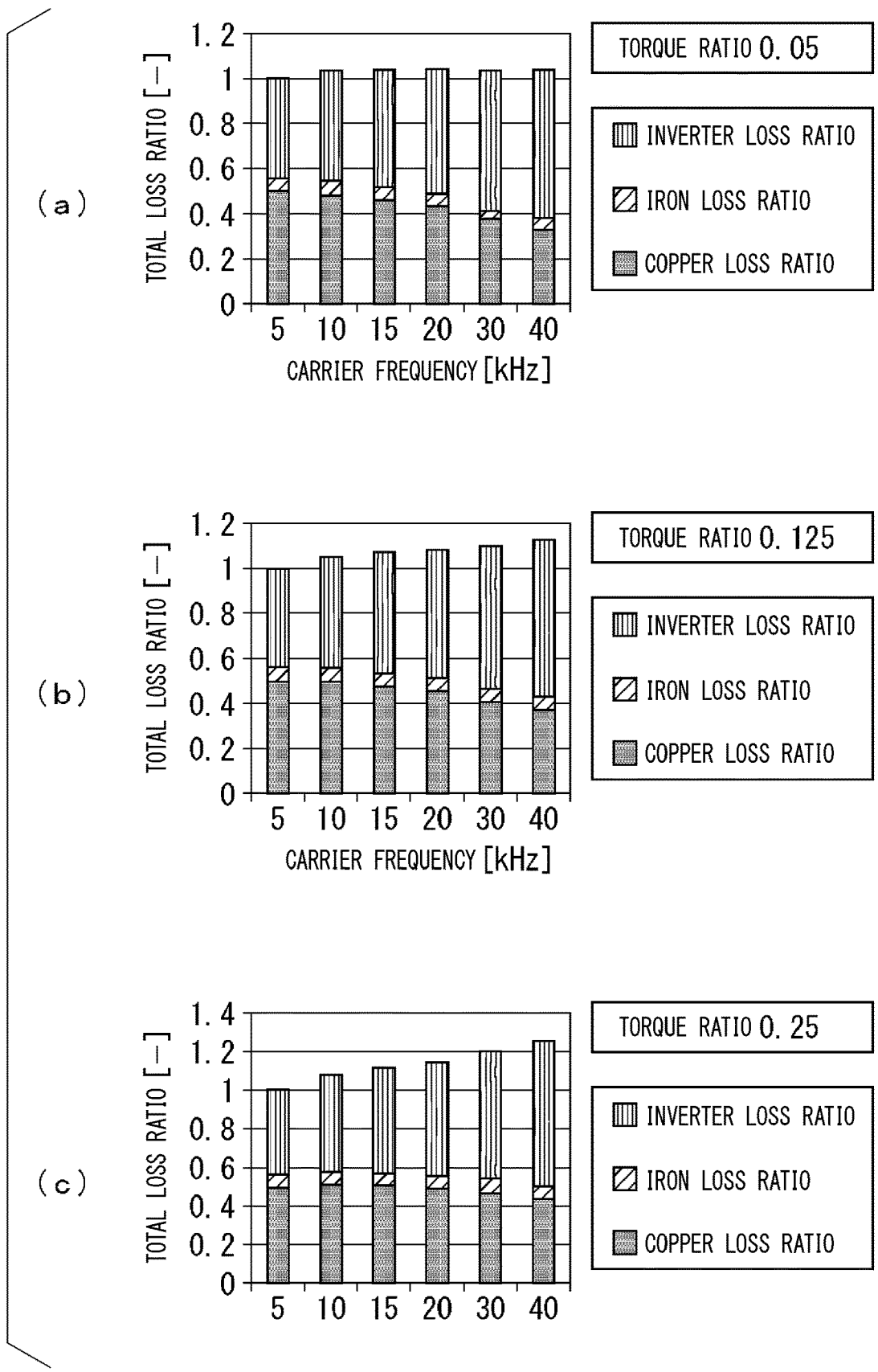
Figures 2, 26:
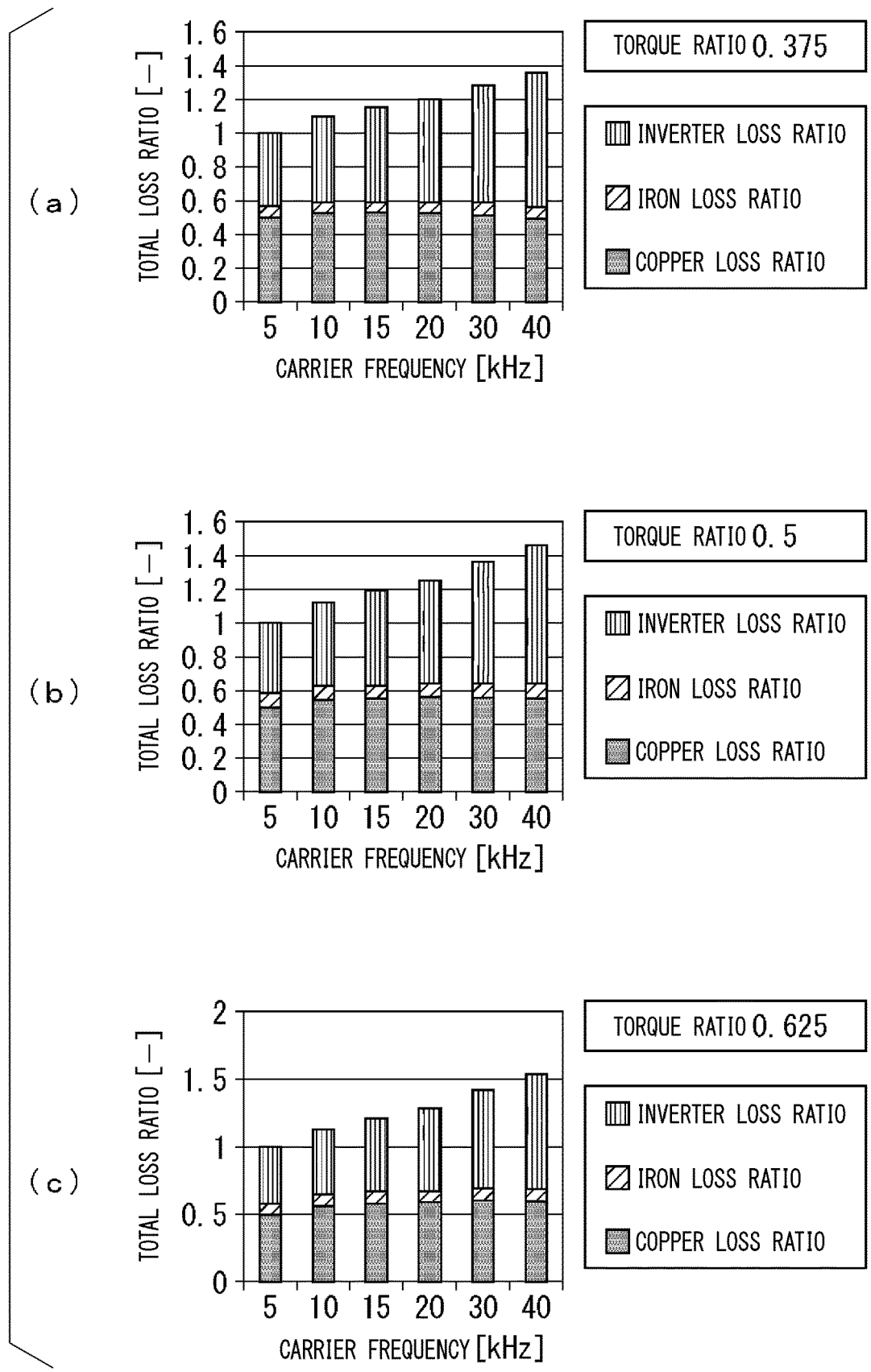
Figures 3, 26:
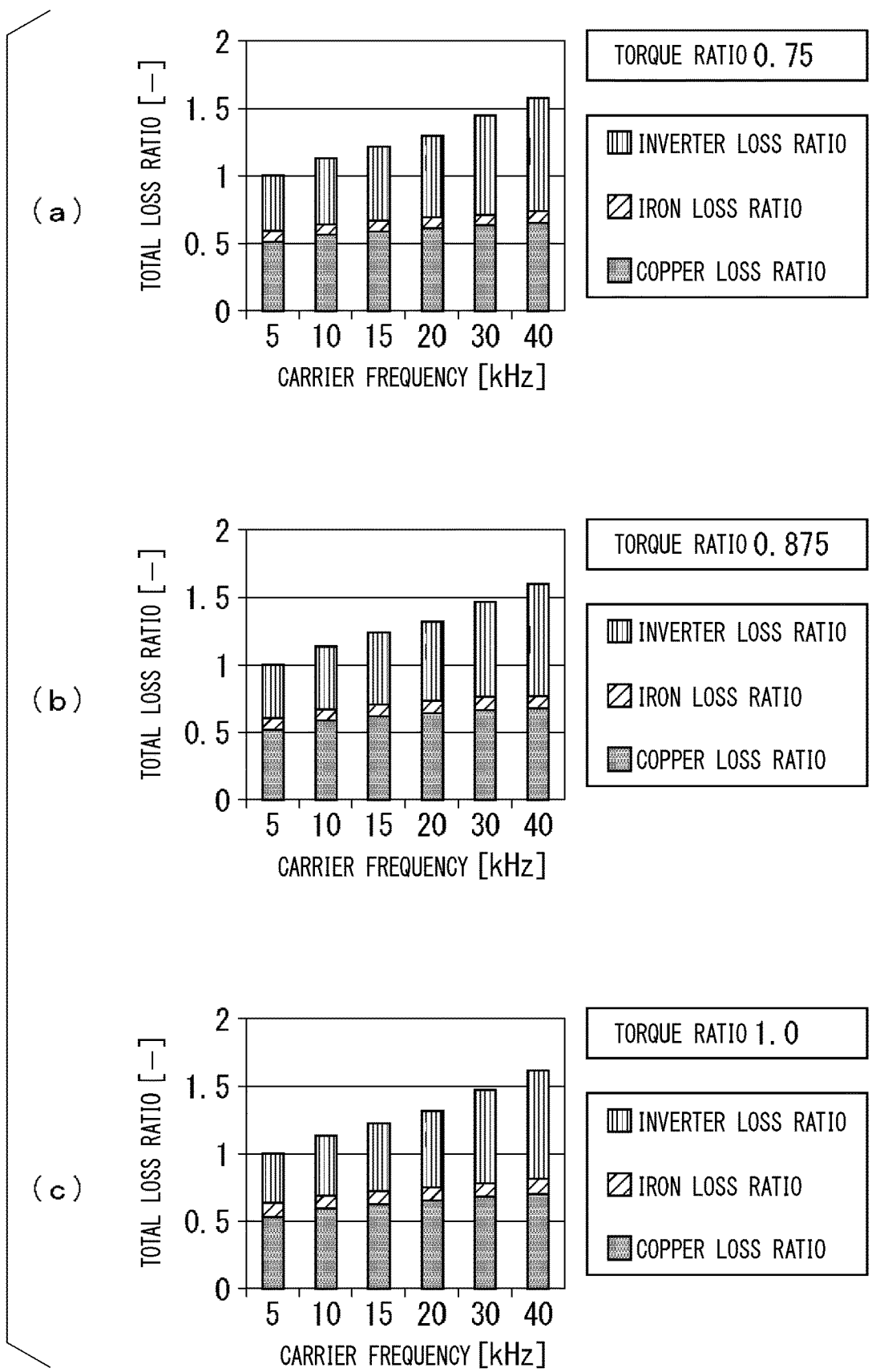

FIGS. 19, 22, and 25 are diagrams illustrating, in a graph form, a relationship between the total efficiency ratio and the carrier frequency illustrated in FIGS. 18-1 to 18-3, 21-1 to 21-3, and 24-1 to 24-3, respectively.

Figures 1, 20:
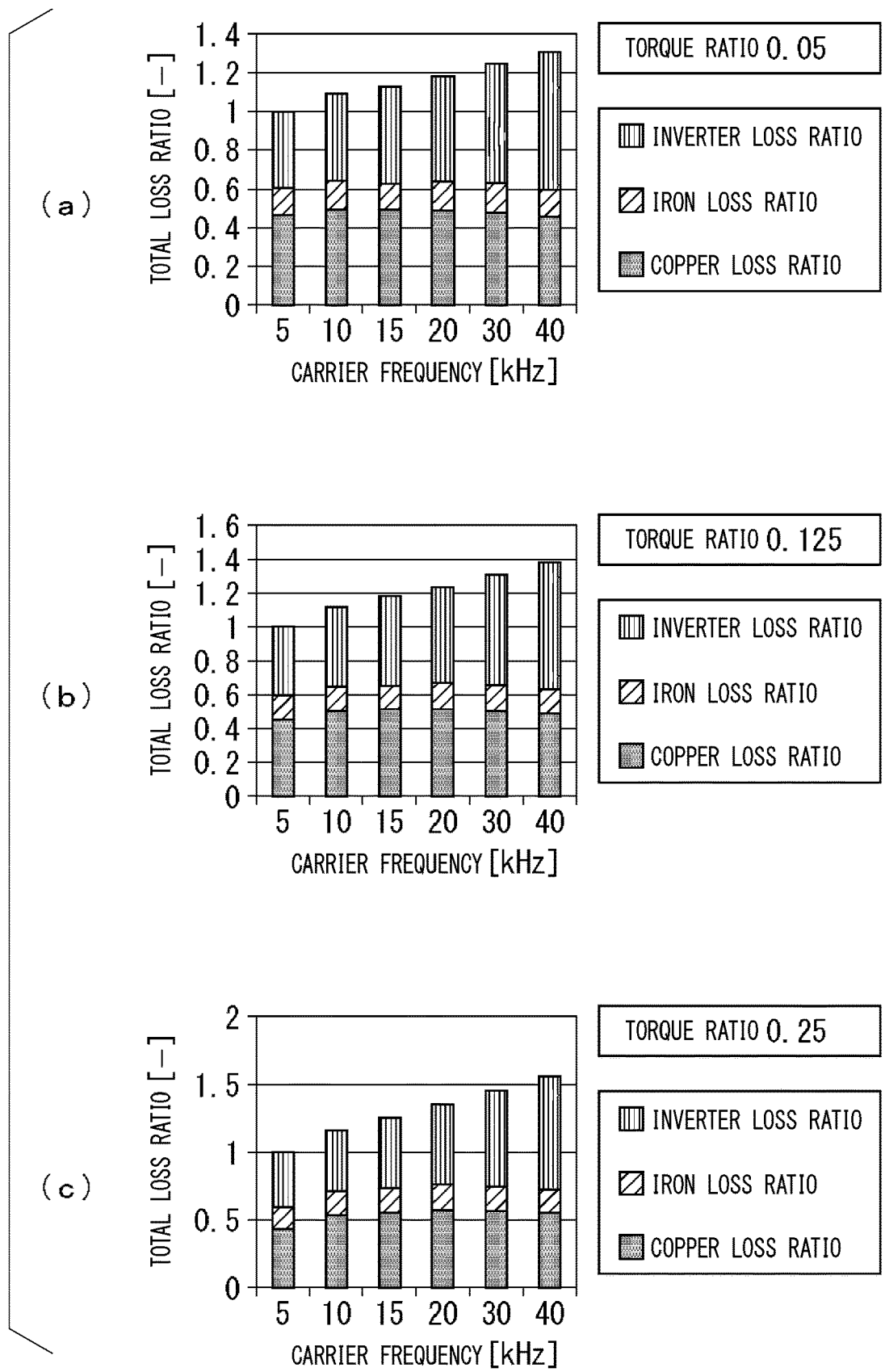
Figures 2, 20:
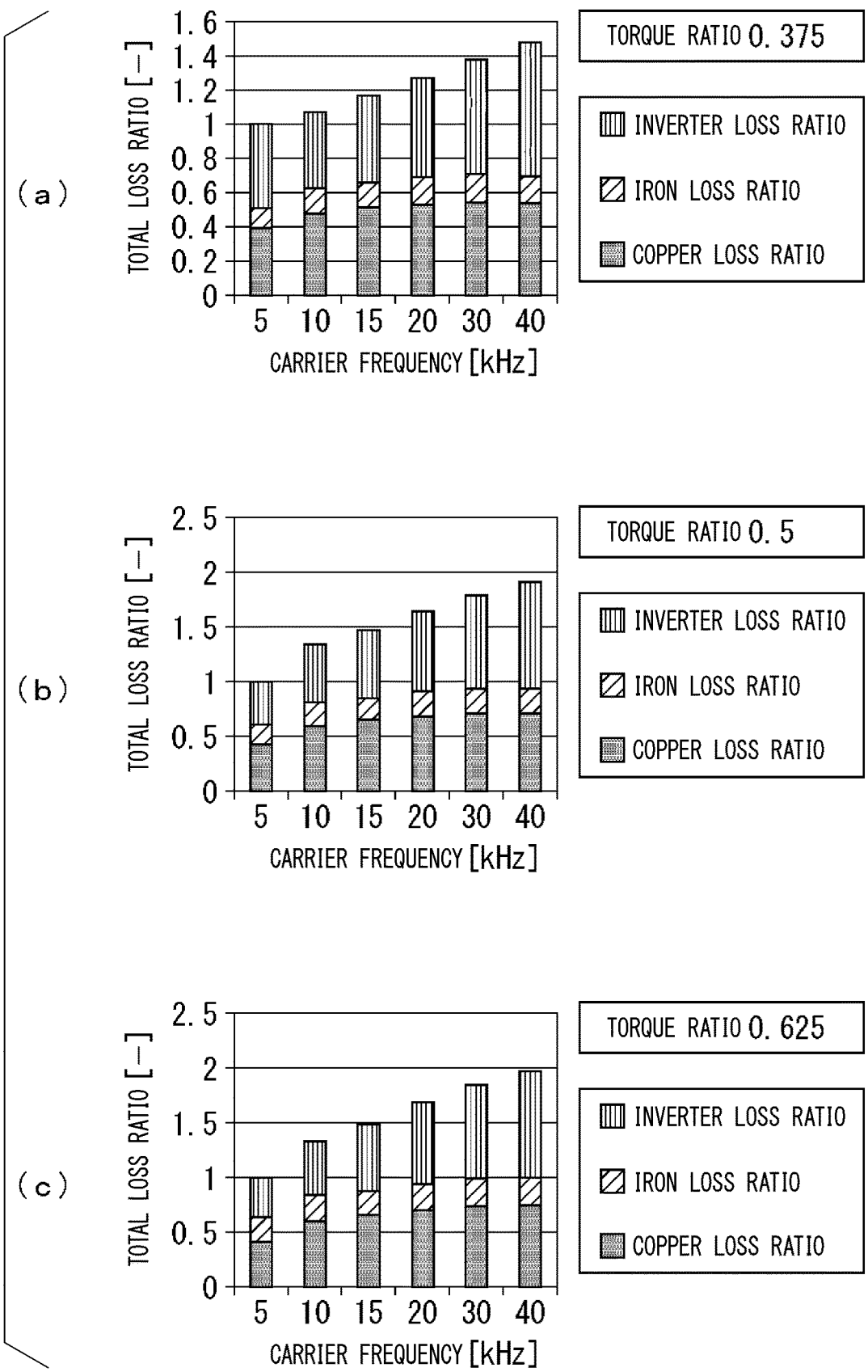
Figures 3, 20:
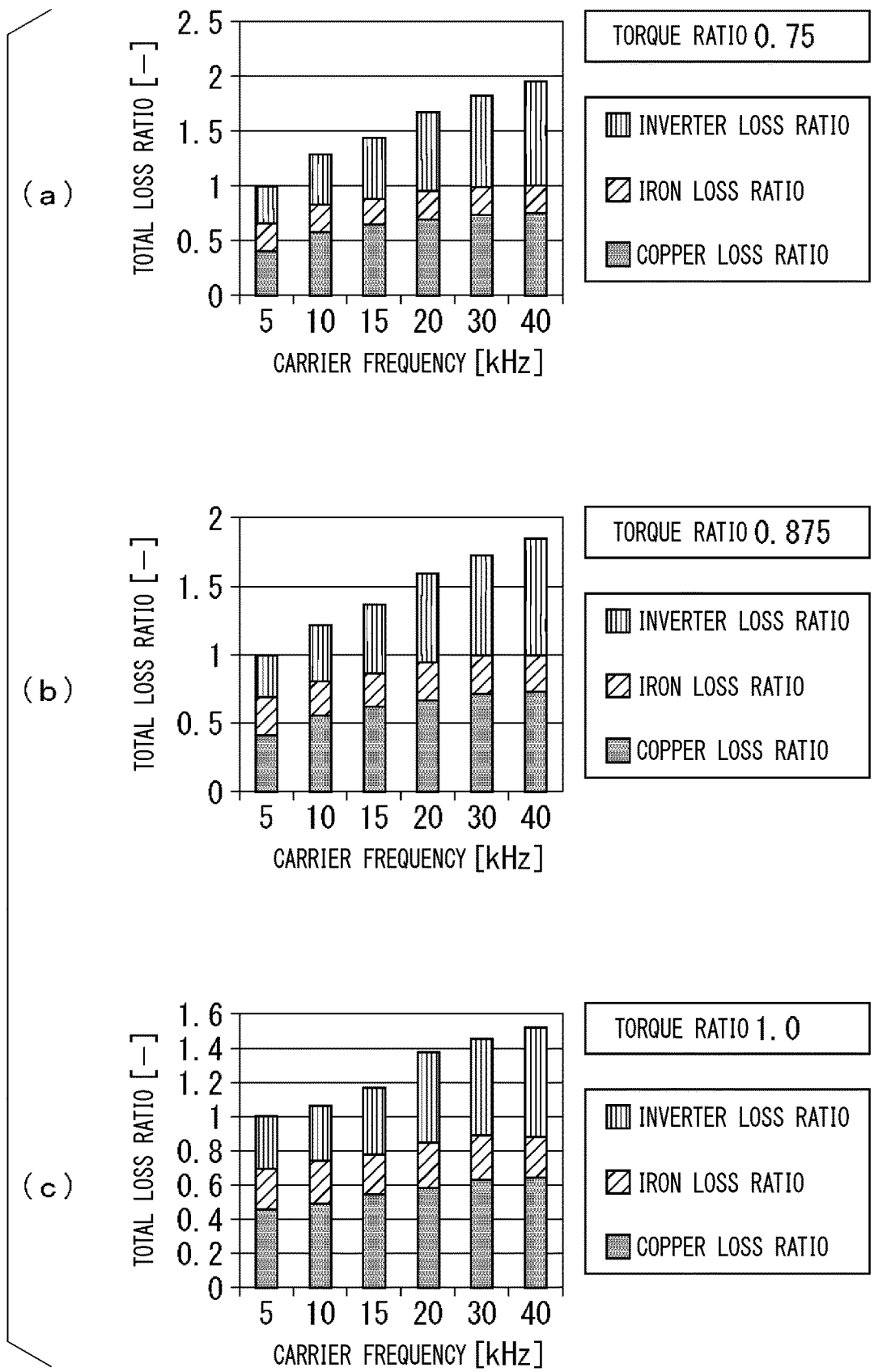

FIGS. 20-1 to 20-3, 23-1 to 23-3, and 26-1 to 26-3 are diagrams illustrating, in a graph form, the relationship between the total loss ratio and the carrier frequency illustrated in FIGS. 18-1 to 18-3, 21-1 to 21-3, and 24-1 to 24-3, respectively. FIGS. 20-1(*a*), (*b*), and (*c*) to FIGS. 20-3(*a*), (*b*), and (*c*), FIGS. 23-1(*a*), (*b*), and (*c*) to 23-3(*a*), (*b*), and (*c*), and FIGS. 26-1(*a*), (*b*), and (*c*) to FIGS. 26-3(*a*), (*b*), and (*c*) are diagrams corresponding to FIGS. 7-1(*a*), (*b*), and (*c*) to FIGS. 7-3(*a*), (*b*), and (c), FIGS. 10-1(*a*), (*b*), and (*c*) to FIGS. 10-3(*a*), (*b*), and (c), and FIGS. 13-1(*a*), (*b*), and (*c*) to FIGS. 13-3(*a*), (*b*), and (*c*), respectively.

As illustrated in FIGS. 17-1 to 17-2, 20-1 to 20-3, 23-1 to 23-3, and 26-1 to 26-3, the inverter loss ratio is larger than that when a wide band gap semiconductor is used as the switching element of the inverter 50 (FIGS. 4-1 to 4-2, 7-1 to 7-3, 10-1 to 10-3, and 13-1 to 13-3). This is because the switching loss of the switching element is smaller when the wide band gap semiconductor is used as the switching element than when the general semiconductor other than the wide band gap semiconductor is used as the switching element. This switching loss tends to increase as the carrier frequency increases.

Further, as illustrated in FIGS. 16, 19, 22, and 25, even when the rotation speed ratio and the torque ratio of the motor M are changed, the optimum carrier frequency is 5 kHz. Even when the semiconductor other than the wide band gap semiconductor is used as the switching element, as described in the first embodiment, in the region in which the carrier frequency is low, when the carrier frequency increases, the sum of the iron loss ratio and the copper loss ratio gradually increases, and then, approaches a certain value. As described above, when the semiconductor other than the wide band gap semiconductor is used as the switching element, the loss (and the inverter loss ratio) of the inverter 50 is larger than that when the wide band gap semiconductor is used as the switching element, and an amount of increase in the loss (and the inverter loss ratio) of the inverter 50 with respect to the increase of the carrier frequency also is larger (the increase in the loss of the inverter 50 (and the inverter loss ratio) is steeper) than that when the wide band gap semiconductor is used as the switching element.

From the above, when the semiconductor other than the wide band gap semiconductor is used as the switching element, the optimum carrier frequency is substantially constant regardless of the rotation speed and torque of the motor M.

Moreover, as described in the first embodiment, when intervals at which the torque ratios are changed are set to be smaller than intervals illustrated in FIGS. 15-1 to 15-2, 18-1 to 18-3, 21-1 to 21-3, and 24-1 to 24-3, the optimum carrier frequency may increase or decrease due to a variation in the measurement or the like. Therefore, it is not necessary to set the optimum carrier frequencies to be completely the same as each other, and it is sufficient if they are substantially the same as each other.

As described above, the present inventors have for the first time found the findings that, when the general semiconductor other than the wide band gap semiconductor is used as the switching element of the inverter 50, the optimum carrier frequency is substantially constant regardless of the rotation speed and the torque of the motor M. In addition, as described in the first embodiment, the present inventors has confirmed that this is similarly applied to other motors M and inverters 50, and thus, it is possible to maximize the efficiency (minimize the loss) of the overall motor driving system.

Further, for example, the above optimum carrier frequency can be derived by performing the processing of Steps S1401 to S1408, and S1410 in the flowchart of FIG. 14. When the optimum carrier frequency is (slightly) changed according to the torque of the motor M, a typical value (for example, average value, most frequent value, median value, minimum value, or maximum value) thereof may be derived as the optimum carrier frequency for each rotation speed of the motor M, or as described in the flowchart of FIG. 14, the relationship (the relationship in which the optimum carrier frequency has a substantially constant value regardless of the torque and the rotation speed of the motor M) between the torque of the motor M and the optimum carrier frequency may be derived for each rotation speed of the motor M. In any of the derivation methods, the carrier frequency, which is set by the carrier frequency setting unit 75 for each rotation speed of the motor M has a substantially constant value (for example, a value which is substantially the same as the minimum value of the optimum carrier frequency) regardless of the rotation speed and the torque of the motor M.

That is, in the present embodiment, in the actual use step, the carrier frequency setting unit 75 sets the optimum carrier frequency as the carrier frequency in the inverter 50 for each rotation speed of the motor M based on the relationship in which the optimum carrier frequency has a substantially constant value regardless of the torque and the rotation speed of the motor M.

As described above, in the present embodiment, when the inverter 50 having the switching element configured by using the semiconductor other than the wide band gap semiconductor is used as the inverter 50, the carrier frequency is substantially constant regardless of the rotation speed and the torque of the motor M. Therefore, even when the switching element configured using the general semiconductor other than the wide band gap semiconductor is used, the same effects as those described in the first embodiment can be obtained.

The various modification examples described in the first embodiment can be applied to the present embodiment as well.

The value of the rotation speed ratio of the motor M described above is merely an example, and the present invention is applicable to values other than the value of the rotation speed ratio of the motor M described above.

Moreover, the configuration of the controller 70 in the embodiments of the present invention described above can be realized by a computer executing a program. Moreover, a computer-readable recording medium recording the program and a computer program product such as the program can be applied as the embodiment of the present invention. As the recording medium, for example, a flexible disk, a hard disk, an optical disk, a magneto-optical disk, a CD-ROM, a magnetic tape, a non-volatile memory card, a ROM or the like can be used.

In addition, all the embodiments of the present invention described above are merely examples of embodying the present invention, and the technical scope of the present invention should not be limitedly interpreted by the embodiments. That is, the present invention can be implemented in various forms without departing from a technical idea or main features thereof.

REFERENCE SIGNS LIST

10: AC power supply
20: rectifier circuit
30: electrolytic capacitor
40: voltage sensor
50: inverter
61-63: current sensor
70: controller
71: applied voltage calculation unit
72: carrier wave generating unit
73: comparing unit
74: PWM signal output unit
75: carrier frequency setting unit

What is claimed is:

1. A carrier frequency setting method for setting a carrier frequency in an inverter for driving a motor, comprising:
   a loss derivation step of deriving a total loss which is a sum of a loss of the inverter and a loss of the motor when the motor is driven using the inverter while changing each of a torque generated in the motor, a rotation speed of the motor, and a carrier frequency in the inverter;
   a carrier frequency derivation step of deriving a carrier frequency when the total loss is minimum as an optimum carrier frequency in each combination of a plurality of the torques and a plurality of the rotation speeds, based on the total loss derived in the loss derivation step;
   a relationship derivation step of deriving a relationship between the torque of the motor and the optimum carrier frequency for each rotation speed of the motor, based on the optimum carrier frequency derived in the carrier frequency derivation step;
   a relationship storage step of storing the relationship derived for each rotation speed of the motor in the relationship derivation step; and
   a carrier frequency setting step of setting the carrier frequency according to a command value of the torque of the motor and a command value of the rotation speed of the motor based on the relationship after the relationship is stored in the relationship storage step, when the motor is driven,
   wherein the inverter has a switching element configured using a wide band gap semiconductor;
   wherein the relationship between the torque of the motor and the optimum carrier frequency derived for each rotation speed of the motor in the relationship derivation step has a first portion in which the optimum carrier frequency increases as the torque of the motor increases in a range in which the torque of the motor is equal to or more than a torque of the motor corresponding to a lowest carrier frequency among the optimum carrier frequencies derived in the carrier frequency derivation step, and
   wherein the relationship between the torque of the motor and the optimum carrier frequency derived for each rotation speed of the motor in the relationship derivation step has a second portion in which the optimum carrier frequency decreases as the torque of the motor increases in a range in which the torque of the motor is equal to or less than the torque of the motor corresponding to the lowest carrier frequency among the optimum carrier frequencies derived in the carrier frequency derivation step.

2. The carder frequency setting method according to claim 1,
   wherein in the relationship between the torque of the motor and the optimum carrier frequency derived for each rotation speed of the motor in the relationship derivation step, the torque of the motor has only one torque range of the motor corresponding to the lowest carrier frequency among the optimum carrier frequencies of the motor derived in the carrier frequency derivation step.

3. A carrier frequency setting method for setting a carrier frequency in an inverter for driving a motor, comprising:
   a loss derivation step of deriving a total loss which is a sum of a loss of the inverter and a loss of the motor when the motor is driven using the inverter while changing each of a torque generated in the motor, a rotation speed of the motor, and a carrier frequency in the inverter;
   a carrier frequency derivation step of deriving a carrier frequency when the total loss is minimum as an optimum carrier frequency in each combination of a plurality of the torques and a plurality of the rotation speeds, based on the total loss derived in the loss derivation step;
   a relationship derivation step of deriving a relationship between the torque of the motor and the optimum carrier frequency for each rotation speed of the motor, based on the optimum carrier frequency derived in the carrier frequency derivation step;
   a relationship storage step of storing the relationship derived for each rotation speed of the motor in the relationship derivation step; and
   a carrier frequency setting step of setting the carrier frequency according to a command value of the torque of the motor and a command value of the rotation speed of the motor based on the relationship after the relationship is stored in the relationship storage step, when the motor is driven,
   wherein the inverter has a switching element configured using a semiconductor other than a wide band gap semiconductor, and
   wherein in the relationship between the torque of the motor and the optimum carrier frequency derived for each rotation speed of the motor in the relationship derivation step, the optimum carrier frequency has a substantially constant value regardless of the torque of the motor.

4. A motor driving system comprising:
   an inverter;
   a motor which is driven with reception of supply of AC power from the inverter; and
   a controller which controls an operation of the inverter,
   wherein the inverter has a switching element configured using a wide band gap semiconductor,
   wherein the controller has a carrier frequency setting unit which sets a carrier frequency of the inverter based on a relationship between a torque of the motor and the carrier frequency in the inverter derived for each rotation speed of the motor, wherein the relationship between the torque of the motor and the carrier frequency derived for each rotation speed of the motor has a portion in which the carrier frequency increases as the torque of the motor increases, and wherein the relationship between the torque of the motor and the carrier frequency derived for each rotation speed of the motor has a portion in which the carrier frequency decreases as the torque of the motor increases in a range in which the torque of the motor is equal to or less than the torque of the motor corresponding to a lowest carrier frequency of the portion in which the carrier frequency increases as the torque of the motor increases.

5. A motor driving system comprising:

an inverter;

a motor which is driven with reception of supply of AC power from the inverter; and a controller which controls an operation of the inverter, wherein the inverter has a switching element configured using a semiconductor other than a wide band gap semiconductor, wherein the controller has a carrier frequency setting unit which sets a carrier frequency of the inverter based on a relationship between a torque of the motor and the carrier frequency in the inverter derived for each rotation speed of the motor, and wherein in the relationship between the torque of the motor and the carrier frequency, derived for each rotation speed of the motor, the carrier frequency has a substantially constant value regardless of the torque of the motor.

6. A carrier frequency setting device for setting a carrier frequency of an inverter for driving a motor, wherein the carrier frequency setting device, as a relationship between a torque of the motor and an optimum carrier frequency which is the carrier frequency when a total loss, which is a sum of a loss of the inverter and a loss of the motor when the motor is driven by using the inverter, is minimum, derives, for each rotation speed of the motor, a relationship which has a portion in which the optimum carrier frequency increases as the torque of the motor increases in a range in which the torque of the motor is equal to or more than a torque of the motor corresponding to the carrier frequency at which the optimum carrier frequency is a lowest value, and a portion in which the optimum carrier frequency decreases as the torque of the motor increases in a range in which the torque of the motor is equal to or less than the torque of the motor corresponding to the carrier frequency at which the optimum carrier frequency is the lowest value, when the inverter has a switching element configured using a wide band gap semiconductor, derives, for each rotation speed of the motor, a relationship in which the optimum carrier frequency has a substantially constant value regardless of the torque of the motor, when the inverter has the switching element configured by using a semiconductor other than the wide band gap semiconductor, and sets the carrier frequency of the inverter based on the relationship between the torque of the motor and the optimum carrier frequency.

* * * * *